(12) United States Patent
Park et al.

(10) Patent No.: US 10,904,140 B2
(45) Date of Patent: *Jan. 26, 2021

(54) INTEGRATED WIRE AND WIRELESS NETWORK PACKET BROKER AND METHOD FOR GTP CORRELATION ASSIGNING METHOD OF THE SAME

(71) Applicant: KULCLOUD, Seongnam-si (KR)

(72) Inventors: Seung Yong Park, Seongnam-Si (KR); Seok Hwan Kong, Yongin-Si (KR); Dipjyoti Saikia, Seongnam-Si (KR)

(73) Assignee: KULCLOUD, Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/928,403

(22) Filed: Jul. 14, 2020

(65) Prior Publication Data

US 2020/0344156 A1  Oct. 29, 2020

Related U.S. Application Data

(63) Continuation of application No. 16/730,811, filed on Dec. 30, 2019, which is a continuation of application No. PCT/KR2019/014312, filed on Oct. 28, 2019.

(30) Foreign Application Priority Data

Dec. 16, 2018  (KR) .......................... 10-2018-0162674

(51) Int. Cl.
*H04L 12/721* (2013.01)
*H04L 12/46* (2006.01)
(Continued)

(52) U.S. Cl.
CPC .......... *H04L 45/38* (2013.01); *H04L 12/4633* (2013.01); *H04L 12/4641* (2013.01);
(Continued)

(58) Field of Classification Search
CPC ......... H04L 45/38; H04L 45/02; H04L 45/64; H04L 45/586; H04L 12/4633; H04L 12/4641

See application file for complete search history.

(56) References Cited

U.S. PATENT DOCUMENTS

2015/0215841 A1   7/2015  Hsu et al.
2020/0259741 A1*  8/2020  Park .................... H04L 12/4641

FOREIGN PATENT DOCUMENTS

KR   10-2013-0114708 A    10/2013
KR   10-1534161 B1         7/2015
(Continued)

OTHER PUBLICATIONS

International Search Report and Written Opinion from the Korean International Searching Authority, dated Mar. 3, 2020, 8 pages, for corresponding International Patent Application No. PCT/KR2019/014312.

(Continued)

*Primary Examiner* — Kibrom T Hailu
(74) *Attorney, Agent, or Firm* — Polsinelli PC

(57) ABSTRACT

The present invention relates to a network packet broker device including a deep packet matching module which controls a GTP correlation module to match a GTP control plane packet and a GTP user plane packet and a deep packet matching method thereof. Packet information in a deep stage at a switch level is extracted to match flows of the GTP control plane packet and the GTP user plane packet and a correlation may be assigned to forward the GTP control plane packet and the GTP user plane packet to the same egress port.

5 Claims, 36 Drawing Sheets

(51) Int. Cl.
*H04L 12/713* (2013.01)
*H04L 12/715* (2013.01)
*H04L 29/06* (2006.01)

(52) U.S. Cl.
CPC ............ *H04L 45/586* (2013.01); *H04L 45/64* (2013.01); *H04L 69/22* (2013.01)

(56) References Cited

FOREIGN PATENT DOCUMENTS

| KR | 10-2015-0117035 A1 | 10/2015 |
| KR | 10-2018-0058594 A | 6/2018 |

OTHER PUBLICATIONS

English translation of the International Search Report of International Patent Application No. PCT/KR2019/014312, 2 pages.
Machine generated English translation of the Written Opinion of PCT/KR2019/014312, 3 pages.

\* cited by examiner

FIG. 7(a)

| Match Fields | Priority | Counters | Instructions | Timeouts | Cookie |

FIG. 7(b)

| | In Port | MAC src | MAC dst | eth type | VLAN ID | IP src | IP dst | IP prot | TCP s.port | TCP d.port | action |
|---|---|---|---|---|---|---|---|---|---|---|---|
| Switching: | * | * | 00:1f.. | * | * | * | * | * | * | * | port 1 |
| Routing: | * | * | * | * | * | * | 1.2.3.4 | * | * | * | port 6 |
| VLAN sw: | * | * | 00:3f.. | * | vlan2 | * | * | * | * | * | port 1,2,3 |
| Firewall: | * | * | * | * | * | * | * | * | * | 22 27 | drop |

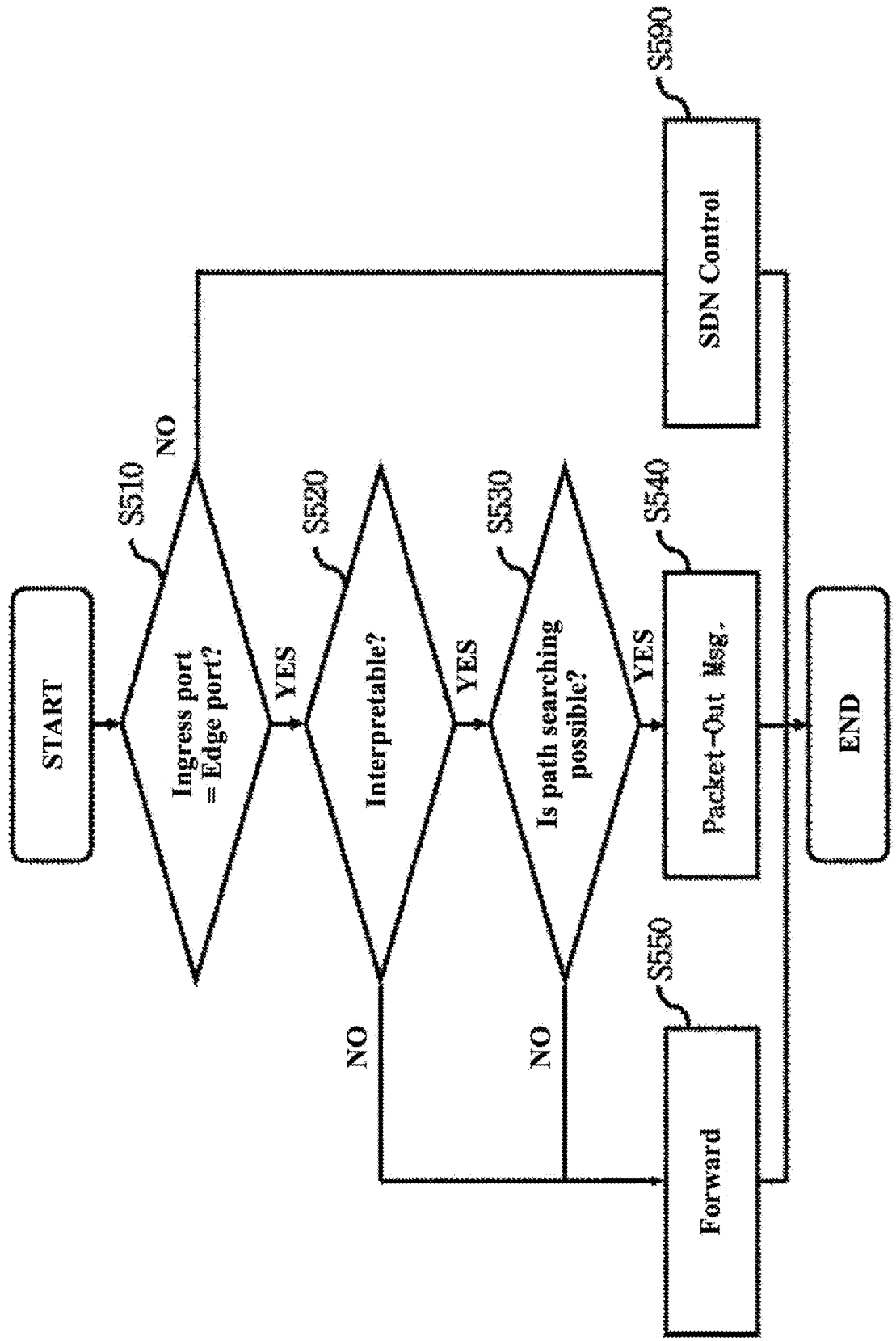

FIG. 15(a)

| table 0 | | | table 1 | | |
|---|---|---|---|---|---|
| R2 | set-tunnel2 | goto table1 | tunnel2 | out port14 | |
| R3 | set-tunnel3 | goto table1 | tunnel3 | out port15 | |

FIG. 15(b)

| table 1 | |
|---------|---|
| tunnel2 | out_port43 |

FIG. 15(c)

| table 0 | tunnel2 | off T-ID | goto table1 |
|---------|---------|----------|-------------|
|         | tunnel3 | off T-ID | goto table2 |

| table 1 | * | out port32 |
|---------|---|------------|

| table 2 | * | out port33 |
|---------|---|------------|

INTEGRATED WIRE AND WIRELESS NETWORK PACKET BROKER AND METHOD FOR GTP CORRELATION ASSIGNING METHOD OF THE SAME

CROSS-REFERENCE TO RELATED APPLICATIONS

This application is a continuation of U.S. Non-Provisional patent application Ser. No. 16/730,811, filed Dec. 30, 2019, which is a continuation of PCT Application No. PCT/KR2019/014312, filed Oct. 28, 2019, which claims priority to Korean Patent Application No. 10-2018-0162674, filed Dec. 16, 2018, the full contents of which are incorporated herein by reference in their entireties.

TECHNICAL FIELD

The present invention relates to a network packet broker device and a network packet processing method using the same.

BACKGROUND

In accordance with development of mobile communication technologies, the 4-th generation mobile communication technology which processes a large amount of traffics at a high speed is followed by the 5-th generation mobile communication technology which connects a large number of devices such as Internet of Things while processing a large amount of traffics at a high speed with low latency.

Specifically, researches on wired and wireless backhaul, midhaul, and fronthaul are being actively conducted to smoothly provide high speed/low latency wireless transmission and simultaneous access service of a large number of devices through a mobile access network. However, in order to satisfy the requirements, enormous expense for constructing 5G fronthaul and huge costs for constructing a huge 5G RAN are required due to monopoly based on a haul specification unique to a vender of the existing radio access network (RAN) equipment.

Therefore, as in the related art, when the RAN equipment vender uses a vender's own fronthaul specification, the entry of a new vender is hardly allowed and a huge 5G RAN cost is caused due to the monopoly of the existing RAN vender. Therefore, a technology which does not depend on the vender, but implements various network functions using software is required.

In the meantime, it is always important to monitor a quality of a mobile network and time synchronization at both ends of a monitoring device which improves the accuracy of the analysis system is one of important technical elements.

However, there is a problem in that the time synchronization in a quality monitoring device is provided using an expensive network interface card.

Further, as the mobile network is evolved to a mobile edge computing (MEC), in order to determine the traffic of a subscriber at the edge, all src/dst IPs need to be acquired from a packet of the subscriber.

However, the system of the related art can match only tunnel IPs (GTP outer IPs) at the edge so that traffic steering is not possible at the edge cloud depending on a type of internal traffic. Further, all traffics are going through the edge cloud, which results in enormous cost due to unnecessary edge traffics. Further, when load balancing is performed only by GTP outer, the balancing is performed only in the unit of base station, which results in imbalance.

Further, as a 5G network is introduced, EPC functions are reconfigured to be mapped to 5GC network functions (NF). On a control plane, authentication of EPC MME, access control, mobility control functions are reconstructed to 5GC access and mobility management function (AMF) and session control functions of EPC MME and GW-C are reconstructed to 5GC session management function (SMF).

As a user plane and a control plane are separated, a problem arises that a GTP user plane packet and a GTP control plane packet need to be forwarded together in a quality monitoring device.

SUMMARY

Technical Problem

An object of the present invention is to provide a network packet broker device which applies a network disaggregation to a wired/wireless network to implement various network functions by software without depending on a vender.

Further, an object of the present invention is to provide a network packet broker device which is capable of providing accurate hardware time synchronization function at a switch level with a small storage space of a register and a packet time stamp assigning method thereof.

Further, an object of the present invention to provide a network packet broker device which forwards a GTP user plane packet and a GTP control plane packet together to an analysis device and a GTP correlation assigning method thereof.

Further, an object of the present invention is to provide a network packet broker device which provides the matching of a deep packet even at a switch level by extracting not only GTP outer information of a packet but also GTP inner information and a deep packet matching method thereof.

Technical Solution

A network packet broker device according to an embodiment of the present invention includes: a plurality of openflow edge switches connected to a plurality of legacy networks which is radio access networks or wired access networks; a software defined network (SDN) controller which acquires information of the plurality of openflow edge switches belonging to a switch group; a legacy router container which treats a switch group including at least some of the plurality of switches as a virtual router to generate routing information for a packet ingressed to any one switch of the switch group; and a network application module including modules which perform a function of manipulating a packet and controlling a flow in accordance with a request, through the controller.

The legacy router container maps a plurality of network heads connected to the plurality of openflow switches which generates legacy routing information for a flow processing inquiry message of the controller based on information of at least one virtual router with information of an external network which is directly coupled to the virtual router, the network application module includes a timing synchronization module which synchronizes timings of the packet with a time stamp value of the network device. The network packet broker device further includes a processor. The switch further includes a processor. The processor of the network packet broker device includes a clock which replies a timing value and the processor of the switch includes a register which stores a time parameter elapsed from a reference time in the processor. When the switch receives a request of assigning a time stamp of the packet, the timing synchronization module stores a time stamp in a packet by modifying overflow of the time parameter from the register of the processor of a reference time switch.

The controller of the network packet broker device according the embodiment of the present invention may further include a virtual radio network control module which maps the remote radio head (RRH) of the coupled wireless access network with external network information which is directly coupled to the virtual router.

The controller of the network packet broker device according to the embodiment of the present invention may further include a virtual wired network control module which maps an optical line terminal (OLT) of the coupled wired access network with external network information which is directly coupled to the virtual router.

The controller of the network packet broker device according to the embodiment of the present invention may further include a distributed radio network control module which maps a digital processing unit DU of the coupled wireless access network with external network information which is directly coupled to the virtual router.

A packet time stamp assigning method of a network packet broker device according to an embodiment of the present invention includes: acquiring a clock of a processor of a network packet broker device by a switch; updating a reference time parameter Tb of the switch with the acquired clock; receiving a time stamp assigning request of a packet, by the switch; updating a previous elapsed time parameter Tp of the switch with a current elapsed time parameter Tc by the timing synchronization module; acquiring a parameter Tb reference elapsed time value from the switch as a parameter Tc by the timing synchronization module; comparing magnitudes of the parameter Tc and the parameter Tp by the timing synchronization module; if the parameter Tc is smaller than the parameter Tp, updating the parameter Tb by adding a sum of the parameter Tp and a correction value, by the timing synchronization module; if the parameter Tc is equal to or larger than the parameter Tp, updating the parameter Tb by adding the parameter Tb as much as the parameter Tp, by the timing synchronization module; and storing the parameter Tb in a packet as a time stamp by the timing synchronization module.

The packet time stamp assigning method of a network packet broker device according to the embodiment of the present invention may use IEEE 1588 precision time protocol (PTP) synchronization protocol.

The packet time stamp assigning method of a network packet broker device according to the embodiment of the present invention may store the parameter Tp and the parameter Tc in a register of the processor of the switch.

In the packet time stamp assigning method of a network packet broker device according to the embodiment of the present invention, a storage unit of the register may be 48 bits.

In the packet time stamp assigning method of a network packet broker device according to the embodiment of the present invention, in the storing of the parameter in the packet as a time stamp, a storage unit of the register may be 64 bits.

In the packet time stamp assigning method of a network packet broker device according to the embodiment of the present invention, a correction value of the updating step may be a maximum value of the storage unit of the register.

In the packet time stamp assigning method of a network packet broker device according to the embodiment of the present invention, a correction value of the updating step may be 4,294,967,294.

A network packet broker device according to an embodiment of the present invention includes: a plurality of openflow edge switches connected to a plurality of legacy networks which is radio access networks or wired access networks; a software defined network (SDN) controller which acquires information of the plurality of openflow edge switches belonging to a switch group; a legacy router container which treats a switch group including at least some of the plurality of switches as a virtual router to generate routing information for a packet ingressed to any one switch of the switch group; and a network application module including modules which perform a function of manipulating a packet and controlling a flow in accordance with a request, through the controller. The legacy router container maps a plurality of network heads connected to the plurality of openflow switches which generates legacy routing information for a flow processing inquiry message of the controller based on information of at least one virtual router with information of an external network which is directly coupled to the virtual router, the network application module includes a GTP correlation module interworking to forward a GTP-C packet and a GTP-U packet of the flow packet to the same egress port.

The GTP correlation module according to an embodiment of the present invention includes: a storage which stores a subscriber table storing a subscriber IMSI and a GTP session table storing subscriber session information; a GTP user plane forwarding module which receives a GTP user plane packet from a port unit of the switch to forward the GTP user plane packet to a predetermined port unit of the switch and searching for GTPU TEID of the GTP user plane packet in the storage to connect the egress port of the GTP user plane packet to the storage to be stored; and a GTP control plane forwarding module which receives a GTP control plane packet from the port unit of the switch to forward the GTP control plane packet received from a port unit of the switch same as the searched egress port by searching for the egress port of the GTP user plane packet connected to a GTPU TEID of the GTP control plane packet in the storage.

The network packet broker device according to the embodiment of the present invention further includes a processor and a storage of the GTP correlation module may be located in the processor.

The storage of the GTP correlation module according to the embodiment of the present invention includes an IMSI table, an MME context table, and an SGW context table, a subscriber table of the storage of the GTP correlation module is an IMSI table, a GTP session table of the storage of the GTP correlation module includes an MME context table and an SGW context table, and the GTP session table of the storage of the GTP correlation module further includes a correlation table which stores a correlation of the IMSI table, the MME context table, and the SGW context table.

The correlation table of the storage of the GTP correlation module according to the embodiment of the present invention includes a first correlation table, a second correlation table, a third correlation table, and a fourth correlation table.

A GTP correlation assigning method of a network packet broker device according to an embodiment of the present invention includes: a GTP user plane forwarding step of receiving a GTP user plane packet from a port unit of the switch to forward the GTP user plane packet to a predetermined port unit of the switch and searching for GTPU TEID of the GTP user plane packet in the storage to connect the egress port of the GTP user plane packet to the storage to be stored; and a GTP control plane forwarding module which receives a GTP control plane packet from the port unit of the switch to forward the GTP control plane packet received from a port unit of the switch same as the searched egress port by searching for the egress port of the GTP user plane packet connected to a GTPU TEID of the GTP control plane packet in the storage.

A GTP correlation assigning method of a network packet broker device according to an embodiment of the present invention includes: a step of generating a record with an MME IP address as a key and a bearer ID set including an MME IP, a bearer ID, and a sequence and an MME S11 TEID as values in an MME context table, by the GTP correlation module; a step of generating a record with an SGW IP address as a key in the SGW context table, by the GTP correlation module; a step of updating SGW S11 TEID and SGW S1U TEID by searching for a record with the SGW IP address as a key, in the SGW context table, by the GTP correlation module; a step of generating a record with MME S11 TEID as a key and with IMSI context and SGW S11 TEID context as values, in the first correlation table, by the GTP correlation module; a step of generating a record with SGW S11 TEID as a key and with MME S11 context as a value, in the second correlation table, by the GTP correlation module; a step of generating a record with SGW S11 TEID as a key and with SGW S11 TEID context as a value, in the third correlation table, by the GTP correlation module; a step of generating a record with eNB TEID and eNB IP as keys and with SGW S1U TEID context as a value, in the fourth correlation table, by the GTP correlation module; a step of updating a bearer ID set including an MME IP, a bearer ID, and a sequence of a record with an MME IP address as a key and an eNB S1U TEID value in the MME context table, by the GTP correlation module; and a step of generating a record with an IMSI as a key and with a bearer ID set including an MME IP, a bearer ID, and a sequence as a value, in the IMSI table, by the GTP correlation module.

A wired/wireless convergence network packet broker device according to an embodiment of the present invention includes: a plurality of openflow edge switches connected to a plurality legacy networks which is radio access networks or wired access networks; a software defined network (SDN) controller which acquires information of the plurality of openflow edge switches belonging to a switch group; a legacy router container which treats a switch group including at least some of the plurality of switches as a virtual router to generate routing information for a packet ingressed to any one switch of the switch group; and a network application module including modules which perform a function of manipulating a packet and controlling a flow in accordance with a request, through the controller. The legacy router container maps a plurality of network heads connected to the plurality of openflow switches which generates legacy routing information for a flow processing inquiry message of the controller based on information of at least one virtual router with information of an external network which is directly coupled to the virtual router, the network application module includes a GTP correlation module interworking to forward a GTP-C packet and a GTP-U packet of the flow packet to the same egress port, the network application module includes a deep packet matching module which extracts, modifies, removes, or inserts a GTP header or a VxLAN header of the flow packet, the GTP correlation module includes a GTP session tracking module, a GTP user plane forwarding module, and a storage, and the deep packet matching module controls the GTP correlation module to match the GTP control plane packet and the GTP user plane packet.

A deep packet matching method of a network packet broker device according to an embodiment of the present invention includes: receiving a packet from an ingress port unit of a switch, by a deep packet matching module; an ingress packet parsing step of extracting deep packet information from an input packet, by a packet parsing module of the switch; an ingress packet pipeline step of processing a packet with acquired information, by the deep packet matching module; a step of distinguishing a type of packet from information of the acquired packet, by the deep packet matching module; a GTP control plane packet processing step of acquiring an egress port unit or an egress port group which sends a packet by querying a flow matching the packet to the GTP control plane egress table, by a GTP session tracking module when the distinguished type of packet is a GTP control plane packet; and an egress packet pipeline step of processing the packet by querying the flow matching the packet to the GTP user plane egress table by a GTP user plane forwarding module when the distinguished type of packet is a GTP user plane packet.

An ingress packet parsing step according to the embodiment of the present invention includes: an ingress port parsing step of extracting ingress port information from an ingress packet by a packet parsing module; an Ethernet protocol parsing step of extracting Ethernet protocol information from the ingress packet by the packet parsing module; a VLAN parsing step of extracting VLAN information from the ingress packet when the extracted Ethernet protocol information is VLAN, by the packet parsing module; an IPv4 parsing step of extracting IPv4 information from the ingress packet when the extracted Ethernet protocol information is IPv4, by the packet parsing module; a TCP parsing step of extracting TCP information from the ingress packet when the type of the extracted IPv4 protocol is a TCP, by the packet parsing module; an IMCP parsing step of extracting IMCP information from the ingress packet when the type of the extracted IPv4 protocol is a IMCP, by the packet parsing module; an SCTP parsing step of extracting SCTP information from the ingress packet when the type of the extracted IPv4 protocol is an SCTP, by the packet parsing module; an UDP parsing step of extracting UDP protocol number information from the ingress packet by the packet parsing module; a VxLAN parsing step of extracting VxLAN information from the ingress packet when the extracted UDP protocol number is VxLAN, by the packet parsing module; a GTP parsing step of extracting GTP information from the ingress packet when the extracted UDP protocol number is GTP, by the packet parsing module; an Inner Ether parsing step of extracting Inner Ether information from the ingress packet by the packet parsing module; an Inner IPv4 parsing step of extracting Inner IPv4 information from the ingress packet by the packet parsing module; and an Inner TCP/UDP parsing step of extracting Inner TCP and Inner UDP information from the ingress packet by the packet parsing module.

An ingress pipeline step according to the embodiment of the present invention includes: an ingress port mapping step of converting an ingress physical port to a logic port used for a match action table, by the deep packet matching module; a GTP filter applying step of storing processing of a packet corresponding to GTP information extracted from the ingress packet in an egress port match action table, by the deep packet matching module; and an Inner IPv4 filter applying step of storing processing of a packet corresponding to Inner IPv4 information extracted from the ingress packet in an egress port match action table, when there is Inner IPv4 information extracted from the ingress packet, by the deep packet matching module.

An egress packet parsing step according to the embodiment of the present invention includes: an ingress port filter number parsing step of extracting an ingress port filter number from an egress packet, by the deep packet matching module; an ingress port filter matching step of querying the ingress port filter number extracted from the egress packet to a policy manager module, by the deep packet matching module; a step of extracting the matched ingress port action from the policy manager module when there is a matched ingress port filter number; a GTP filter number parsing step of extracting a GTP filter number from the egress packet, by the deep packet matching module; an GTP filter matching step of querying GTP filter number extracted from the egress packet to a policy manager module, by the deep packet matching module; a step of extracting the matched GTP action from the policy manager module when there is a matched GTP filter number; an Inner IPv4 parsing step of extracting Inner IPv4 information from the egress packet, by the deep packet matching module; an Inner IPv4 matching step of querying Inner IPv4 information extracted from the egress packet to the policy manager module, by the deep packet matching module; a step of extracting the matched Inner IPv4 action from the policy manager module when there is a matched Inner IPv4 information; and an action list generating step of storing all the pairs of the egress packet and extracted action lists in a GTP user plane egress port match action table, by the deep packet matching module Advantages Effects The network packet broker device according to the embodiment of the present invention applies a network disaggregation to a wired/wireless access network based on a software defined network (SDN) to abstract an RAN protocol layer while separating BBU from RRH for the radio access network. Further, the compatibility with an existing vender lock-in protocol through service chaining for every access device is provided and the function may be divided in various manners based on open hardware/software.

Further, the network packet broker device according to the embodiment of the present invention includes a timing synchronization module which synchronizes a timing of a packet with a time stamp value of the network device so that according to the packet time stamp assigning method using the same, even though an overflow of the register of an elapsed time counter of the processor of the switch is generated, the overflow is corrected to assign a time stamp with a nanosecond level accuracy with a coordinated universal time (UTC) format at a hardware level to the packet.

Further, the network packet broker device according to the embodiment of the present invention includes a GTP correlation module which interworks to forward the GTP-C packet and the GTP-U packet of the flow packet to the same egress port so that the GTP correlation assigning method using the same may assign the correlation so that the GTP control plane packet and the GTP user plane packet are forwarded to the same egress port.

Further, the network packet broker device according to the embodiment of the present invention includes a deep packet matching module which controls a GTP correlation module to match the GTP control plane packet and the GTP user plane packet so that the GTP deep packet matching method using the same extracts packet information of a deep step at a switch level to match the flows of the GTP control plane packet and the GTP user plane packet.

BRIEF DESCRIPTION OF THE DRAWINGS

FIGS. 7A-B are operation tables illustrating a field table of a flow entry and an operation type according to a flow entry.

FIG. 12 is a flowchart illustrating a method for determining legacy routing of a flow of an SDN controller.

FIGS. 15A-C are flow tables according to an embodiment of the present invention.

DETAILED DESCRIPTION

Figure 1:
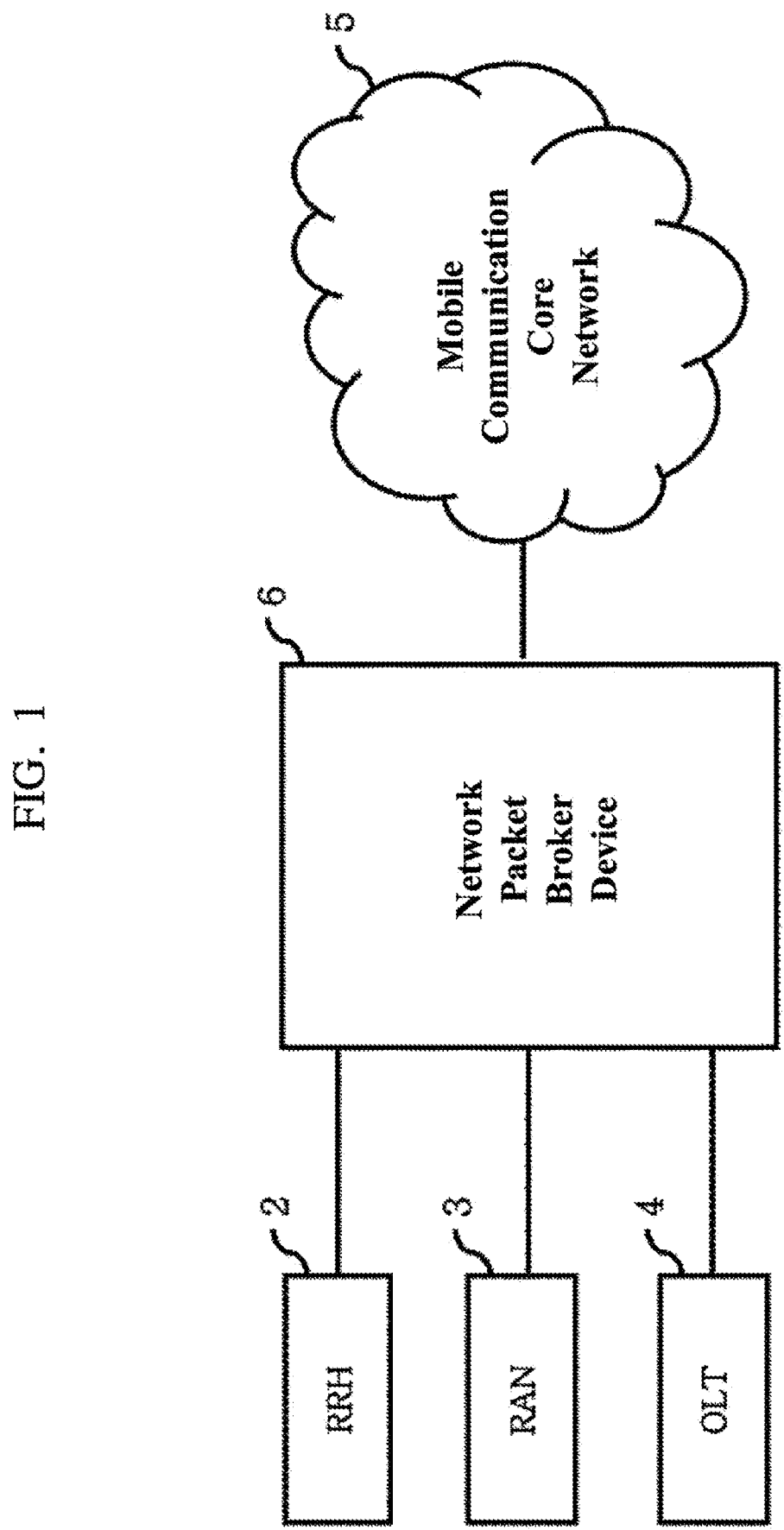
FIG. 1 is a block diagram of a network packet broker system according to an embodiment of the present invention.

Hereinafter, the present disclosure will be described in more detail with reference to the drawings.

Terminologies such as first or second may be used to describe various components but the components are not limited by the above terminologies. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is not present therebetween. Further, when a first component and a second component on the network are coupled or connected to each other, it means that data may be exchanged between the first component and the second component in a wired manner or wireless manner.

Further, a "module" and a "unit" suffixes for components used in the following description are given or mixed and used by considering easiness in preparing a specification and do not have a meaning or role distinguished from each other in themselves. Therefore, the "module" and "unit" may be exchangeably used.

When the components are actually implemented, if necessary, two or more components are combined as one component or one component may be sub-divided into two or more components. Throughout the drawings, like components are denoted by like reference numerals, description of the component with the same reference numeral may be omitted by replacing with the description of the previously described component.

Referring to FIG. 1, a network packet broker system according to an embodiment of the present invention may include a plurality of remote radio heads (RRH) 2 which transmits/receives data of a wireless terminal, radio access network (RAN) equipment 3 which transmits/receives data of the wireless terminal to allocate an MAC address to a frame, a plurality of optical line terminals 4, a mobile communication core network 5, and a network packet broker device 6 connected to the mobile communication core network 5.

Figure 2:
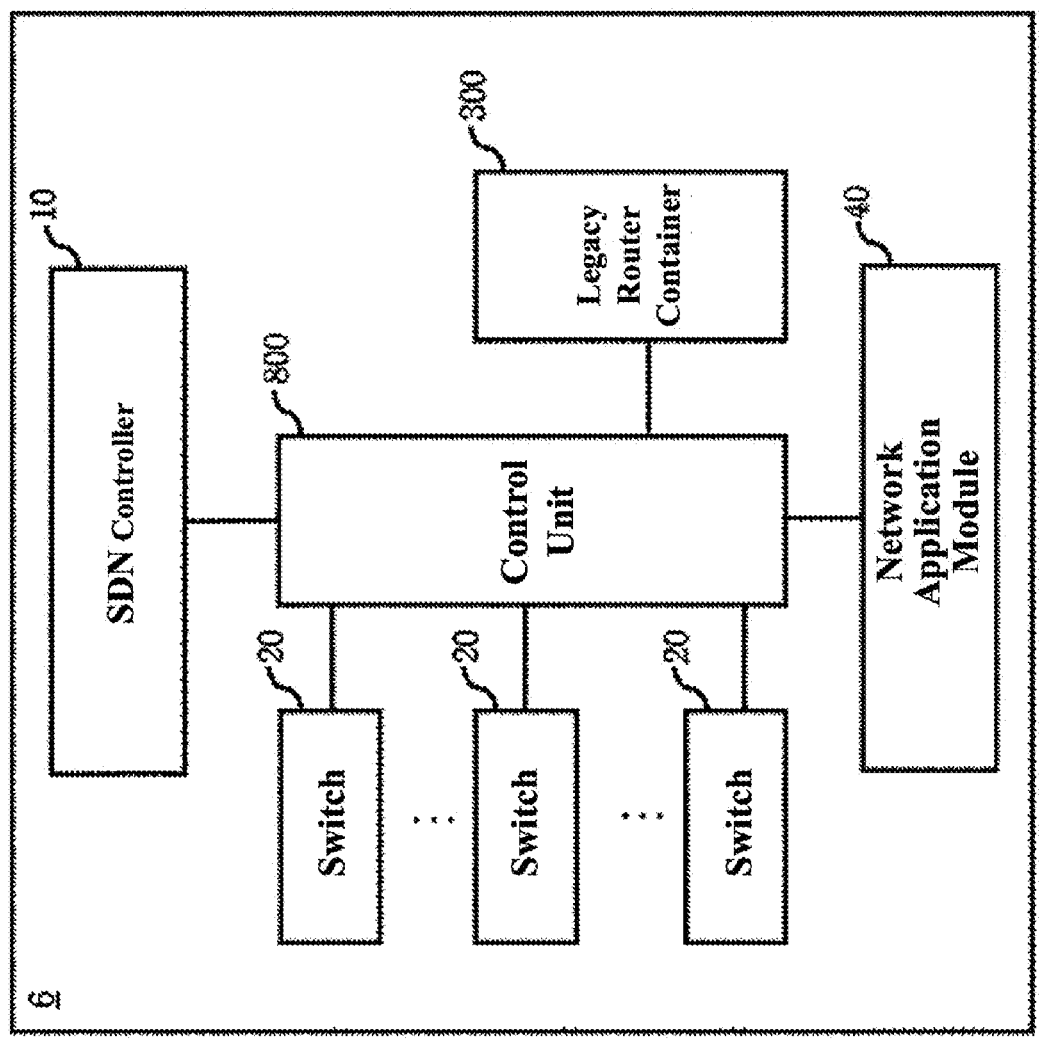
FIG. 2 is a block diagram of a network packet broker device according to another embodiment of the present invention.

Referring to FIG. 2, the network packet broker device 6 according to an embodiment of the present disclosure includes a plurality of openflow edge switches 20 which is coupled to the remote radio head via the Ethernet, coupled to the RAN equipment via the Ethernet, or coupled to the optical line terminal via a passive optical network (PON), a software defined network (SDN) controller 10 which acquires information of the plurality of openflow edge switches, a network application module 40 which performs various functions on the network through the SDN controller in response to the calling, and a legacy router container 300 which treats a switch group including at least some of the plurality of switches as a virtual router to generate routing information for a packet ingressed to any one switch of the switch group. The legacy router container 300 may map a plurality of network heads connected to the plurality of openflow switches 20 which generates legacy routing information for a flow processing inquiry message of the controller based on information of at least one virtual router with information of an external network which is directly coupled to the virtual router.

The SDN controller 10 is a kind of command computer that controls the SDN system, and may perform various and complex functions such as routing, policy declaration, and security check. The SDN controller 10 may define a flow of packets occurring in the plurality of switches 20 in a lower layer. The SDN controller 10 sets an entry of the flow in the switch on a path after calculating the path (data path) through which the flow passes by referring to a network topology for a flow allowed by a network policy. The SDN controller 10 may communicate with the switch 20 using a specific protocol, for example, an openflow protocol. A communication channel between the SDN controller 10 and the switch 10 may be encrypted by an SSL. The SDN controller 10 may be physically included in the network packet broker device 6 or may be coupled to the network packet broker device 6 as an external device.

As a virtualization network function, there is a network function virtualization (NFV) defined in NFV related white paper published by ETSI (European Telecommunications Standards Institute). In this specification, the network function (NF) may be used to be exchangeable with the network function virtualization (NFV). The NFV may be used to provide a necessary network function by dynamically generating an L4-7 service connection required for every tenant or to quickly provide a firewall, IPS, and DPI functions required based on the policy in the case of DDoS attach by a series of service chaining. Further, the NFV may easily turn on/off the firewall or IDS/IPS and automatically perform provisioning. The NFV may reduce the necessity of over-provisioning.

Figure 3:
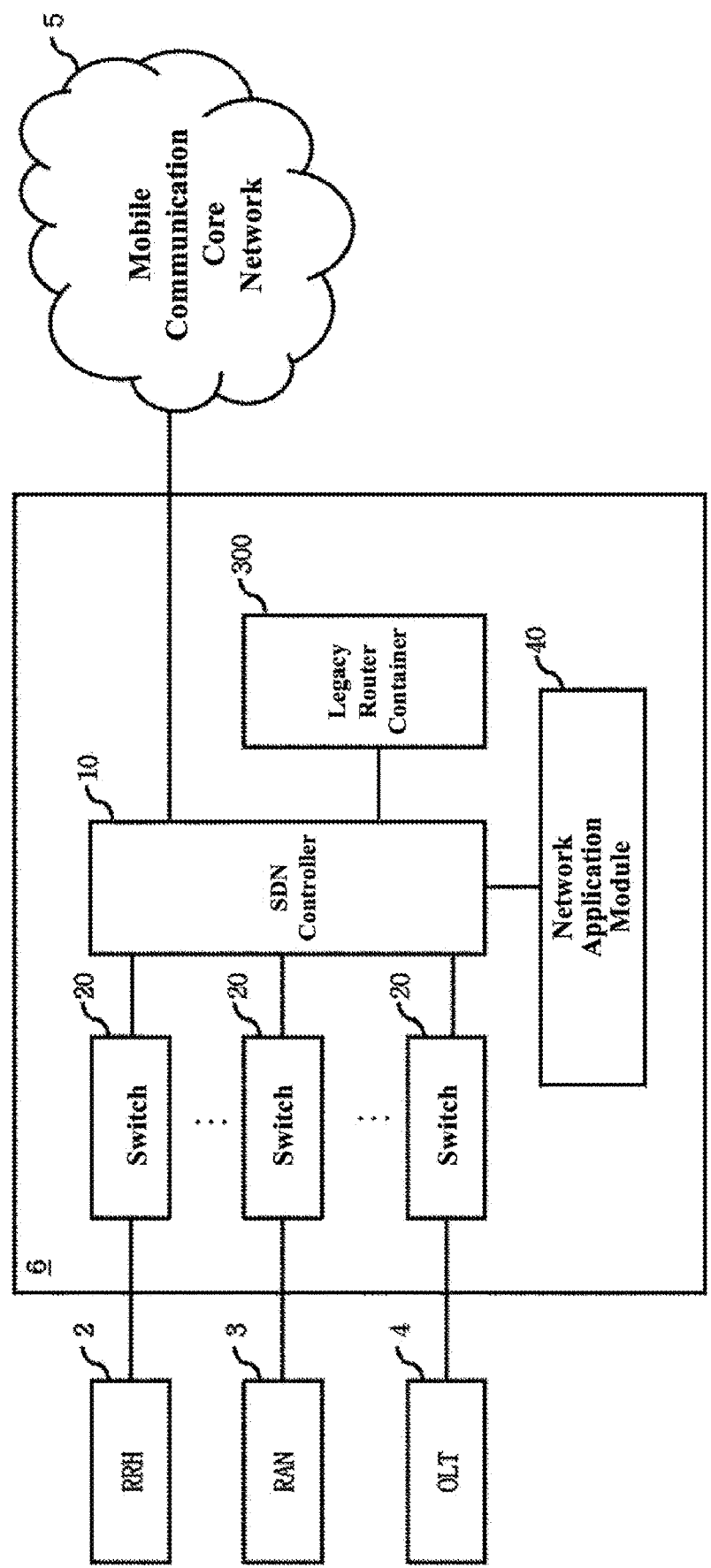
FIG. 3 is a block diagram of a network packet broker system according to another embodiment of the present invention.

Referring to FIG. 3, the network device which is denoted by 2, 3, 4, or is not illustrated is a physical or virtual device coupled to the switch 20 and may be a user terminal device with which data and information is exchanged or performs a specific function. In view of hardware, the network device 30 may be a PC, a client terminal, a server, a workstation, a supercomputer, a mobile communication terminal, a smart phone, or a smart pad. Further, the network device 30 may be a virtual machine VM generated on a physical device.

The network device may be referred to as a network function which performs various functions on the network. The network function may include an anti-DDoS, intrusion detection/intrusion prevention (IDS/IPS), integrated security service, a virtual private network service, an anti-virus, an anti-spam, a security service, an access management service, a firewall, load balancing, a QoS, and video optimization. Such a network function may be virtualized.

Figure 4:
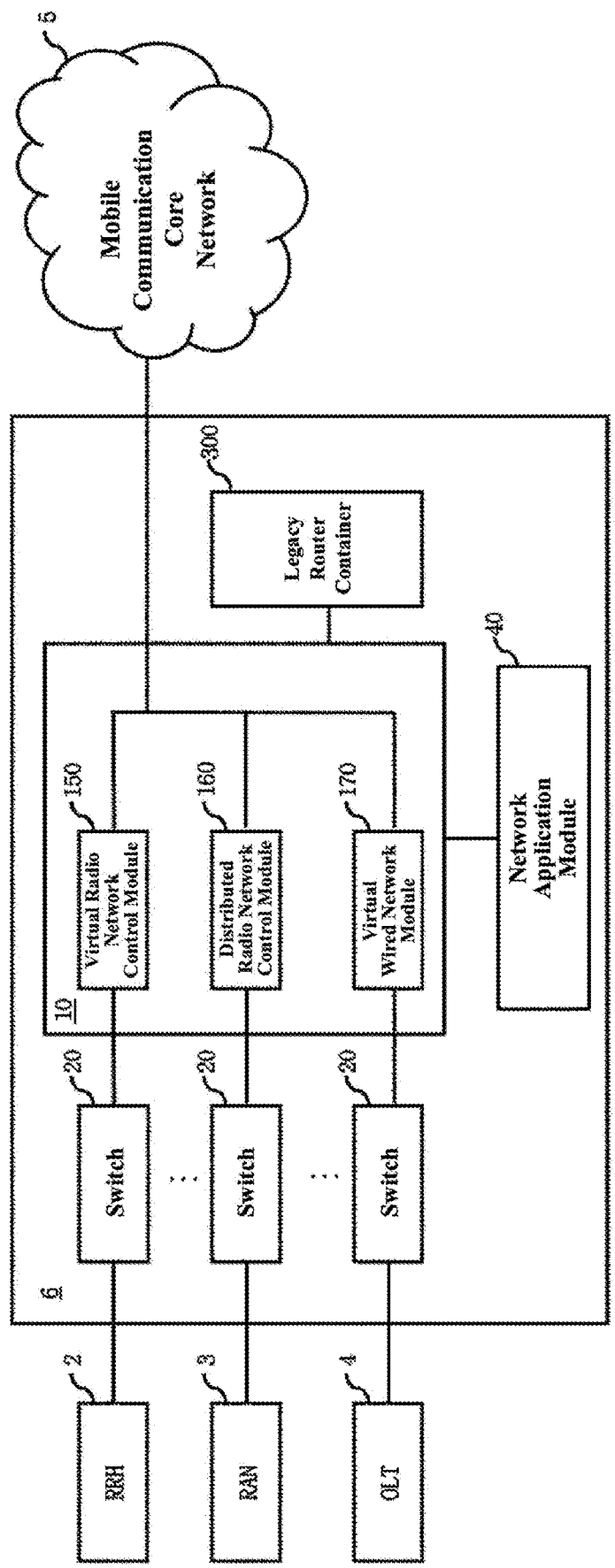
FIG. 4 is a block diagram of a network packet broker system according to another embodiment of the present invention.

Referring to FIG. 4, the SDN controller 10 according to the embodiment of the present invention may further include a virtual radio network control module 150 which maps the remote radio head (RRH) 2 of the coupled wireless access network with external network information which is directly coupled to the virtual router. The SDN controller 10 according to the embodiment of the present invention may further include a distributed radio network control module 160 which maps a digital processing unit DU of the coupled wireless access network with external network information which is directly coupled to the virtual router. The SDN controller 10 according to the embodiment of the present invention may further include a virtual wired network control module 170 which maps the optical line terminal (OLT) of the coupled wired access network with external network information which is directly coupled to the virtual router.

Figure 5:
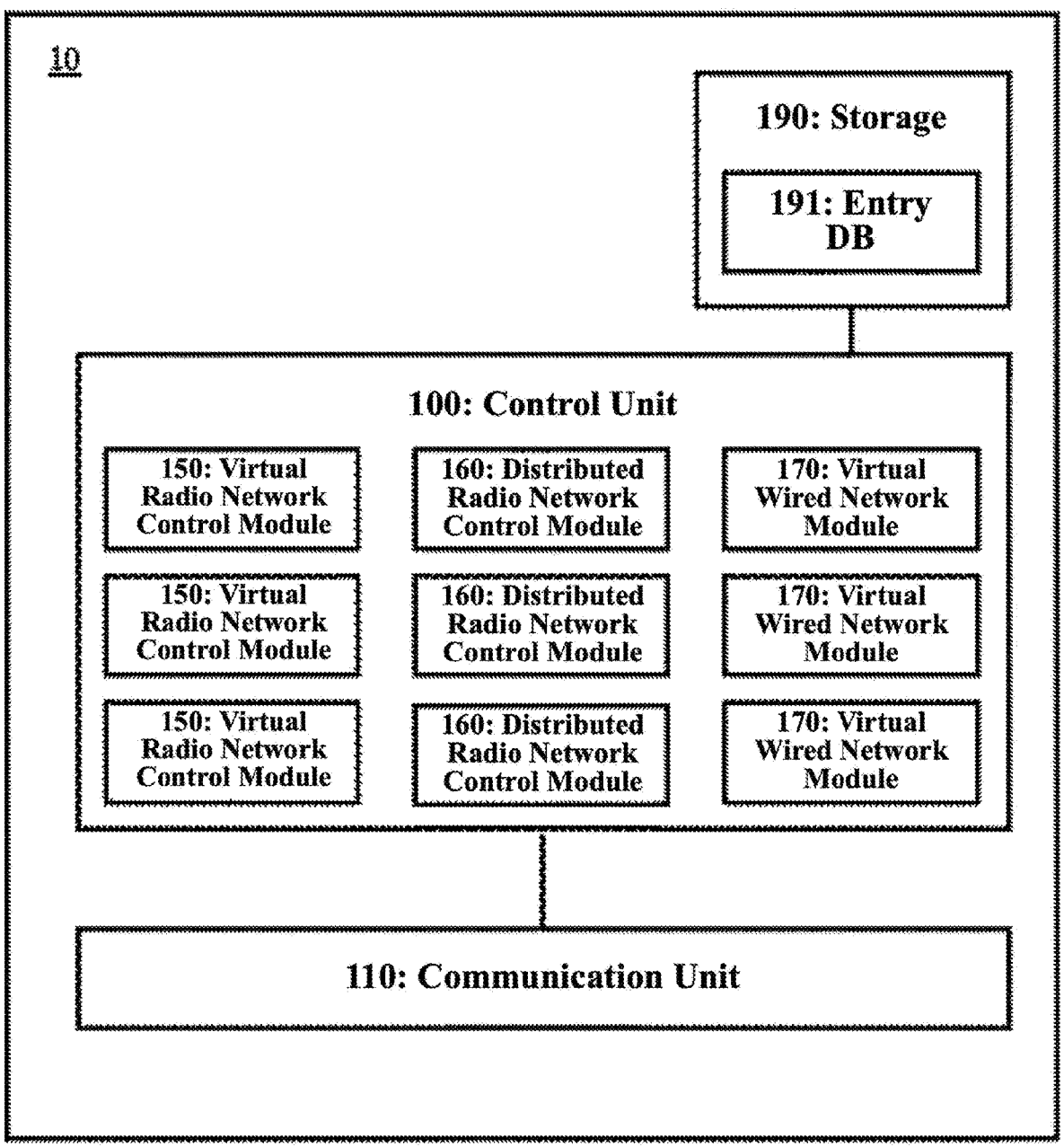
FIG. 5 is an example of a block diagram of a SDN controller of a network packet broker device.

Referring to FIG. 5, the SDN controller 10 according to the embodiment of the present invention may include a switch communication unit 110 which communicates with the switch of FIG. 2, a control unit 100, and a storage 190.

Referring to FIG. 5, the control unit 100 of the SDN controller may further include a topology management module 120, a path calculating module 125, an entry management module 135, a message management module 130, a legacy interface module 145, and an API interface module 146. Each module may be configured in the control unit 100 as hardware or may be configured as separate software from the control unit 100. The description of a component with the same reference numeral will refer to FIG. 2.

Referring to FIG. 5, the control unit 100 of the SDN controller 10 according to the embodiment of the present invention may include a timing synchronization module 410 which synchronizes a timing of the packet with a time stamp value of a network device, a policy manager module 420 which controls a quality of service (QoS), and a deep packet matching module 430 which extracts, modifies, removes, or inserts a GTP header or a VxLAN header of a flow packet.

The storage 190 may store a program for processing and controlling the control unit 100. The storage 190 may perform a function of temporarily storing data (packets or messages) to be input or output. The storage 190 may include an entry database DB 191 which stores the flow entry.

The control unit 100 may control an overall operation of the SDN controller 10 by controlling an operation of each part. The control unit 100 may include a topology management module 120, a path calculating module 125, an entry management module 135, an API server module 136, an API parser module 137, and a message management module 130. Each module may be configured in the control unit 100 as hardware or may be configured as separate software from the control unit 100.

The topology management module 120 may construct and manage network topology information based on a coupling relation of the switch 20 collected through the switch communication unit 110. The network topology information may include a topology between switches and a network device topology coupled to each switch.

The path calculating module 125 may calculate a data path of a packet received through the switch communication unit 110 and an action column which executes the switch on the data path based on the network topology information constructed in the topology management module 120.

The entry management module 135 entries of a flow table, a group table, and a meter table in an entry DB 191 based on a result calculated in the path calculating module 125, the policy of QoS, and user's instruction. The entry management module 135 registers an entry of each table in the switch 20 in advance (proactive) or responds a request of adding or updating the entry from the switch 20 (reactive). The entry management module 135 may change or delete the entry of the entry DB 191 by an entry erasing message of the switch 10 if necessary.

The API parser module 137 may interpret a procedure of changing information of the mapped network device.

The message management module 130 may interpret a message received through the switch communication unit 110 or generate a SDN controller-switch message to be described below which is transmitted to the switch through the switch communication unit 110. A status change message which is one of SDN controller-switch messages may be generated based on an entry in accordance with the entry management module 135 or an entry stored in the entry DB 191.

When the switch group is configured by an openflow switch and an existing legacy switch, the topology management module 120 may acquire coupling information with the legacy switch through the openflow switch.

The legacy interface module 145 may communicate with the legacy router container 300. The legacy interface module 145 may transmit topology information of the switch group constructed in the topology management module 120 to the legacy router container 300. The topology information, for example, includes coupling relationship information of first to fifth switches SW1 to SW5 and connection or coupling information of a plurality of network devices coupled to first to fifth switches SW1 to SW5.

If the message management module 130 cannot generate a flow processing rule provided in a flow inquiry message received from the openflow switch, the message management module 130 may transmit the corresponding flow to the legacy router container 300 through the legacy interface module 145. The corresponding flow may include a packet received by the openflow switch and port information of the switch which receives the packet. When the flow processing rule cannot be generated, it means that the received packet is configured by a legacy protocol so as not to be interpreted and the route calculating module 125 cannot calculate the path for the legacy packet.

The switch 20 may be a physical switch or a virtual switch which supports the openflow protocol. The switch 20 processes the received packet to relay the flow between the network device 30 and the switch. To this end, the switch 20 may include one flow table or a plurality of flow tables for pipeline processing.

The flow table may include a flow entry which defines a rule indicating how to process a flow of a network device (denoted by reference numeral 2, 3, or 4 or not illustrated).

In view of one switch, the flow may refer to a series of packets which shares a value of at least one header field or a packet flow of a specific path in accordance with a combination of several flow entries of a plurality of switches. The openflow network may perform path control, interruption recovery, load distribution, or optimization in the unit of flow.

The switch 20 may be divided into an edge switch (an ingress switch and an egress switch) of the outlet and inlet of the flow in accordance with a combination of a plurality of switches and a core switch between edge switches.

Figure 6:
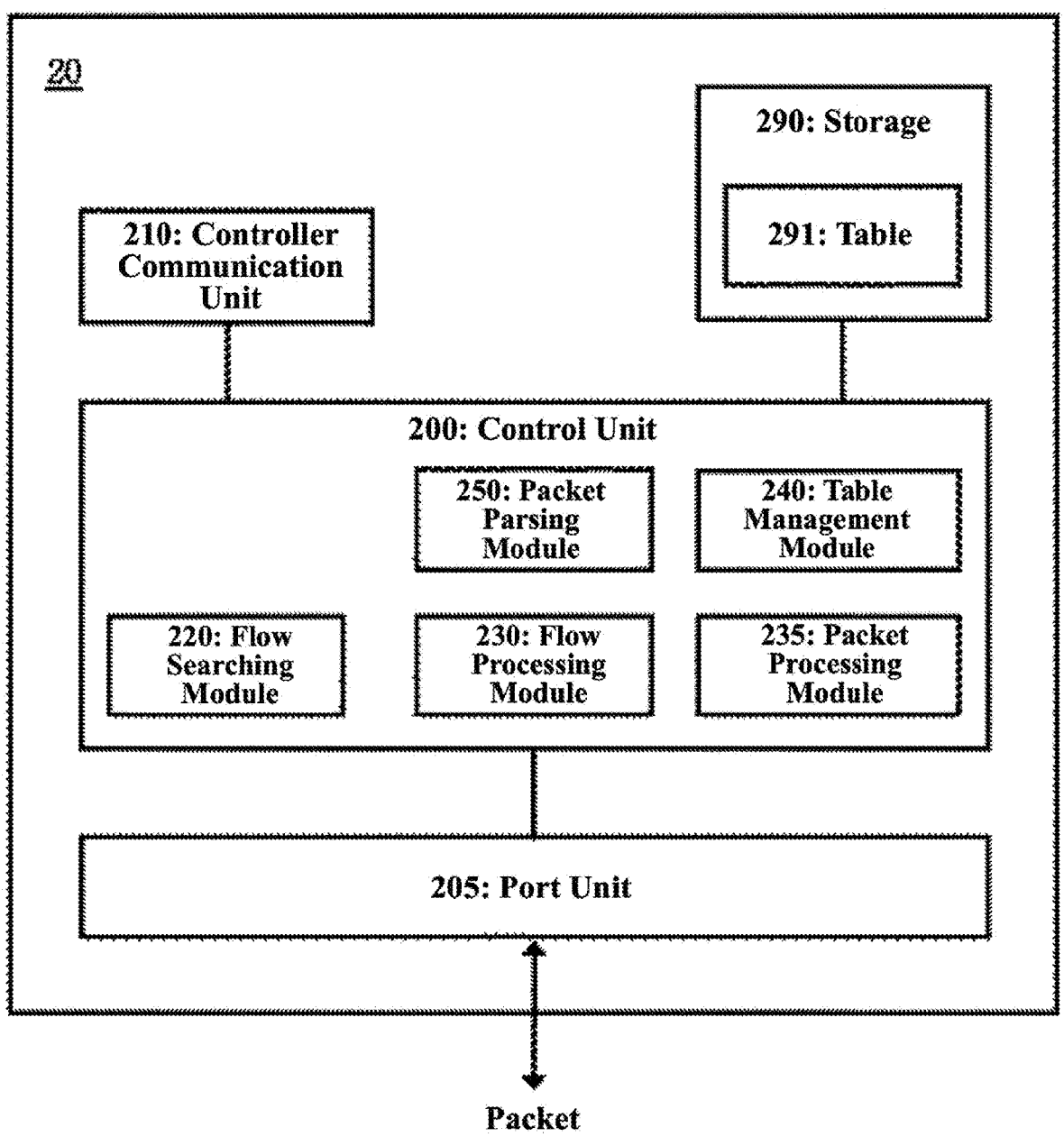
FIG. 6 is an example of a block diagram of a switch of a network packet broker device.

Referring to FIG. 6, the switch 20 may include a port unit 205 which communicates with another switch and/or a network device, an SDN controller communication unit 210 which communicates with the SDN controller 10, a switch control unit 200, and a storage 290.

The port unit 205 may include a plurality of pairs of ports ingressed or egressed from the switch or the network device. A pair of ports may be implemented as one port.

The storage 290 may store a program for processing and controlling the switch control unit 200. The storage 290 may perform a function of temporarily storing data (packets or messages) to be input or output. The storage 290 may include a table 291 such as a flow table, a group table, and a meter table. The table 291 or the entry of the table may be added, modified, or deleted by the SDN controller 10. The table entry may be destroyed by itself.

The switch control unit 210→200 may control an overall operation of the switch 200 by controlling an operation of each part. The control unit 210→200 may include a table management module 240 which manages the table 291, a flow searching module 220, a flow processing module 230, and a packet processing module 235. Each module may be configured in the control unit 200 as hardware or may be configured as separate software from the control unit 200.

The table management module 240 adds the entry received from the SDN controller 10 through the SDN controller communication unit 210 to an appropriate table or periodically removes a time-out entry. The flow searching module 220 may extract flow information from a received packet as a user traffic. The flow information may include identification information of an ingress port which is a packet incoming port of the edge switch, identification information of a packet incoming port of the switch, packet header information (an IP address, a MAC address, a port, and VLAN information of a transmission source and a destination), and metadata. The metadata may be selectively added from a previous table or added from the other switch. The flow searching module 220 may search whether there is a flow entry for a received packet in the table 291 by referring to the extracted flow information. When the flow entry is searched, the flow searching module 220 may request the flow processing module 260 to process the received packet in accordance with the searched flow entry. If the searching of the flow entry fails, the flow searching module 220 may transmit the received packet or minimum data of the received packet to the SDN control unit 100 through the SDN controller communication unit 210.

The flow processing module 230 may process an action of outputting or dropping the packet to a specific port or multiple ports in accordance with a procedure described in the entry searched by the flow searching module 220 or modifying a specific header field.

The flow processing module 230 may execute an action set when the flow processing module processes the pipeline process of the flow entry, executes an instruction to change the action, or cannot go to the next table from the plurality of flow tables.

The packet processing module 235 may actually output a packet processed by the flow processing module 230 to one or two or more ports of the port unit 205 designated by the flow processing module 230.

Even though not illustrated, the network packet broker device 6 may further include an orchestrator which generates, changes, and deletes a virtual network device and a virtual switch. When the virtual network device is generated, the orchestrator may provide information of the network device such as identification information of a switch to which the virtual network is connected, identification information of a port connected to the corresponding switch, a MAC address, an IP address, tenant identification information, and network identification information to the SDN controller 10.

Various information is exchanged between the SDN controller 10 and the switch 20, which is referred to as an openflow protocol message. The openflow message may include an SDN controller-switch message, an asynchronous message, and a symmetric message. Each message may include a transaction identifier (xid) which identifies an entry in the header.

The SDN controller-switch message is generated by the SDN controller 10 to be forwarded to the switch 20 and mainly used to manage or check the state of the switch 20. The SDN controller-switch message may be generated by the control unit 100 of the SDN controller 10, specifically, by the message management module 130.

The SDN controller-switch message may include features of inquiring capabilities of the switch, a configuration for inquiring and setting a setting of a configuration parameter of the switch 20, a modify state message) for adding/deleting/modifying flow/group/meter entries of the openflow table, a packet-out message which transmits a packet received from the switch through a packet-in message to a specific port on the switch. The modify state message may include a modify flow table message, a modify flow entry message, a modify group entry message, a port modification message, and a meter modification message.

The asynchronous message is generated by the switch 20 to be used for the SDN controller 10 to change the state of the switch or update the network event. The asynchronous message may be generated by the control unit 200 of the switch 20, specifically, the flow searching module 220.

The asynchronous message may include a packet-in message, a flow-remove message, and an error message. The packet-in message is used for the switch 20 to transmit the packet to the SDN controller 10 so that the packet is controlled. When the switch 20 receives an unknown packet, the packet-in message includes a received packet which is transmitted from the openflow switch 20 to the SDN controller 10 or all or a part of the copy thereof to request the data path. When the action of the entry associated with the incoming packet is determined to be sent to the SDN controller, the packet-in message is used. The flow-removed message is used to forward flow entry information to be removed from the flow table to the SDN controller 10. The message is generated when the SDN controller 10 requests the switch 20 to remove the flow entry or flow expiry processing due to the flow time-out is performed.

The symmetric message is generated by both the SDN controller 10 and the switch 20 and is transmitted even though there is no request from the opposite side. The symmetric message may include "hello" used to initiate the connection between the SDN controller and the switch, "echo" used to confirm there is no error in the connection between the SDN controller and the switch, and an error message which is used by the SDN controller or the switch to inform the opposite side of the problem. The error message may be generally used by the switch to represent the failure in accordance with the request initiated by the SDN controller.

The packet parsing module 250 interprets the header of the packet to extract one or more information about the packet.

The flow table may be configured by a plurality of flow tables for pipeline processing of the openflow. Referring to FIG. 7A, the flow entry of the flow table may include a tuple such as match fields which describe a condition (a comparison rule) matching the packet, a priority, a counter which is updated when there is a matching packet, an instruction which is a set of various actions generated when there is a matching packet in the flow entry, timeouts describing a time when it is destroyed in the switch, and a cookie which is an opaque type selected by the SDN controller, is used to filter the flow statistic, flow modification, and flow removal by the SDN controller and is not used at the time of packet processing. The instruction may change a pipeline processing to forward the packet to another flow table. Further, the instruction may include a set of actions which adds an action to an action set or a list of actions to be immediately applied to the packet. An action refers to an operation of modifying the packet by transmitting a packet to a specific packet or reducing a TTL field. The action may belong to a part of an instruction set associated with the flow entry or an action bucket associated with the group entry. The action set refers to a set obtained by accumulating actions indicated in each table. The action set may be performed when there is no matching table. FIG. 7B illustrates several packet processing by the flow entry.

Pipeline refers to a series of packet processing process between the packet and the flow table. When the packet is input to the switch 20, the switch 20 searches for a flow entry which matches the packet in the order of a high priority of a first flow table. When the packet matches, the switch 20 performs an instruction of the corresponding entry. The instruction may include a command (apply-action) which is performed as soon as the matching, a command (clear-action; write-action) which deletes, adds/modifies the contents of the action set, metadata modifying command (write-metadata), and a goto-table command which moves the packet to the designated table together with the metadata. When there is no flow entry which matches the packet, the packet may be dropped or may be loaded on the packet-in message to be sent to the SDN controller 10.

Figure 8A:
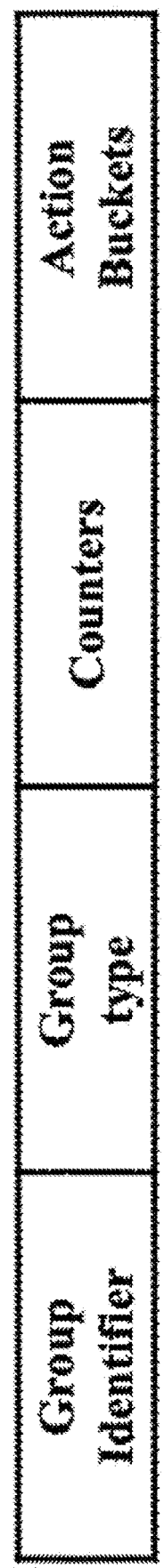
FIGS. 8A-B are field tables of a group and a meter table.

The group table may include group entries. The group table is instructed by the flow entry to propose additional forwarding methods. Referring to FIG. 8A, the group entry of the group table may include the following fields. The group entry may include a group identifier which distinguishes the group entry, a group type which specifies a rule on whether to perform some or all of the action buckets defined in the group entry, counters for statistics such as a counter of the flow entry, and action buckets which are a set of actions associated with parameters defined for a group.

Figure 8B:
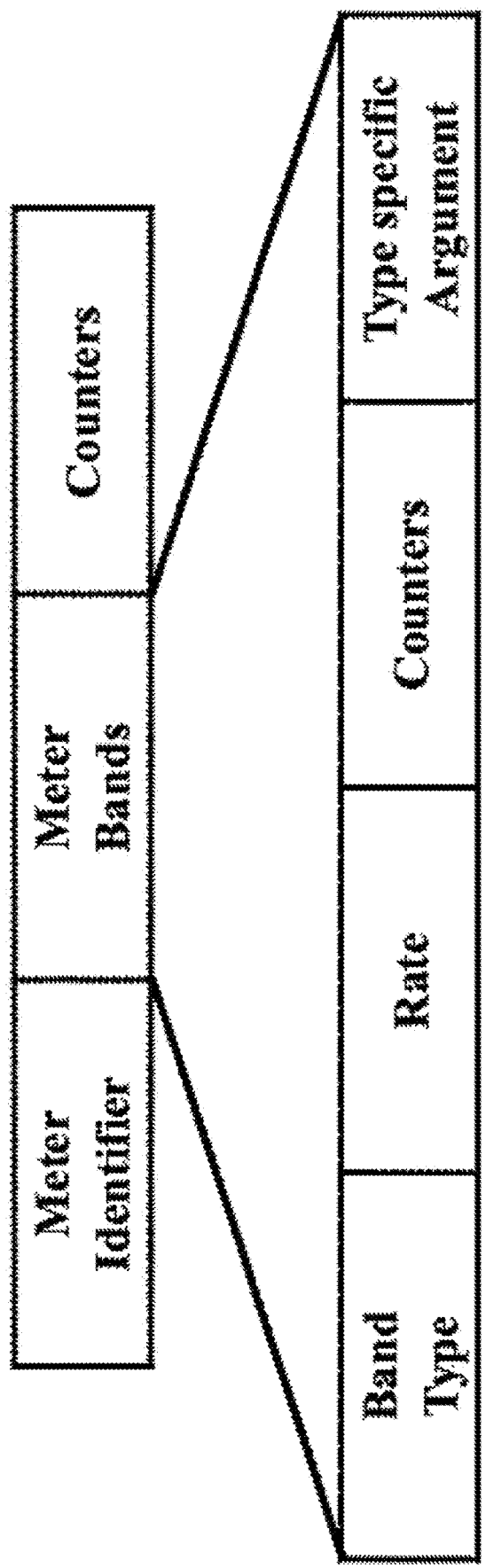

A meter table is configured by meter entries and defines per-flow meters. The per-flow meters allows the openflow to be applied to various QoS operations. The meter is a sort of switch element which measures and controls a rate of packets. Referring to FIG. 8B, the meter table is configured by fields such as a meter identifier which identifies a meter, meter bands which represent a speed and a packet operation method designated for the band, and counters which are updated when the packet is operated in the meter. The meter bands may be configured by fields such as a band type representing how to process the packet, a rate used to select a meter band by the meter, counters which are updated when the packets are processed by the meter band, and a specific argument type which is bad types having a selective argument.

The switch control unit 210→200 may control an overall operation of the switch 200 by controlling an operation of each part. The controller 210 may include a table management module 240 which manages the table 291, a flow searching module 220, a flow processing module 230, and a packet processing module 235. Each module may be configured in the control unit 110→100 as hardware or may be configured as separate software from the control unit 110→100.

The table management module 240 adds the entry received from the SDN controller 10 through the SDN controller communication unit 210 to an appropriate table or periodically removes a time-out entry.

The flow searching module 220 may extract flow information from a received packet as a user traffic. The flow information may include identification information of an ingress port which is a packet incoming port of the edge switch, identification information of a packet incoming port of the switch, packet header information (an IP address, a MAC address, a port, and VLAN information of a transmission source and a destination), and metadata. The metadata may be selectively added from a previous table or added from the other switch. The flow searching module 220 may search whether there is a flow entry for a reception packet in the table 291 by referring to the extracted flow information. When the flow entry is searched, the flow searching module 220 may request the flow processing module 260 to process the received packet in accordance with the searched flow entry. If the searching of the flow entry fails, the flow searching module 220 may transmit the received packet or minimum data of the received packet to the SDN control unit 100 through the SDN controller communication unit 210.

The flow processing module 230 may process an action of outputting or dropping the packet to a specific port or multiple ports in accordance with a procedure described in the entry searched by the flow searching module 220 or modifying a specific header field.

The flow processing module 230 may execute an action set when the flow processing module processes the pipeline process of the flow entry, executes an instruction to change the action, or cannot go to the next table from the plurality of flow tables.

The packet processing module 235 may actually output a packet processed by the flow processing module 230 to one or two or more ports of the port unit 205 designated by the flow processing module 230.

Even though not illustrated, the SDN network system may further include an orchestrator which generates, changes, and deletes a virtual network device and a virtual switch. When the virtual network device is generated, the orchestrator may provide information of the network device such as identification information of a switch to which the virtual network is connected, identification information of a port connected to the corresponding switch, a MAC address, an IP address, tenant identification information, and network identification information to the SDN controller 10.

Various information is exchanged between the SDN controller 10 and the switch 20, which is referred to as an openflow protocol message. The openflow message may include an SDN controller-switch message, an asynchronous message, and a symmetric message. Each message may include a transaction identifier (xid) which identifies an entry in the header.

The SDN controller-switch message is generated by the SDN controller 10 to be forwarded to the switch 20 and mainly used to manage or check the state of the switch 20. The SDN controller-switch message may be generated by the control unit 100 of the SDN controller 10, specifically, by the message management module 130.

The SDN controller-switch message may include features of inquiring capabilities of the switch, a configuration for inquiring and setting a setting of a configuration parameter of the switch 20, a modify state message) for adding/deleting/modifying flow/group/meter entries of the openflow table, a packet-out message which transmits a packet received from the switch through a packet-in message to a specific port on the switch. The modify state message may include a modify flow table message, a modify flow entry message, a modify group entry message, a port modification message, and a meter modification message.

The asynchronous message is generated by the switch 20 to be used for the SDN controller 10 to change the state of the switch or update the network event. The asynchronous message may be generated by the control unit 200 of the switch 20, specifically, the flow searching module 220.

The asynchronous message may include a packet-in message, a flow-removed message, and an error message. The packet-in message is used for the switch 20 to transmit the packet to the SDN controller 10 so that the packet is controlled. When the switch 20 receives an unknown packet, the packet-in message includes a received packet which is transmitted from the openflow switch 20 to the SDN controller 10 or all or a part of the copy thereof to request the data path. When the action of the entry associated with the incoming packet is determined to be sent to the SDN controller, the packet-in message is used. The flow-removed message is used to forward flow entry information to be removed from the flow table to the SDN controller 10. The message is generated when the SDN controller 10 requests the switch 20 to remove the flow entry or flow expiry processing due to the flow time-out is performed.

The symmetric message is generated by both the SDN controller 10 and the switch 20 and is transmitted even though there is no request from the opposite side. The symmetric message may include "hello" used to initiate the connection between the SDN controller and the switch, "echo" used to confirm there is no error in the connection between the SDN controller and the switch, and an error message which is used by the SDN controller or the switch to inform the opposite side of the problem. The error message may be generally used by the switch to represent the failure in accordance with the request initiated by the SDN controller.

The group table may include group entries. The group table is instructed by the flow entry to propose additional forwarding methods. Referring to FIG. 8A, the group entry of the group table may include the following field. The group entry may include a group identifier which distinguishes the group entry, a group type which specifies a rule on whether to perform some or all of the action buckets defined in the group entry, counters for statistics such as a counter of the flow entry, and action buckets which are a set of actions associated with parameters defined for a group.

A meter table is configured by meter entries and defines per-flow meters. The per-flow meters allows the openflow to be applied to various QoS operations. The meter is a sort of switch element which measures and controls a rate of packets. Referring to FIG. 8B, the meter table is configured by fields such as a meter identifier which identifies a meter, meter bands which represent a speed and a packet operation method designated for the band, and counters which are updated when the packet is operated in the meter. The meter bands may be configured by fields such as a band type representing how to process the packet, a rate used to select a meter band by the meter, counters which are updated when the packets are processed by the meter band, and a specific argument type which is bad types having a selective argument.

Figure 9:
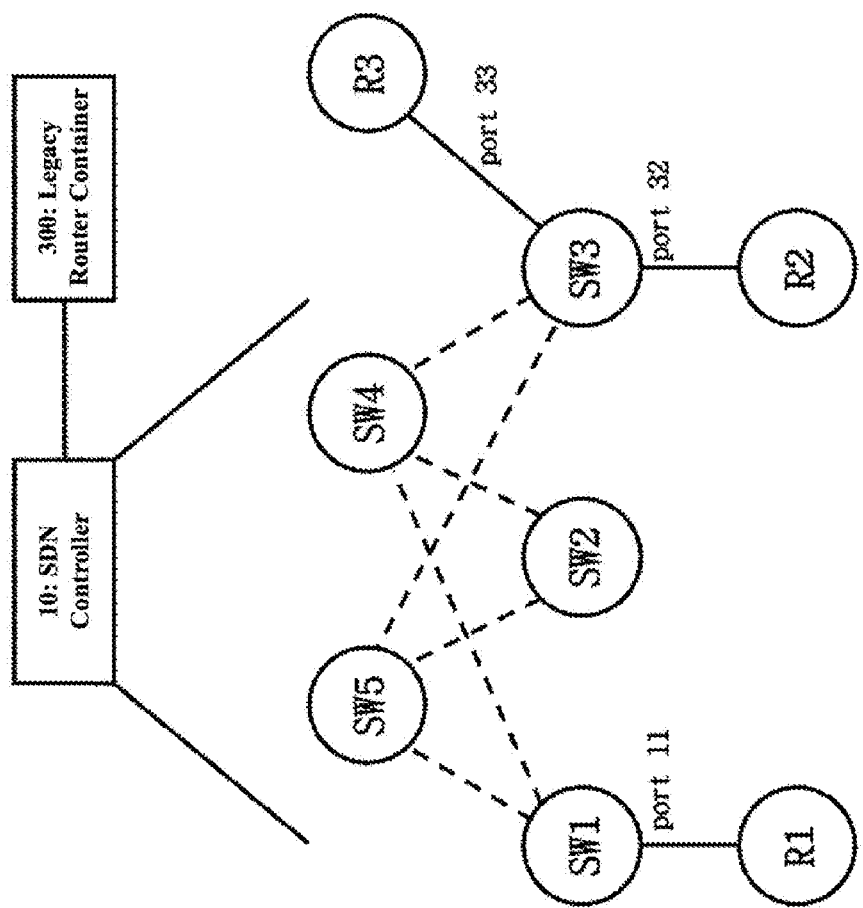
FIG. 9 is a block diagram of a network system including a routing system according to an embodiment of the present invention.

Referring to FIG. 9, the network packet broker device 6 according to the embodiment of the present invention includes a switch group 20 including first to fifth switches SW1 to SW5, an SDN controller 10, and a legacy router container 300. The first and third switches SW1 and SW5→SW3 which are edge switches coupled to an external network among the first to fifth switches SW1 to SW5 are openflow switches which support the openflow protocol. The openflow switch may be physical hardware, virtualized software, or a combination of the hardware and software.

In the present embodiment, the first switch SW1 is an edge switch coupled to the first legacy router R1 through an eleventh port, port 11 and the third switch SW3 is an edge switch which is coupled to the second and third legacy routers R2 and R3 through a thirty-second and thirty-third ports port 32 and port 33. The switch group may further include a plurality of network devices (denoted by 2, 3, and 4 or not illustrated) coupled to the first to fifth switches.

Figure 10:
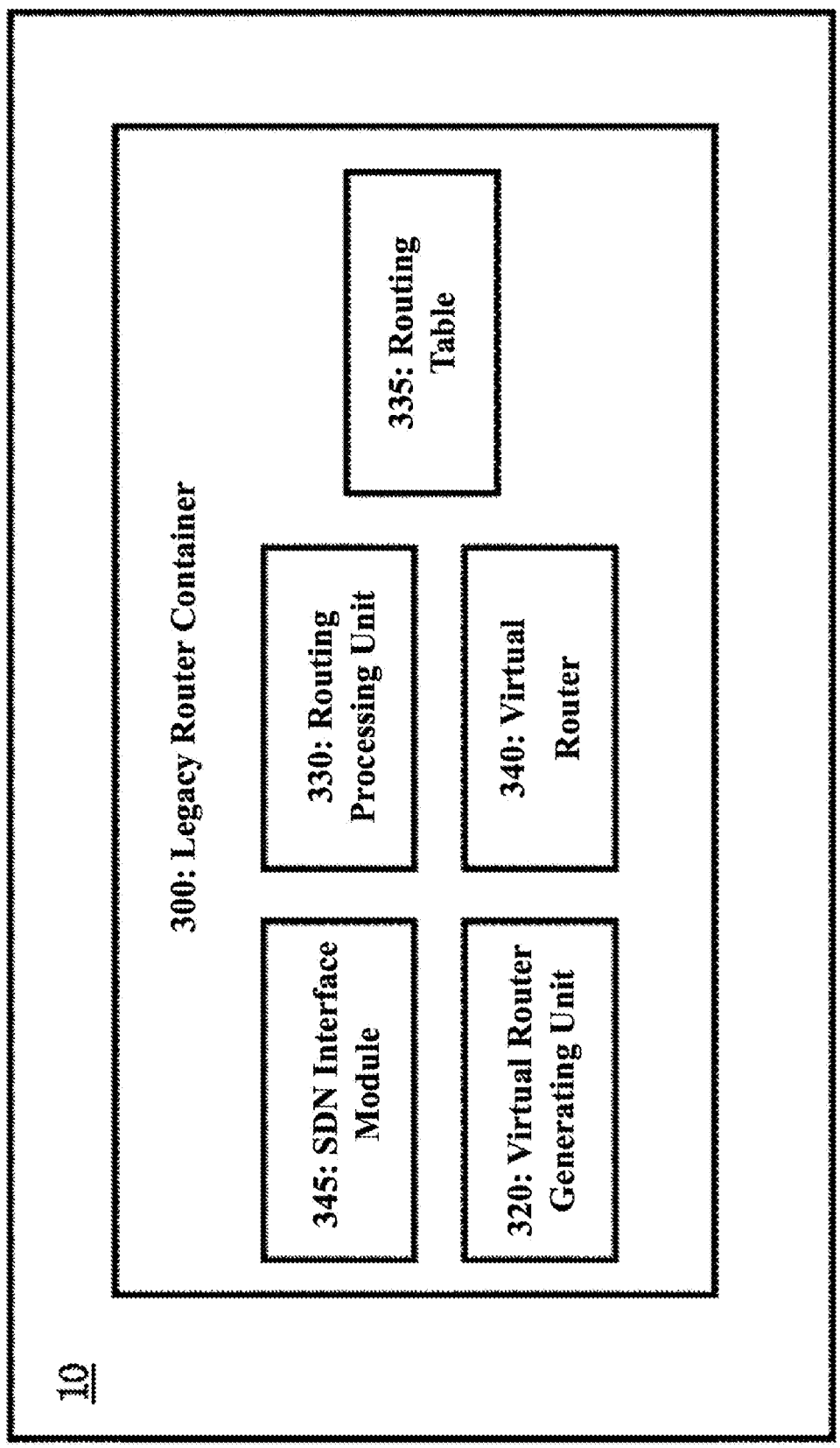
FIG. 10 is a block diagram of a legacy router container according to an embodiment of the present invention.

Referring to FIG. 10, the legacy router container 300 may include an SDN interface module 345, a virtual router generating unit 320, a virtual router 340, a routing processing unit, and a routing table 335.

The SDN interface module 345 may communicate with the controller 10. The legacy interface module 145 and the SDN interface module 345 may serve as interfaces of the controller 10 and the legacy router container 300, respectively. The legacy interface module 145 and the SDN interface module 345 may communicate in a specific protocol or a specific language. The legacy interface module 145 and the SDN interface module 345 may translate or interpret a message exchanged between the controller 10 and the legacy router container 300.

The virtual router generating unit 320 may generate and manage the virtual router 340 using topology information of a switch group received through the SDN interface module 345. The switch group may be treated as a legacy router in the external legacy network, that is, in first to third routers R1 to R3, through the virtual router 340.

Figure 11A:
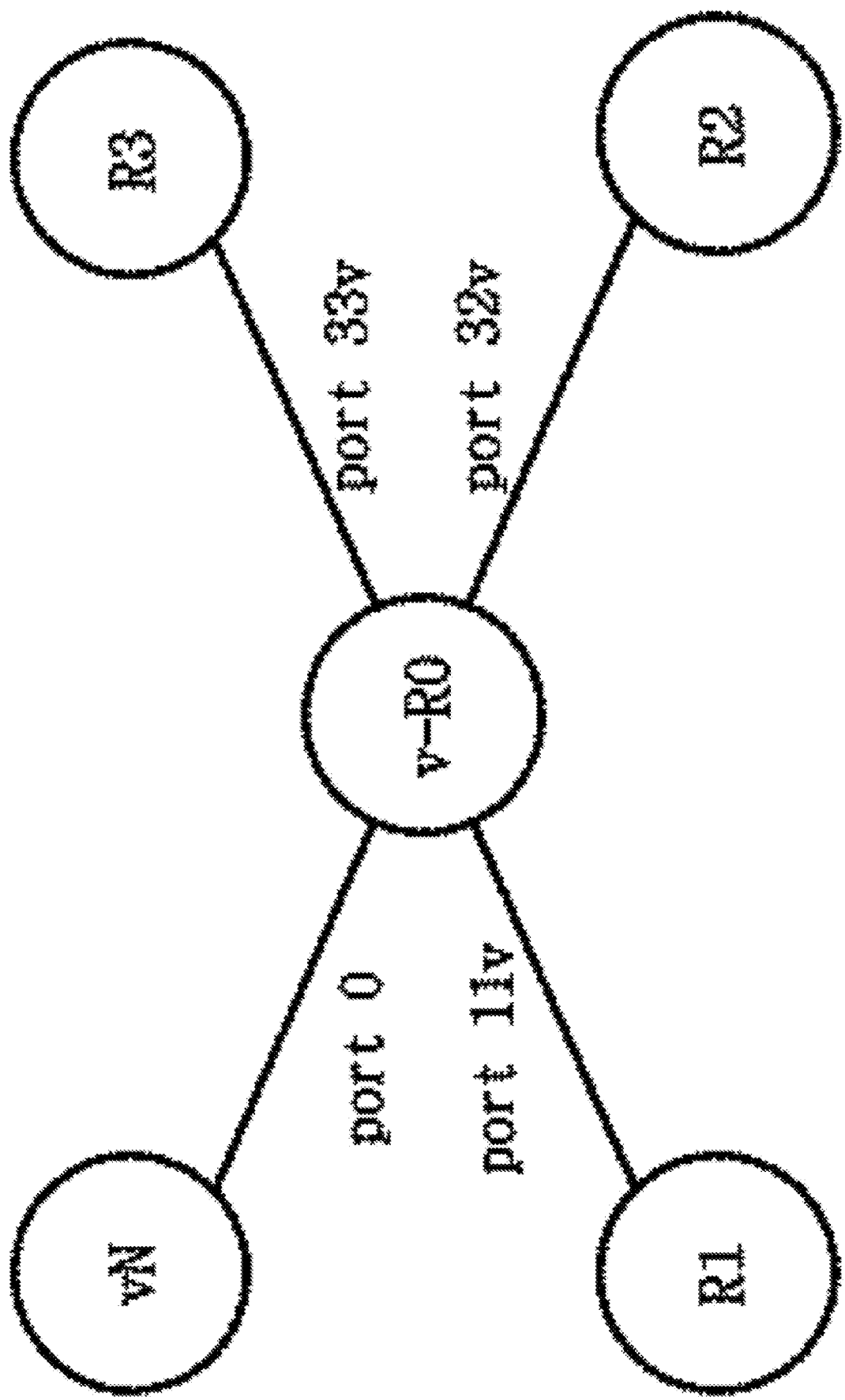
FIGS. 11A-B are virtualized block diagrams of a network system of FIG. 9.

The virtual router generating unit 320 may allow the virtual router 340 to include a port for a virtual router corresponding to edge ports of the edge switches of the switch group, that is, the first and third edge switches SW1 and SW3. For example, as illustrated in FIG. 11A, a port of v-R0 virtual legacy router may use information of the eleventh port, port 11 of the first switch SW1 and thirty-second and thirty third ports port 32 and port 33 of the third switch SW3 as it is.

Figure 11B:
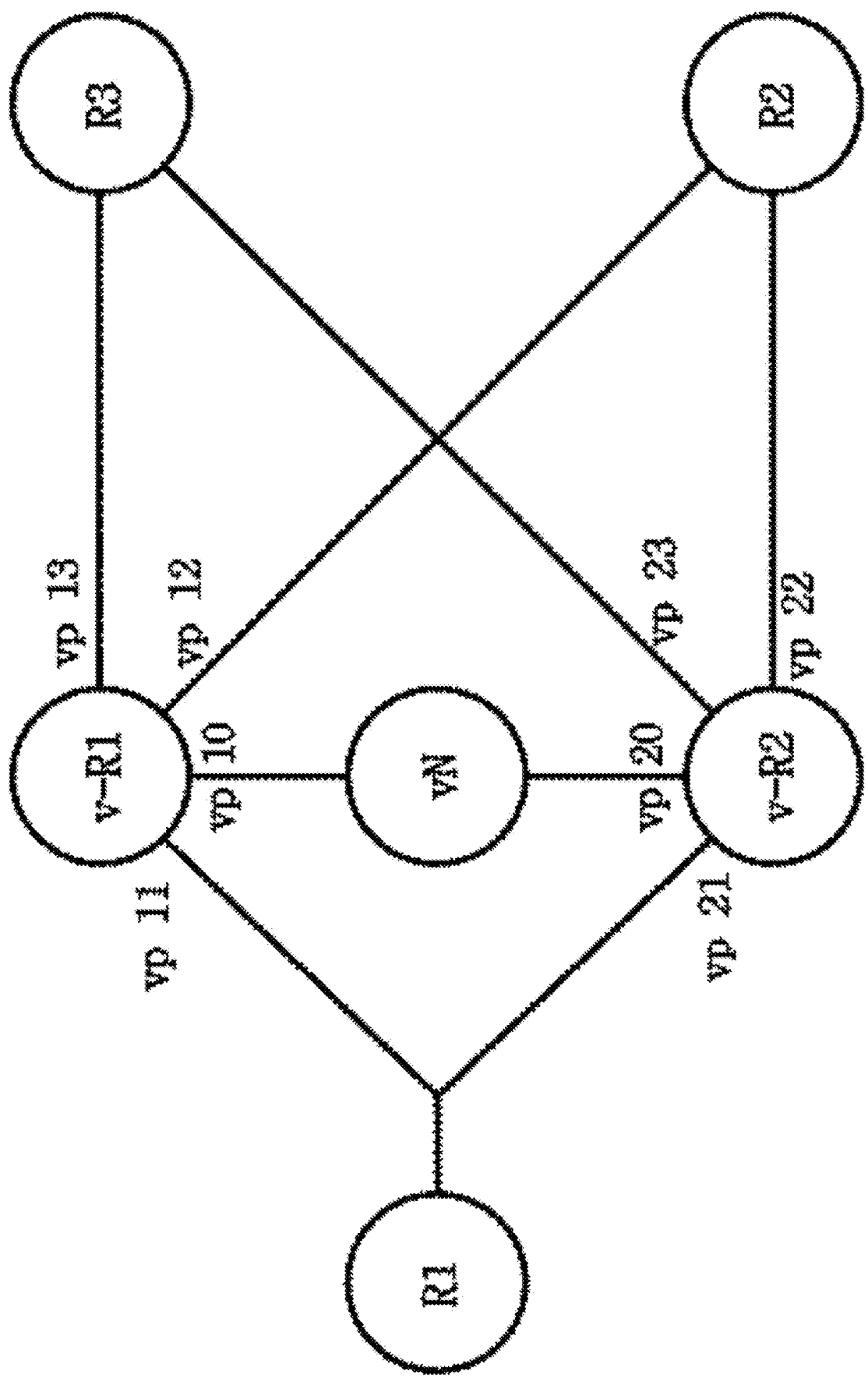

The port of the virtual router 340 may be associated with the identification information of the packet. The identification information of the packet may be tag information such as vLAN information of a packet and a tunnel ID added to the packet when it is coupled through a mobile communication network. In this case, a plurality of virtual router ports may be generated with one actual port of the openflow edge switch. The virtual router port associated with the identification information of the packet may contribute to allowing the virtual router 340 to operate as a plurality of virtual legacy routers. When the virtual router is generated only with a physical port (actual port) of the edge switch, the number of physical ports may be limited. However, when the virtual router port is associated with the packet identification information, the limitation is removed. Further, the virtual router port may operate similar to the flow in the legacy network of the existing packet. Further, the virtual legacy router may be driven for every user or for every user group. The user or the user group may be divided with packet identification information such as vLAN or a tunnel ID. Referring to FIG. 11B, the switch group is virtualized with a plurality of virtual legacy routers v-R1 and v-R2 and each port vp 11 to 13 and vp 21 to 23 of the plurality of virtual legacy routers v-R1 and v-R2 may be associated with the identification information of the packet.

Referring to FIG. 11B, the plurality of virtual legacy routers v-R1 and v-R2 and the legacy router may be connected by a plurality of sub interfaces divided from one actual interface of the first legacy router R1 or by a plurality of actual interfaces such as second and third legacy routers R2 and R3.

The virtual router generating unit 320 may allow a plurality of network devices in which the first to third routers R1 to R3 are coupled to the first to fifth switches SW1 to SW5 to be treated as an external network vN coupled to the virtual router 340. By doing this, the legacy network may access network devices of an openflow switch group. Referring to FIG. 7A, the virtual router generating unit 320 generates a zeroth port, port 0 in a zeroth virtual legacy router v-R0. Referring to FIG. 7B, the virtual router generating unit 320 generates tenth and twentieth ports vp 10 and vp 20 in the first and second virtual legacy routers v-R1 and v-R2. Each generated port, port 0, vp 10 and vp 20 may have information indicating that a plurality of network devices of a switch group is connected. The external network vN may be configured by all or some of the plurality of network devices.

Information of ports port 0, port 11v, port 32v, port 33v, vp 10 to 13, and vp 20 to 23 for virtual router may have the port information of the legacy router. For example, the port information for a virtual router may include an MAC address, an IP address, a port name of the port for a virtual router, an address range of the connected network, and legacy router information and may further include a vLAN range and a tunnel ID range. The port information may inherit edge port information of the first and third edge switches SW1 and SW3 as described above or may be designated by the virtual router generating unit 320.

A data plane of a network of FIG. 9 which is generated in the virtual router 340 by the virtual router 340 may be virtualized as illustrated in FIG. 11A or 11B. For example, as illustrated in FIG. 11A, in the virtualized network, the first to fifth switches SW1 to SW5 are virtualized by the virtual legacy router v-R0, eleventh v, thirty-second v, and thirty-third v ports port 11v, port 32v, and port 33v of the zeroth virtual legacy router v-R0 are connected to the first to third legacy routers R1 to R3 and the zeroth port port0 of the zeroth virtual legacy router v-R0 is connected to the external network vN which is at least some of the plurality of network devices.

When the virtual router 340 is generated, the routing processing unit 330 may generate a routing table 335. The routing table 335 is a table used for referencing the routing in the legacy router. The routing table 335 may be configured by some or all of RIB, FIB, and ARP tables. The routing table 335 may be modified or updated by the routing processing unit 330.

The routing processing unit 330 may generate a legacy routing path for a flow inquired by the controller 10. The routing processing unit 330 may generate legacy routing information using some or all of the received packet received by the openflow switch equipped in the flow, port information to which the received packet incomes, information of the virtual router 340, and the routing table 335.

The routing processing unit 330 may include a third party routing protocol stack to determine the legacy routing.

FIG. 12 is a flowchart illustrating a method for determining legacy routing of a flow of an SDN controller.

The method for determining legacy routing of a flow means whether the controller 10 performs normal SDN control on a flow received from the openflow switch or inquires of the legacy router container 300 about flow control.

Referring to FIG. 12, the controller 10 determines whether the flow ingress port is an edge port in step S510. If the flow ingress port is not an edge port, the controller 10 may perform SDN-based flow control by calculating a path for a normal openflow packet in step S590.

If the flow ingress port is an edge port, the controller 10 determines whether the packet of the corresponding flow can be interpreted in step S520. If the packet cannot be interpreted, the controller 10 may forward the flow to the legacy router container 300 in step S550. This is because if the packet is a protocol message used only in the legacy network, a normal SDN-based controller cannot interpret the packet.

If the received packet is a legacy packet which is transmitted from a first legacy network to a second legacy network, the SDN based controller 10 cannot calculate a routing path of the incoming legacy packet. Therefore, when the path cannot be calculated by the controller 10 like the legacy packet, the controller 10 desirably transmits the legacy packet to the legacy router container 300. However, when an edge port of the legacy packet to be egressed and the final processing method of the legacy packet are known, the controller 10 may process the legacy packet by modifying the flow. Therefore, when the packet can be interpreted, the controller 10 may search for a flow path such as whether the path of the flow can be calculated or whether there is an entry in the entry table. If the path is not searched, the controller 10 may forward the flow to the legacy router container 300 in step S550. If the path is searched, the controller 10 may generate a packet-out message indicating an output of the packet to transmit the packet-out message to an openflow switch which inquires the packet in step S540. A detailed example thereof will be described below.

Figure 13:
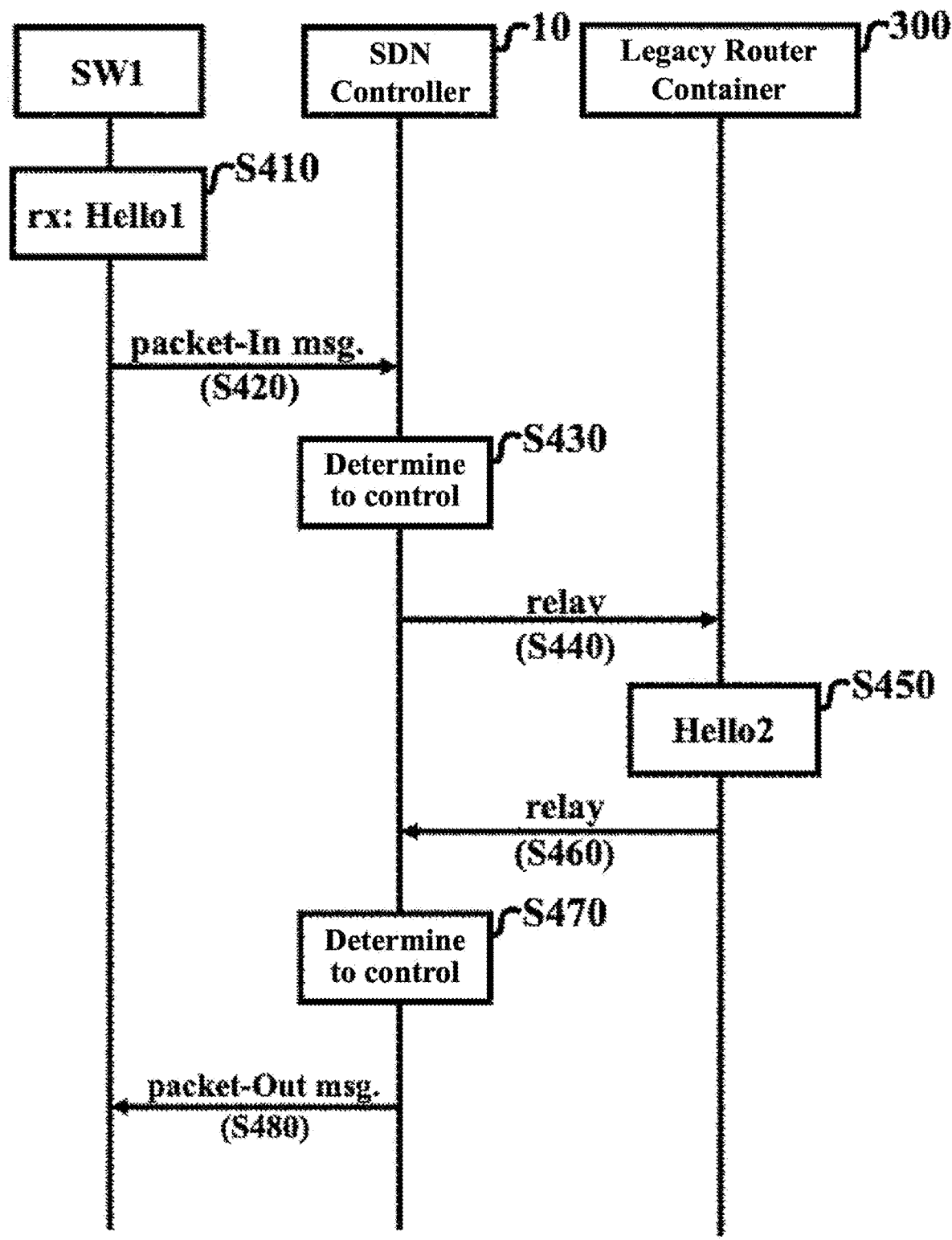
FIG. 13 is a signal flowchart of an integrated routing method according to an embodiment of the present invention.

FIG. 13 illustrates a flow of processing a legacy protocol message in an SDN based network to which the present invention is applied. As an example, in FIG. 13, a first edge switch SW1 receives a hello message of an open shortest path first (OSPF) protocol.

In this example, it is assumed that the openflow switch group is virtualized by the SDN controller 10 and the legacy router container 300 as illustrated in FIG. 11A.

Referring to FIG. 13, when a first legacy router R1 and a first edge switch SW1 are coupled, the first legacy router R1 may transmit a hello message Hello1 of the OSPF protocol to the first edge switch SW1 in step S410.

Since there is no flow entry for the received packet in a table 291 of the first edge switch SW1, the first edge switch SW1 may transmit a packet-in message informing an unknown packet to the SDN controller 10 in step S420. The packet-in message desirably includes a flow including Hello1 packet and ingress port, port 11 information.

The message management module 130 of the SDN controller 10 may determine whether a processing rule for the flow can be generated in step S430. Details of the determining method will be described with reference to FIG. 14. In this example, the OSPF protocol message is a packet which cannot be interpreted by the SDN controller 10 so that the SDN controller 10 may forward the corresponding flow to the legacy router container 300 in step S440.

The SDN interface module 345 of the legacy router container 300 may transmit the Hello1 packet forwarded from the SDN controller 10 to a port, port 11*v* of the virtual router 340 corresponding to the ingress port port11 of the first edge switch SW1 equipped in the flow. When the virtual router 340 receives the Hello1 packet, the routing processing unit 330 may generate legacy routing information of the Hello1 packet based on the routing table 335 in step S450. In the present embodiment, the routing processing unit 330 generates a Hello2 message corresponding to the Hello1 message and generates a routing path which designates the eleventh v port, port 11*v* as an output port to transmit the Hello2 packet to the first legacy router R1. The Hello2 message includes a destination which is a first legacy router R1 and a predetermined virtual router identifier. The legacy routing information may include the Hello2 packet and an output port which is the eleventh v port. In the present embodiment, even though it is described that the Hello1 packet is ingressed to the virtual router 340, the present invention is not limited thereto and the routing processing unit 330 may generate the legacy routing information using the information of the virtual router 340.

The SDN interface module 345 may forward the generated legacy routing information to the legacy interface module 145 of the SDN controller 10 in step S460. Any one of the SDN interface module 345 and the legacy interface module 145 may convert the eleventh v port, port 11*v* which is an output port into an eleventh port, port 11 of the first edge switch SW1. Alternatively, the names of the eleventh v port and the eleventh port are set to be the same, the port conversion may be omitted.

The path calculating module 125 of the SDN controller 10 may set a path to output the Hello2 packet to the eleventh port, port 11 of the first legacy router R1 using the legacy routing information received by the legacy interface module 145 in step S470.

The message management module 130 may generate a packet-out message which outputs the Hello2 packet to the eleventh port, port 11 which is an ingress port using the set path and the legacy routing information to transmit the packet-out message to the first legacy router R1 in step S480.

In the present embodiment, it is described to correspond to the Hello message of the external legacy router, but the present invention is not limited thereto. For example, the legacy router container 300 generates an OSPF hello message which will be actively output to the edge port of the edge switch and transmits the OSPF hello message to the SDN controller 10. In this case, the SDN controller 10 may transmit the Hello packet as a packet-out message to the openflow switch Further, even though the packet-out message does not correspond to the packet-in message, the openflow switch is set to do as instructed by the packet-out message, so that the present embodiment is implemented.

Figure 14:
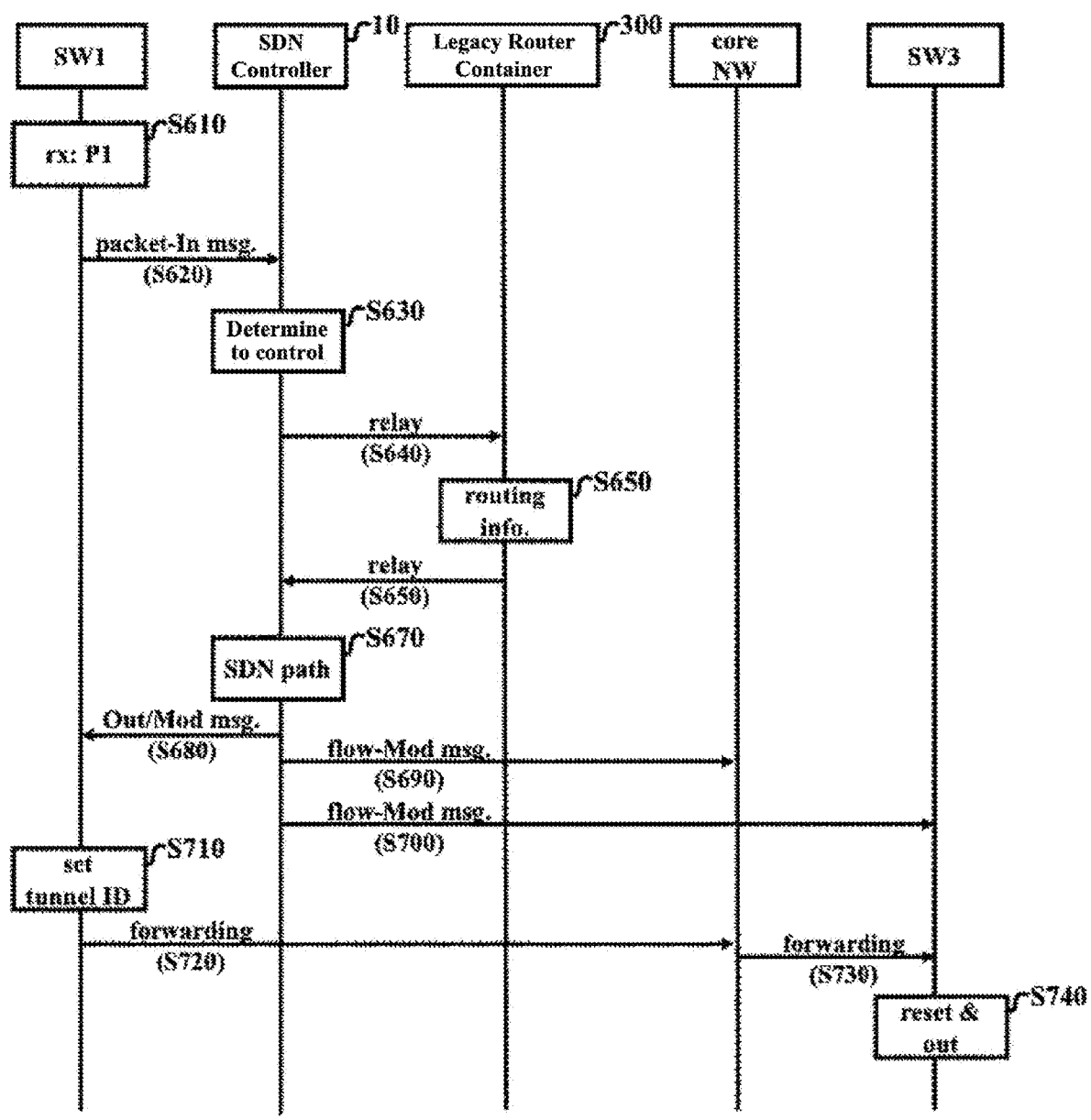
FIG. 14 is a signal flowchart of an integrated routing method according to another embodiment of the present invention.

FIG. 14 illustrates that a normal legacy packet is transmitted from a first edge switch SW1 to a third edge switch SW3.

The first edge switch SW1 starts by receiving a legacy packet P1 in which a destination IP address does not belong to the openflow switch group from a first legacy router R1 in step S610.

Since there is no flow entry for a packet P1, the first edge switch SW1 transmits a packet P1 to the SDN controller 10 and inquires the flow processing (packet-in message) in step S620.

The message management module 130 of the SDN controller 10 may determine whether the SDN control for the corresponding flow is possible in step S630. In the present example, even though the packet P1 can be interpreted, the packet P1 is directed to the legacy network, so that the SDN controller 10 cannot generate the path of a packet P1. Therefore, the SDN controller 10 may transmit the packet P1 and the eleventh port which is an ingress port to the legacy router container 300 through the path calculating module 125 in step S640.

The routing processing unit 330 of the legacy router container 300 may generate legacy routing information of a packet P1 forwarded from the SDN controller 10 based on information of the virtual router 340 and the routing table 335 in step S650. In this example, it is assumed that the packet P1 needs to be output to a thirty-second v port, port 32*v* of the virtual router. In this case, the legacy routing information may include an output port which is the thirty-second v port, port 32*v*, a destination MAC address which is an MAC address of the second legacy router R2, and a source MAC address which is an MAC address of the thirty-second v port with respect to the packet P1. The information is header information of a packet which is output from the legacy router. For example, when the first legacy router R1 transmits the packet P1 by considering the virtual legacy router v-R0 as a legacy router, the header information of the packet P1 is as follows. Since the source and destination IP addresses are the same as the header information when the packet P1 is generated, the description thereof will be omitted. The source MAC address of the packet P1 is an MAC address of an output port of the router R1. The destination MAC address of the packet P1 is an MAC address of the eleventh v port, port 11*v* of the virtual legacy router v-R0. In the case of an existing router, a packet P1' which is output to the thirty-second v port, port 32*v* of the virtual legacy router v-R0 may have the following header information. The source MAC address of the packet P1' is an MAC address of the thirty-second v port, port 32*v* of the virtual legacy router v-R0 and the destination MAC address is an MAC of the ingress port of the second legacy router. That is, a part of the header information of the packet P1 is changed at the time of legacy routing.

In order to correspond to the legacy routing, the routing processing unit 330 generates a packet P1' obtained by adjusting the header information of the packet P1 to be included in the legacy routing information. In this case, for the same packet or a similar packet having the same destination address range, the SDN controller 10 or the legacy router container 300 processes the ingress packet every time. Accordingly, in a step of changing a packet to have a format after the existing routing, it is desirable to perform the packet manipulation by the edge switch (a third edge switch SW3 in this embodiment) which outputs the packet to the external legacy network, rather than the legacy router container 300. To this end, the above-described legacy routing information may include source and destination MAC addresses. The SDN controller 10 may transmit a flow modification flow-Mod message to change the header information of the packet P1' to the third edge switch using the routing information.

The SDN interface module 345 may forward the generated legacy routing information to the legacy interface module 145 of the SDN controller 10 in step S660. In this step, the output port may be converted to an edge port to be mapped.

The path calculating module 125 of the SDN controller 10 may calculate a path which is output from the first edge switch SW1 to the thirty-second port of the third edge switch SW3 using legacy routing information received through the legacy interface module 145 in step S670.

The message management module 130 transmits a packet-out message which designates an output port for the packet P1 to the first edge switch SW1 based on the calculated path in step S680 and transmits a flow modification flow-Mod message to the openflow switch of the corresponding path in steps S690 and S700. The message management module 130 may also transmit a flow modification flow-Mod message to specify the processing for the same flow, to the first edge switch SW1.

Figure 15B:
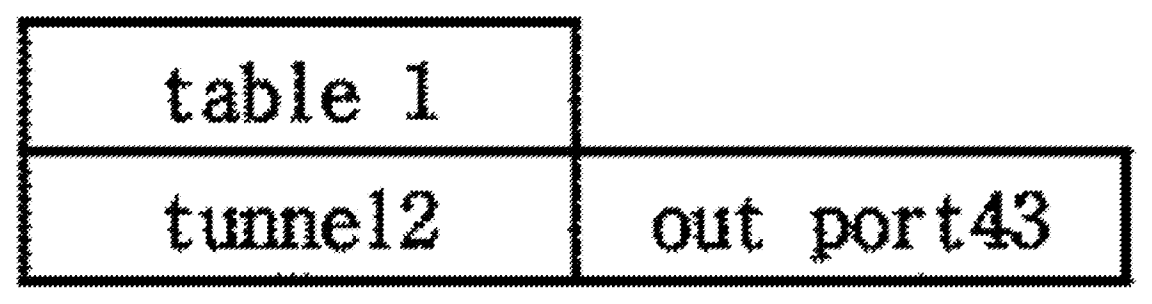

It is desirable to perform the flow processing on the packet P1 based on an identifier for identifying the legacy flow. To this end, a packet P1 with a legacy identifier tunnel ID is included in a packet-out message which is transmitted to the first edge switch SW1 and the flow modification message includes a flow entry which adds the legacy identifier tunnel ID. An example of a flow table of each switch is illustrated in FIGS. 15A-C. FIG. 15A is a flow table of a first edge switch SW1. For example, in a table 0 of FIG. 15A, tunnel2 is added to a flow which is directed to the second legacy router R2 as a legacy identifier and the flow moves to a table 1. The legacy identifier may be written in a meta field or other fields. A table 1 includes a flow entry which outputs a flow with tunnel2 to a fourteenth port (port information of a first switch SW1 connected to the fourth switch SW4). FIG. 15B is an example of a flow table of a fourth switch SW4. In the table of FIG. 15B, a flow with a legacy identifier tunnel2 among the flow information is output to the forty-third port (port 43) connected to the third switch SW3. FIG. 15C is an example of a flow table of a third switch SW3. In a table 0 of FIG. 15C, a legacy identifier of a flow with a legacy identifier tunnel2 is removed and the flow moves to a table 1. The table 1 outputs the flow to the thirty-second port. As described above, when a plurality of tables is used, the number of cases is reduced. Therefore, a quick search is possible and a consumption of resources such as a memory may be reduced.

The first edge switch SW1 adds the legacy identifier tunnel ID to the packet P1 in step S710 or transmits a packet with a legacy identifier tunnel ID to a core network in step S720. The core network refers to a network configured by openflow switches SW2, SW4, and SW5 rather than the edge switches SW1 and SW3.

The core network may transmit the corresponding flow to the third edge switch SW3 in step S730. The third edge switch SW3 removes the legacy identifier and outputs the packet P1 to a designated port in step S740. In this case, even though not illustrated in the flow table of FIG. 15C, the flow table of the third switch SW3 desirably includes a flow entry which changes the destination and source MAC addresses of the packet P1.

The flow table may be configured by a plurality of flow tables for pipeline processing of the openflow. Referring to FIG. 7A, the flow entry of the flow table may include a tuple such as match fields which describe a condition (a comparison rule) matching the packet, a priority, a counter which is updated when there is a matching packet, an instruction which is a set of various actions generated when there is a matching packet in the flow entry, timeouts describing a time when it is destroyed in the switch, and a cookie which is an opaque type selected by the SDN controller, is used to filter the flow statistic, flow modification, and flow removal by the SDN controller and is not used at the time of packet processing. The instruction may change a pipeline processing to forward the packet to another flow table. Further, the instruction may include a set of actions which adds actions to an action set or a list of actions to be immediately applied to the packet. An action refers to an operation of modifying the packet by transmitting a packet to a specific port or reducing a TTL field. The action may belong to a part of an instruction set associated with the flow entry or an action bucket associated with the group entry. The action set refers to a set obtained by accumulating actions indicated in each table. The action set may be performed when there is no matching table. FIGS. 15A-C illustrates several packet processing by the flow entry.

Figure 16:
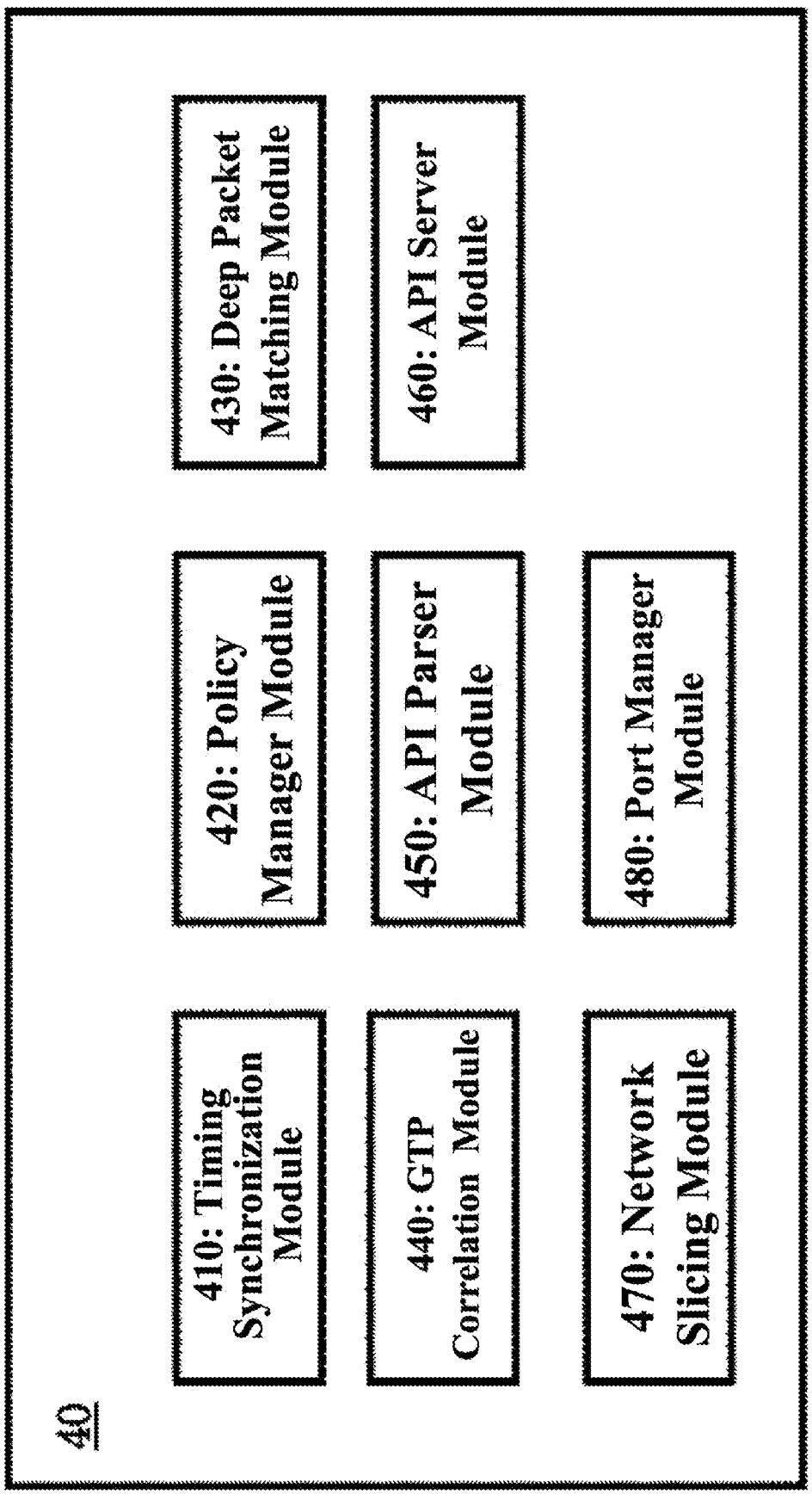
FIG. 16 illustrates a network application module according to an embodiment of the present invention.

Referring to FIG. 16, a network application module 40 according to an embodiment of the present invention may further include a timing synchronization module 410 which synchronizes timings with a time stamp value of the network device.

The network packet broker device 6 further includes a processor 801, the switch 20 further includes a processor 801, the processor 801 of the network packet broker device 6 includes a clock which replies a timing value and the processor 801 of the switch 20 includes a register which stores a time parameter elapsed from a reference time in the processor. When the switch 20 receives a request of assigning a time stamp of the packet, the timing synchronization module 410 stores a time stamp in a packet by correcting overflow of the time parameter from the register of the processor of a reference time switch.

Referring to FIG. 16, a network application module 40 according to an embodiment of the present invention may further include a policy manager module 420 which controls a quality of service (QoS). The policy manager module 420 stores and controls the processing method of the flow of the packet in accordance with the information of the packet.

Referring to FIG. 16, the network application module 40 according to the embodiment of the present invention may further include a deep packet matching module 430 which extracts, modifies, removes, or inserts a GTP header or VxLAN header of the flow packet.

Referring to FIG. 16, the network application module 40 according to the embodiment of the present invention may further include a GTP correlation module 440 which interworks to forward a GTP-C packet and a GTP-U packet of the flow packet to the same egress port. The GTP correlation module 440 classifies the GTP-U traffic and specifically, identifies a GTP-U TEID with Src IP (eNodeB IP of an up link and a SGW IP of a down link) of the GTP-U packet to be mapped to one IMSI. Further, the GTP correlation module 440 identifies an up link GTP-U traffic with eNB IP and S1-U SGW GTP-U interface tunnel ID of the packet and identifies a down link traffic with an SGW IP with S1-U eNodeB GTP-U interface tunnel ID to map both the traffics to one IMSI.

Referring to FIG. 16, the network application module 40 according to the embodiment of the present invention may further include a network slicing module 470 which performs an operation of generating, changing, and processing one or more virtual networks.

Referring to FIG. 16, the network application module 40 according to an embodiment of the present invention may further include an API parser module 450 which analyzes a procedure of changing information of the mapped network device.

Referring to FIG. 16, the network application module 40 according to an embodiment of the present invention may further include an API server module 460 which performs an operation in accordance with the procedure of changing information of the mapped network device.

Referring to FIG. 16, the network application module 40 according to the embodiment of the present invention may further include a network slicing module 470 which performs an operation of generating, changing, and processing one or more virtual networks.

Referring to FIG. 16, a network application module 40 according to the embodiment of the present invention may further include a port manager module 480 which controls a port 250 of the switch 20.

The port management module 480 sets the port 250 of the switch in an ingress, an egress, and a transit state and sets a single port or a group of ports.

Figure 17:
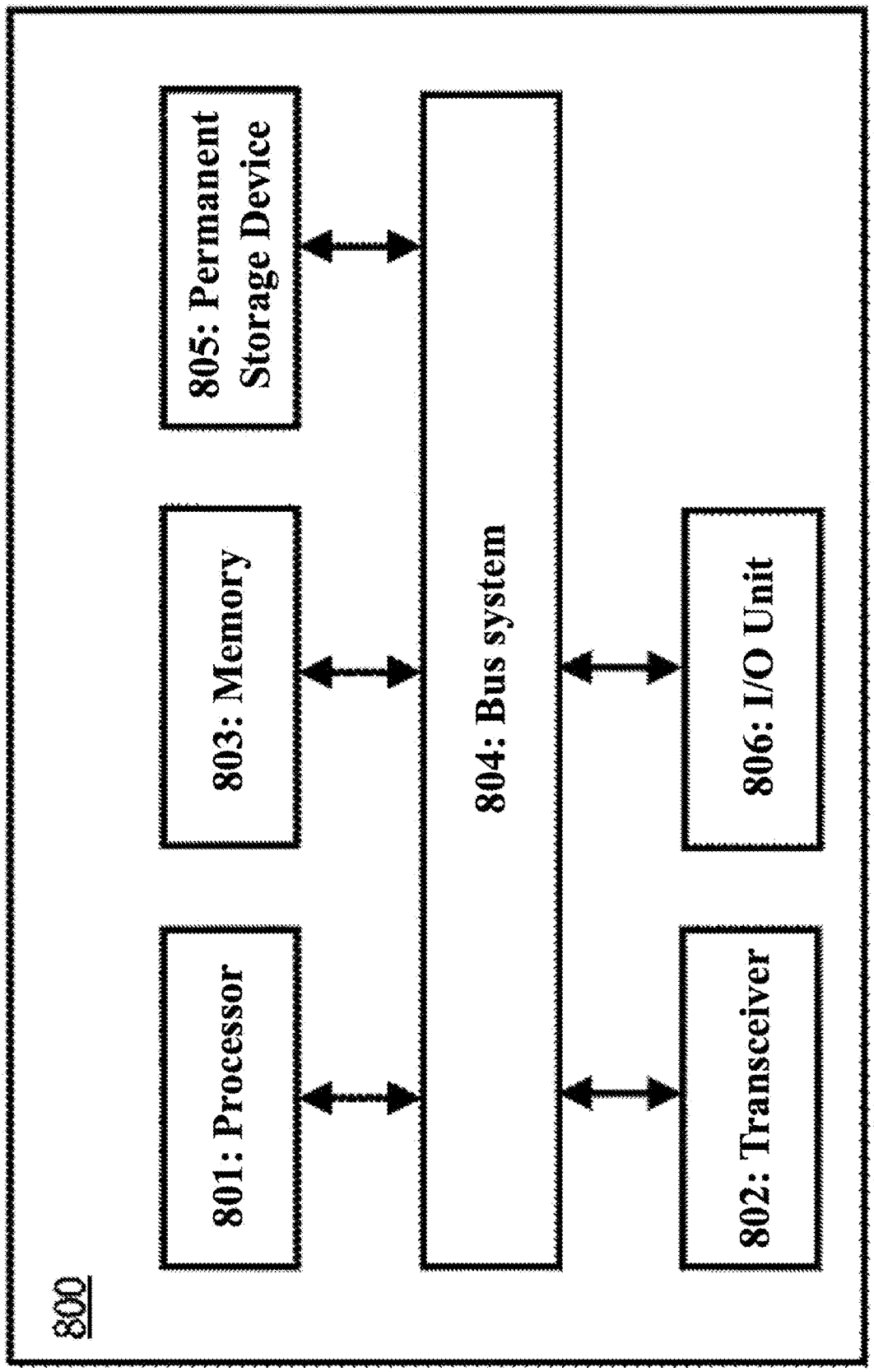
FIG. 17 is a block diagram of a control unit of a network packet broker system according to an embodiment of the present invention.

Referring to FIG. 17, the control unit 800 of the network packet broker device 6 according to the embodiment of the present invention may include a processor 801, a memory 803, a persistent storage device 805, a transceiver 802, a bus system 804, and an I/O unit 806. According to an exemplary embodiment, the processor 801 may be a microprocessor, a microcontroller, a complex instruction set computing microprocessor, a reduced instruction set computing microprocessor, a very long instruction word microprocessor, an explicit parallel instruction computing microprocessor, a graphic processor, a digital signal processor, an integrated circuit, an application specific integrated circuit, or any other type of similar and/or appropriate processing circuit or may be any type of physical computing circuit or hardware which is not limited thereto. The processor 801 may further include an embedded controller such as a general purpose or programmable logic device or array, an application specific integrated circuit, a single chip computer, or a smart card.

The transceiver 802 supports communication with another entity in the other system or a cellular network. For example, the transceiver 802 may include a wired/wireless transceiver which facilitates the communication through a network interface card or a network. The communication unit 802 may support the communication by any appropriate physical or communication link.

The memory 803 may be a volatile memory or a non-volatile memory. Various computer readable storage media may be stored in a memory element of the memory 803 or accessed by the memory element of the memory 803. The memory element may include any number of appropriate memory devices which stores data and a machine readable instruction, such as a ROM, a random access memory (RAM), an erasable programmable read only memory (EPROM), electrically EPROM (EEPROM), a hard driver, a removable medium driver which treats the memory card, a memory stick, and any other similar and/or appropriate type of memory storage device and/or a storage medium.

The persistent storage device 805 may include one or more components or devices which support longer-term data storage such as a read only memory (ROM), a hard driver, a flash memory, or an optical disk.

The I/O unit 806 permits the input and output of the data. For example, the I/O unit 806 may provide connection for user input through a keyboard, a mouse, a keypad, a touch screen, or any other appropriate input device. The I/O unit 806 may transmit the output to a display, a printer, or any other appropriate output device.

Figure 18:
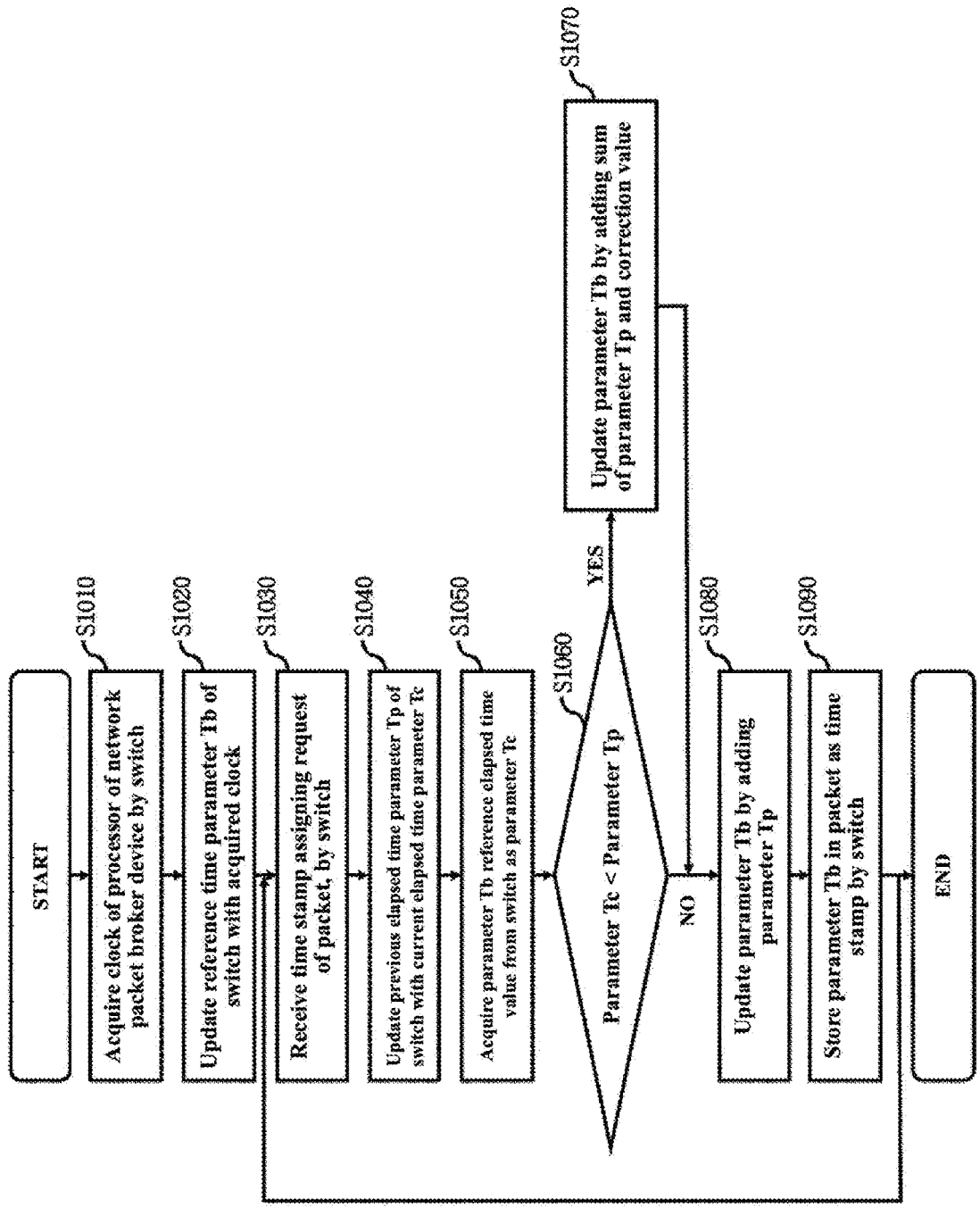
FIG. 18 illustrates an example of a method for assigning a time stamp of a packet according to an embodiment of the present invention.

FIG. 18 illustrates an example of a method for assigning a time stamp of a packet according to an embodiment of the present invention.

Referring to FIG. 18, a time stamp assigning method of a packet according to an embodiment of the present invention includes: acquiring a clock of a processor 801 of a network packet broker device 6 by a switch 20 in step S1010, updating a reference time parameter Tb of the switch 20 with the acquired clock in step S1020, receiving a time stamp assigning request of a packet by the switch 20 in step S1030, updating a previous elapsed time parameter Tp of the switch 20 with a present elapsed time parameter Tc by the timing synchronization module 410 in step S1040, acquiring a parameter Tb reference elapsed time value from the switch 20 as a parameter Tc by the timing synchronization module 410 in step S1050, comparing magnitudes of a parameter Tc and a parameter Tp by the timing synchronization module 410 in step S1060, if the parameter Tc is smaller than the parameter Tp, updating the parameter Tb by adding a sum of the parameter Tp and a correction value, by the timing synchronization module 410 in step S1070, if the parameter Tc is equal to or larger than the parameter Tp, updating the parameter Tb by adding the parameter Tb as much as the parameter Tp, by the timing synchronization module 410 in step S1080, and storing the parameter Tb of the switch 20 as a time stamp in the packet, by the timing synchronization module 410 in step S1090.

In the time stamp assigning method of a packet according to the embodiment of the present invention, the method of assigning a time stamp of the packet may use IEEE 1588 precision time protocol (PTP) synchronization protocol.

In the time stamp assigning method of a packet according to the embodiment of the present invention, the parameter Tp and the parameter Tc may be stored in the register of the processor 800 of the switch 20.

In the time stamp assigning method of a packet according to the embodiment of the present invention, a storage unit of the register may be less than 64 bits, and specifically, may be 48 bits or 32 bits.

In the time stamp assigning method of a packet according to the embodiment of the present invention, a time stamp storage unit of a step of storing the parameter in the packet as a time stamp may be 64 bits. Accordingly, a nano-second unit time stamp may be assigned to the packet.

In the time stamp assigning method of a packet according to the embodiment of the present invention, a correction value of the updating step S1070 may be a maximum value of the storage unit of the register. For example, when the storage unit is 48 bits, the correction value may be $2^{48}-1$, that is, 281474976710655 and when the storage unit is 32 bits, the correction value may be $2^{32}-1$, that is, 4294967294. When in the processor of the switch, typically, the storage unit of the register is less than 64 bits, even though an overflow of an elapsed time parameter is generated, the correction value may allow assigning a time stamp with the nano second unit of the 64 bits.

In the time stamp assigning method of a packet according to the embodiment of the present invention, the parameter Tp and the parameter Tc may be stored in the register of the processor 800 of the switch 20.

Figure 19:
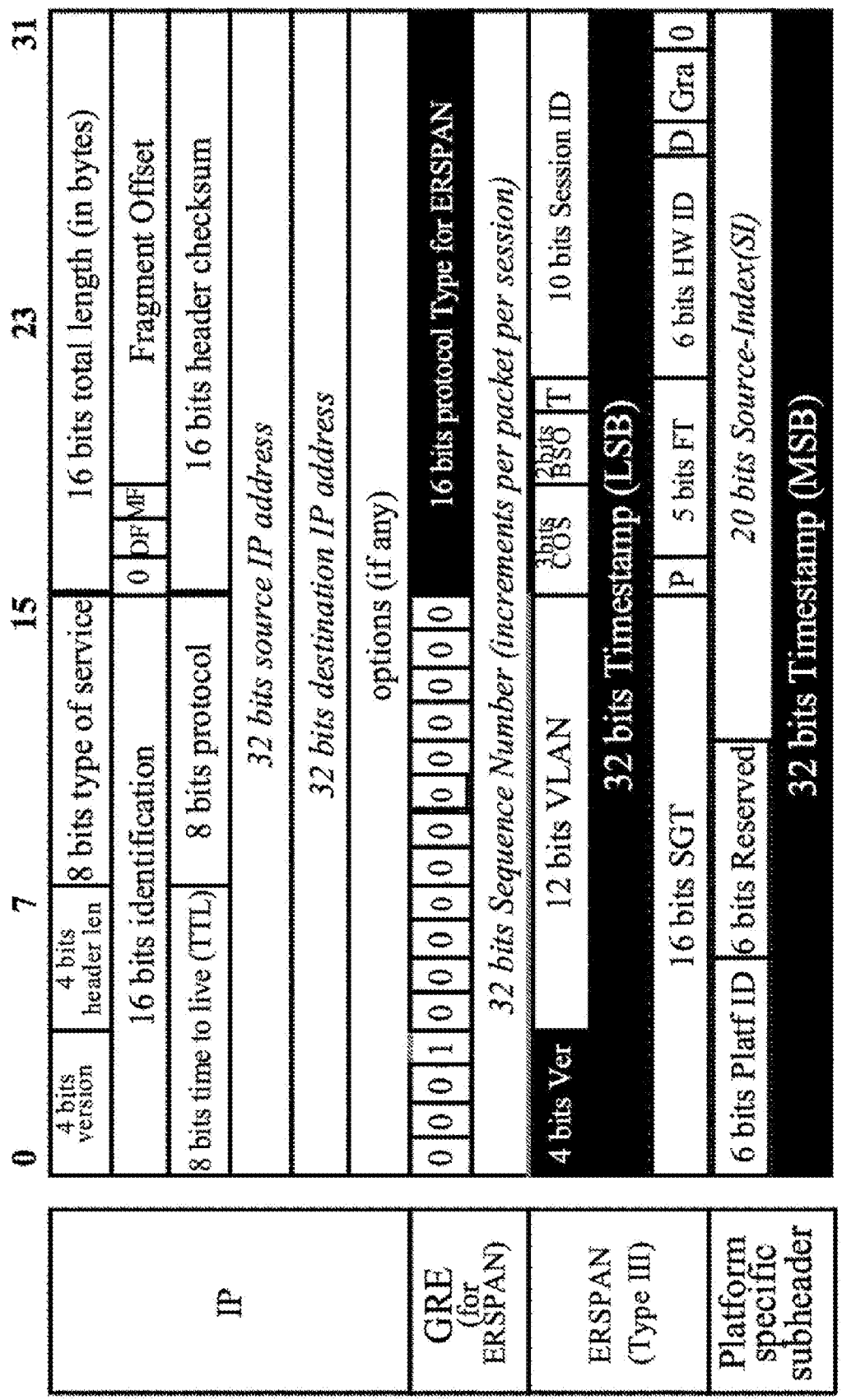
FIG. 19 illustrates an example of a method for assigning a time stamp in accordance with a packet structure according to an embodiment of the present invention.

Referring to FIG. 19, in the storing as a time stamp (S1090), when the packet is an ERSPAN type packet, 32 bits from a thirty-third bit of an ERSPAN header are stored as an LSB 32 bit time stamp of the time stamp and 32 bits from a thirty third bit of a platform specific subheader is stored as a MSB 32 bit time stamp of the time stamp. The storing method is a standard used for the existing system so that compatibility is good and modification in a packet analysis device is not separately required.

Figure 20:
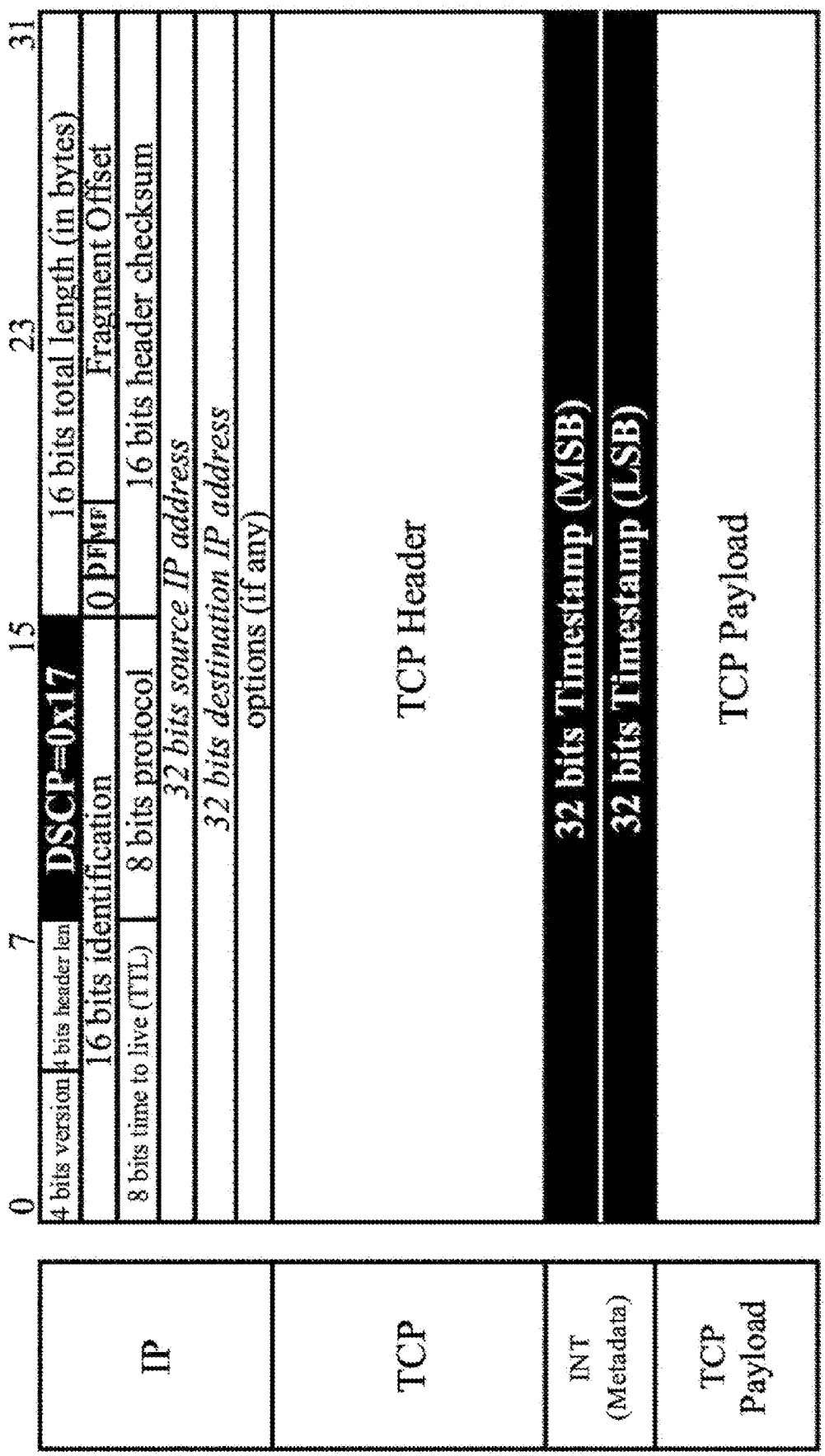
FIG. 20 illustrates an example of a method for assigning a time stamp in accordance with a packet structure according to an embodiment of the present invention.

Referring to FIG. 20, in the storing as a time stamp (S1090), when the packet is an in-band network telemetry (INT) type packet, 32 bits from a first bit of an INT header are stored as an LSB 32 bit time stamp of the time stamp and 32 bits from a thirty third bit is stored as an LSB 32 bit time stamp of the time stamp. According to the above-described storing method, a packet size is small so that an overhead capacity at the time of processing in the packet analysis device is reduced.

Figure 21:
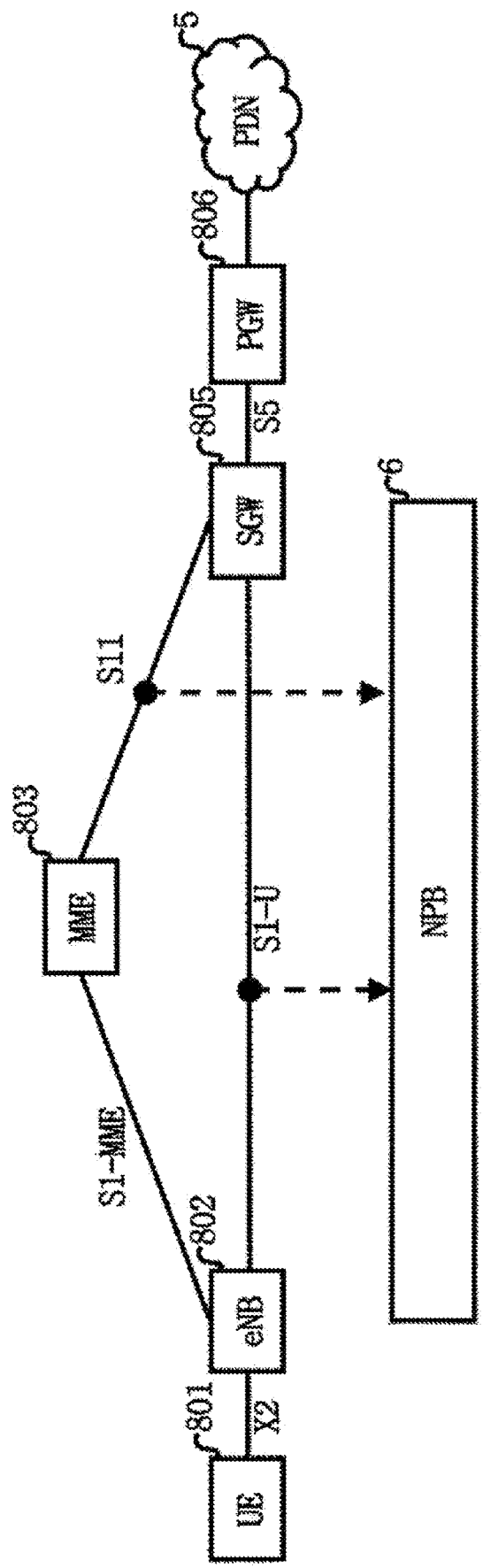
FIG. 21 illustrates an example that a network packet broker device according to an embodiment of the present invention is connected to a wireless cellular network architecture.

Referring to FIG. 21, the network packet broker device 6 according to the embodiment of the present invention may receive the packet directly or through a test application protocol (TAP) in each coupling step of 4G LTE or 5G cellular network architecture. The wireless cellular network architecture may include UE 801, eNB 802, mobility management entity (MME) 803, serving gateway (SGW) 805, packet data network gateway (PGW) 806, and a packet data network (PDN) 5.

In the wireless cellular network architecture, eNB 802 may communicate with UE 801 through X2 or Uu interface. Further, eNB 802 may communicate with MME 803 through S1AP control or S1-MME interface. The Uu interface may be used for NAS (mobility management and bearer control), radio resource control (RRC), and the like. S1AP control interface may be used for forwarding an initial terminal context (UE context) at the time of EPS bearer setting, mobility thereafter, paging and UE context release.

The GTP-U interface may be used to transmit a user traffic on S1-U, S5, and X2 interfaces. The GTP-C control interface may be used to transmit a control message for generating, maintaining, and deleting the GTP tunnel.

The SGW 805 communicates with PGW 806 through the GTP-U interface/GTP-C control interface and the PGW 806 may communicate with the PDN 5 through an IP interface.

Figure 22:
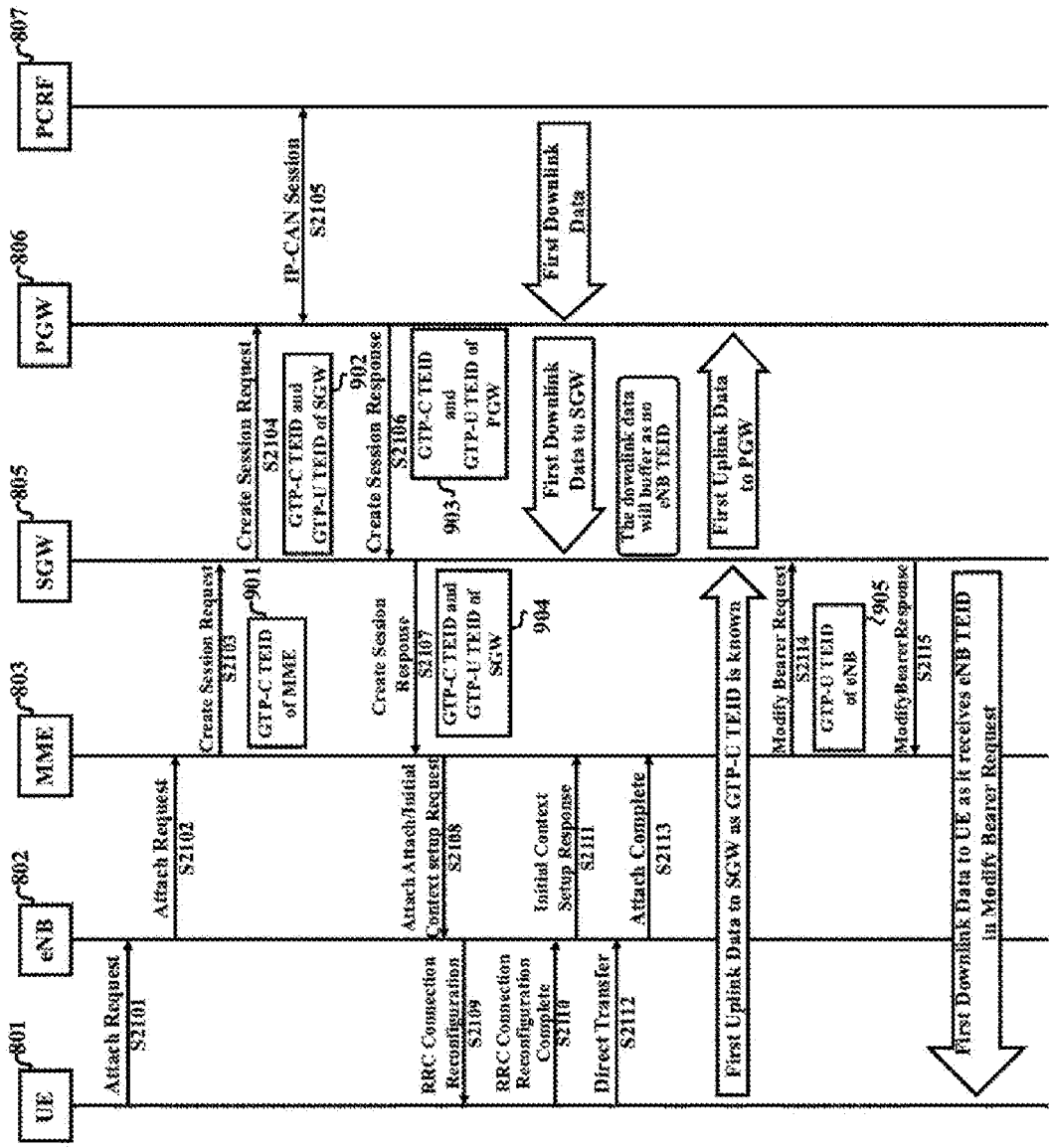
FIG. 22 schematically illustrates an access procedure of a user terminal in a mobile communication network according to an embodiment of the present invention.

FIG. 22 illustrates a call flow for supporting IP address allocation on a control plane and TEID allocation on a user plane in a wireless cellular network according to an embodiment of the present invention.

In step S2101, the UE 801 selects a cell through a public land mobile network (PLMN) and cell searching process for an initial access request. For the purpose of wireless link synchronization with the selected cell, RRC connection process with the base station 802 is performed. When the RRC connection configuration is completed, the UE 801 transmits an RRC connection setup complete message to the base station 802. Next, the UE 801 transmits an attach request message which is included in the RRC connection setup complete message to the eNodeB 802 to transmit a connection request message (attach request message) to the MME 803.

In step S2102, the eNodeB 802 transmits a request for PDN connection to the MME 803 as a part of an attach procedure. The base station 802 transmits an initial UE message including a cell ID of a cell to which the UE 801 is connected and tracking area information to the MME 803 for the purpose of S1 signaling connection with the MME 803. Here, the base station 802 transmits an attach request message which is included in an initial UE message so as to forward an attach request message received from the UE 101 to the MME 803. As described above, the base station 802 transmits the initial UE message to the MME 803 so that S1 signaling connection between the base station 802 and the MME 803 is established.

In step S2103, the MME 803 transmits a create session request to a serving gateway (805) control plane function (SGW-C) together with the PGW-C IP address to request the generation of default bearer. The create session request may include the GTP-C TEID 901 of the MME 803. The control plane function of the SGW 805 selects one SGW-U among a plurality of serving gateway user plain functions (SGW-U) based on a standard such as a position of the UE or an optimized path for user data transmission. The SGW-C allocates an IP address from a designated pool of the SGW-U address. In some embodiments, the IP address also may be acquired by another unit in a network of an operator, that is, based on an operator definition policy or provisioning. When the IP address is allocated, the SGW-C 253 transmits an allocate resource request message to request the serving gateway user plane function (SGW-U) to allocate the TEID. When the resource allocation request is received from the SGW-C, the SGW-U allocates a PGW (SGW-U TEID for transmission of a downlink) and eNB (SGW-U TEID for transmission of an uplink) from a local pool for the GTP user plane and control plane. The SGW-U also may acquire the information based on the policy of the network operator. The TEID allocated for transmission of uplink and downlink is returned from the allocate resource Ack to SGW-C.

In step S2104, the SGW-C transmits SGW-U IP address for transmission of a downlink, SGW GTP-U TEID 902, Create Session Request including SGW GTP-C TEID 902 to the control plane function PGW-C of the PGW 806 together with a newly allocated IP address of the SGW-U and TEID for GTP connection toward the PGW-U 256. The PGW-C allocates the IP address to a designated pool of PGW-U address. The address may be acquired by another unit of a network of the operator, that is, based on an operator defined policy or provisioning. When the IP address is allocated, the PGW-C transmits Allocate Resource Request message including the SGW-U IP address for transmission of a downlink and SGW-U TEID to request the PGW-U to allocate the TEID. When the resource allocation request is received from the PGW-C, the PGW-U allocates the TEID from the local pool. The PGW-U may acquire the information based on the policy of the network operator. The allocated PGW-U TEID is returned from the Allocate Resource Ack message to the PGW-C 255.

In step S2105, when a response is received from the PGW-U 256 together with a newly allocated TEID, the PGW-C 255 initiates internet protocol connectivity access network (IP CAN) session establishment/modification procedure together with policy and charging rule function (PCRF).

In step S2106, the response is transmitted to the SGW-C together with PGW-U TEID and PGW-U IP address in Create Session Response message including PGW-U IP address, PGW GTP-C TEID 903, and PGW GTP-U TEID 903.

Next, in step S2107, the SGW-C 253 forwards the PGW-U TEID and PGW-U IP address received by transmitting the Modify Request message to the SGW-U 254. The SGW-U 254 acknowledges the request. After receiving the response the Modify Request, Create Session Response message is transmitted to the MME 803 together with SGW-U IP address, SGW GTP-C TEID 904, and SGW GTP-U TEID 904.

Next, in step S2108, the MME 803 transmits Attach Accept message to the UE 801 through eNB 802. Initial Context Setup message which piggybacks the Attach Accept message includes the SGW-U IP address and the SGW-U TEID. The base station 802 which receives an Initial Context Setup Request message from the MME 803 performs an AS Security Setup procedure for safe communication with the UE 801 in a wireless section. The RRC message protects the integrity and is encrypted through the AS Security Setup procedure and encrypts the user traffic of the UE 801 to be forwarded.

Next, in step S2109, when the AS Security Setup procedure is completed, the base station 802 transmits a RRC Connection Reconfiguration message to the UE 801 for wireless section bearer setup.

Next, in step S2110, the UE 801 which receives the message completes the DRB bearer setup. Therefore, the uplink EPS bearer setup from the UE 801 to PGW 806 is completed and the UE 801 transmits the RRC Connection Reconfiguration message to the base station 802.

Next, in step S2111, when the AS security setup procedure and the DRB setup procedure are completed, the base station 802 allocates S1 eNB TEID for configuration of downlink S1-MEC bearer. Further, the S1 eNB TEID which is included in the Initial Context Setup Response message is transmitted to the MME 803.

In step S2112, the UE 801 transmits the Attach Complete message which is included in a UL Information Transfer message to the base station 802 to forward the Attach Complete message to the MME 803.

Next, in step S2113, the base station 802 which receives the Attach Complete message forwards the Attach complete message which is included in a UL NAS Transport message to the MME 803.

Next, in step S2114, as the MME 803 receives S1 eNB GTP-U TEID 905 from the base station, the MME 803 transmits the S1 eNB GTP-U TEID which is included in a Modify Bearer Request message to the SGW 804.

Next, in step S2115, the SGW 805 which receives the S1 eNB GTP-U TEID completes the downlink S1-MEC bearer configuration using the S1 eNB TEID and transmits the Modify Bearer Response message to the MME 805 as a response for the Modify Bearer Request message (S522). Therefore, the S1-MEC bearer configuration of the uplink and the downlink is completed between the base station 102 and the edge server 103 so that the uplink and downlink traffic transmission between the base station 802 and the SGW 805 is permitted.

Figure 23:
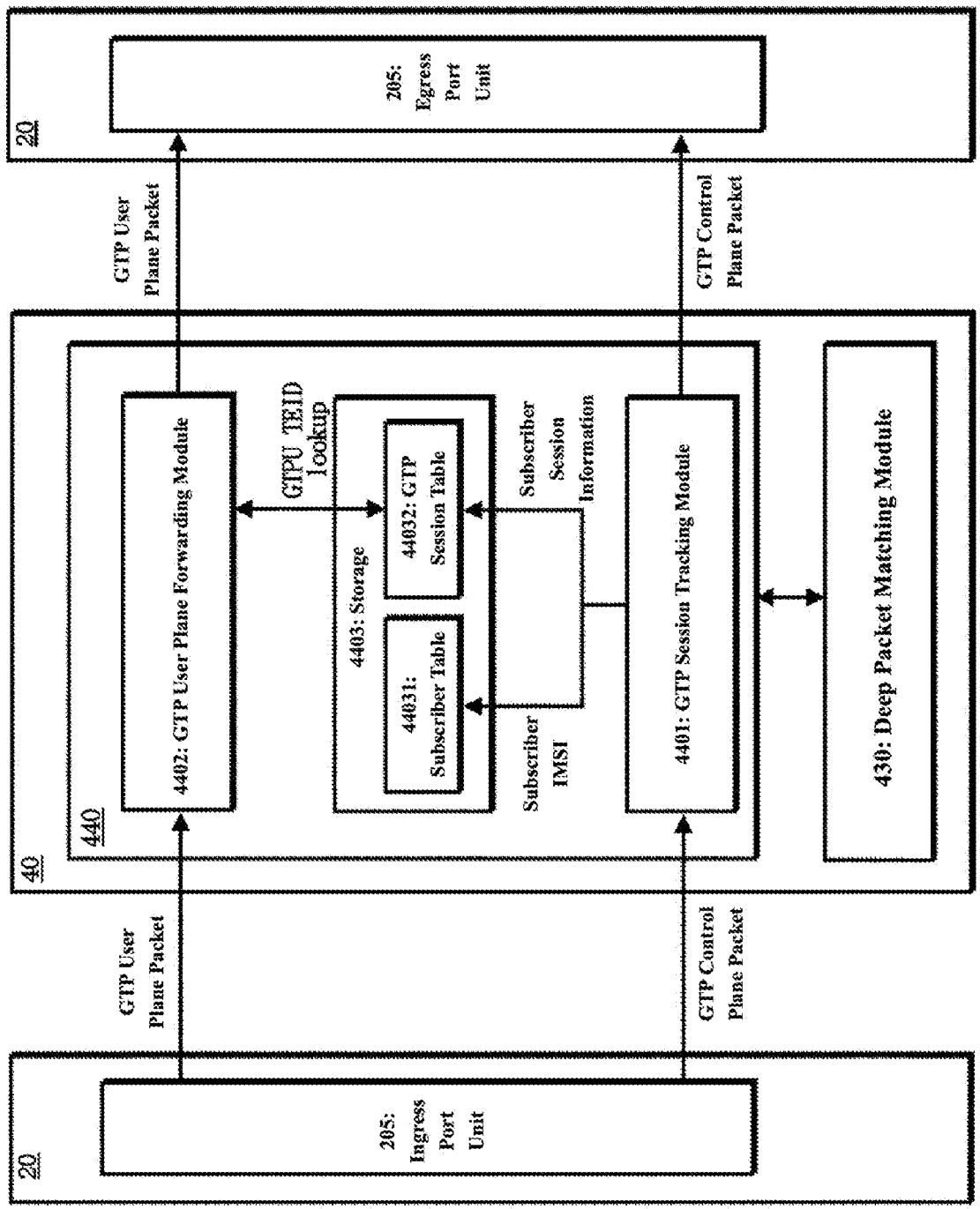
FIG. 23 illustrates a structure of a network packet broker system according to an embodiment of the present invention.

Referring to FIG. 23, the GTP correlation module 440 may include a GTP session tracking module 4401, a GTP user plane forwarding module 4402, and a storage 4403.

The GTP session tracking module 4401 snoops various GTP-C transactions between the MME 803, the SGW 805, and the PGW 806, such as CreateSession Request S2103 and S2104, Create Session Response S2106 and S2107, and Modify Bearer Request S2114 to assign and maintain the user IMSI mapping to GTP-U and GTP-C TEID. Further, the GTP correlation module 440 may transmit the GTP-C message which belongs to the same user IMSI to a port unit 205 or a port group which is same as that of the GTP-U message.

The GTP session tracking module 4401 parses a subscriber IMSI and subscriber session information from information of the GTP control plane packet to update a subscriber table 44031 and a GTP session table 44032, respectively.

The GTP session tracking module 4401 redesignates the egress path of the TEID associated with an IMSI corresponding to the same user to an egress port unit 25 or a port group.

The GTP user plane forwarding module 4402 queries a GTP user plane (GTP-U) packet entering from the ingress port unit 205 of the switch 20 with GTP-U TEID from the GTP session table 44032 of the GTP correlation module 440 to update egress port information of the GTP session table 44032.

When the ingress packet is a GTP-C packet as a result of inquiry of the GTP TEID and IP address, the GTP user plane forwarding module 4402 may forward the GTP-C packet to the GTP session tracking module 4401.

Figure 24:
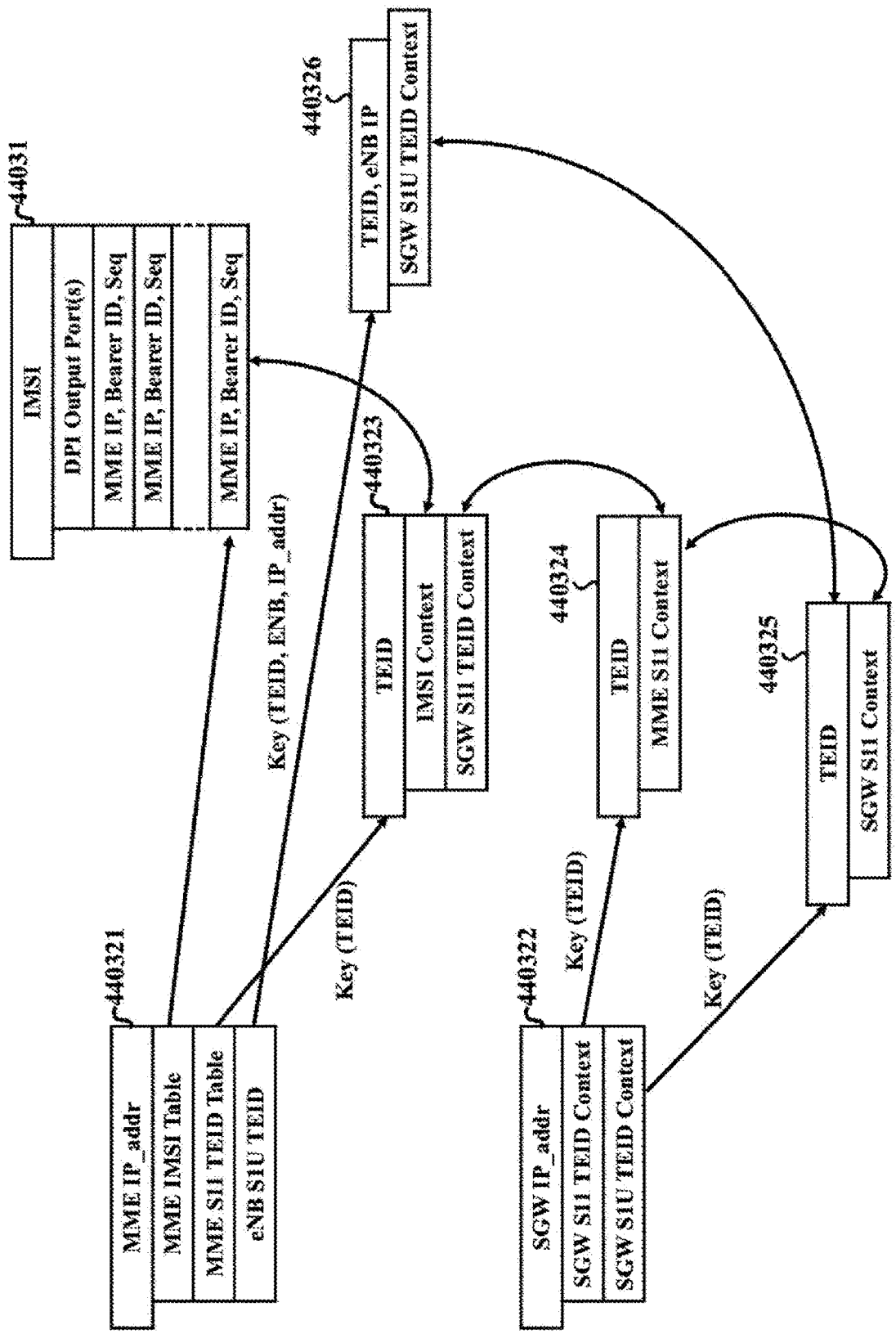
FIG. 24 illustrates an example of a storage of a GTP correlation module according to an embodiment of the present invention.

FIG. 24 illustrates an example of a storage of a GTP correlation module according to an embodiment of the present invention.

The storage 4403 of the GTP correlation module 440 may be located in a memory 803 of a control unit 800 of a network packet broker device 6, and more desirably located in a processor 801.

The storage 4403 of the GTP correlation module 440 may include an IMSI table 44031, an MME context table 440321, and a SGW context table 440322.

A subscriber table 44031 of the storage 4403 of the GTP correlation module 440 may be an IMSI table 44031.

The GTP session table 44032 of the storage 4403 of the GTP correlation module 440 may include the MME context table 440321, and the SGW context table 440322.

The GTP session table 44032 of the storage 4403 of the GTP correlation module 440 may further include a correlation table 44035 which stores the correlation of the IMSI table 44031, the MME context table 440321, and the SGW context table 440322.

The correlation table of the storage 4403 of the GTP correlation module 440 may include a first correlation table 440323, a second correlation table 440324, a third correlation table 440325, and a fourth correlation table 440326.

The IMSI table 44031 may include an IMSI, a packet output port, and a bearer ID set. The IMSI table 44031 may have the IMSI as a primary key. The bearer ID set may include an MME IP, a bearer ID, and a sequence.

A deep packet matching method of a network packet broker device includes: a step S3010 of generating a record with an MME IP address as a key and a bearer ID set including an MME IP, a bearer ID, and a sequence and an MME S11 TEID 901 as values in an MME context table 440321, by the GTP correlation module 440; a step S3020 of generating a record with an SGW IP address as a key in a SGW context table 440322, by the GTP correlation module 440; a step S3030 of updating SGW S11 TEID 902 and 904 and SGW S1U TEID 902 by searching for a record with an SGW IP address as a key, in the SGW context table 440322, by the GTP correlation module 440; a step S3040 of generating a record with MME S11 TEID as a key and with an IMSI context and SGW S11 TEID contexts 902 and 904 as values in the first correlation table 440323, by the GTP correlation module 440; a step S3050 of generating a record with SGW S11 TEID 902 and 904 as a key and with an MME S11 context 901 as a value in a second correlation table 440324, by the GTP correlation module 440; a step S3060 of generating a record with SGW S11 TEID as a key and with SGW S11 TEID contexts 902 and 904 as values in a third correlation table 440325, by the GTP correlation module 440; a step S3070 of generating a record with eNB TEID 905 and eNB IP as keys and with SGW S1U TEID contexts 902 and 904 as values in a fourth correlation table 440326, by the GTP correlation module 440; a step S3080 of updating the bearer ID set including an MME IP, a bearer ID, and a sequence of a record with the MME IP address as a key and a value of eNB S1U TEID 905 in the MME context table 440321, by the GTP correlation module 440; and a step S3090 of generating a record with IMSI as a key and a bearer ID set including an MME IP, a bearer ID, and a sequence as a value in an IMSI table 44031, by the GTP correlation module.

The MME context table 440321 may include the MME IP address, the bearer ID set, the MME S11 TEID, and the eNB S1U TEID. The MME context table 440321 may have the MMP IP address as a primary key. The MME context table 440321 uses the bearer ID set as a foreign key to be connected to the first correlation table 440323. The MME context table 440321 uses the MME S11 TEID as a foreign key to be connected to the IMSI table 44031. The MME context table 440321 uses the eNB S1U TEID as a foreign key to be connected to the fourth correlation table 440326.

The SGW context table 440322 may include an SGW IP address, the SGW S11 TEID, and SGW S1U TEID. The SGW context table 440322 may have the SGW IP address as a primary key. The SGW context table 440322 uses the SGW S11 TEID as a foreign key to be connected to the second correlation table 440324. The SGW context table 440322 uses the SGW S1U TEID as a foreign key to be connected to the third correlation table 440325.

The first correlation table 440323 may include the MME S11 TEID, the IMSI context, and the SGW S11 TEID context. The first correlation table 440323 may have the MME S11 TEID as a primary key. The first correlation table 440323 and the IMSI table 44031 may be cross-referenced with the IMSI context of the first correlation table 440323 and the bearer ID set of the IMSI table 44031.

The second correlation table 440324 may include the SGW S11 TEID and the MME S11 context. The second correlation table 440324 may have the SGW S11 TEID as a primary key. The first correlation table 440323 and the second correlation table 440324 may be cross-referenced with the SGW S11 TEID context of the first correlation table 440323 and the MME S11 context of the second correlation table 440324.

The third correlation table 440325 may include the SGW S1U TEID and the SGW S11 TEID context. The third correlation table 440325 may have the SGW S1U TEID as a primary key. The second correlation table 440324 and the third correlation table 440325 may be cross-referenced with the MME S11 context of the second correlation table 440324 and the SGW S11 TEID context of the third correlation table 440325.

The fourth correlation table 440326 may include the eNB TEID set and the SGW S1U TEID context. The fourth correlation table 440326 may have the eNB TEID set as a primary key. The eNB TEID set may include eNB S1U TEID and eNB IP. The third correlation table 440325 and the fourth correlation table 440326 may be cross-referenced with the SGW S1U TEID of the third correlation table 440325 and the SGW S1U TEID context of the fourth correlation table 440326.

Figure 25:
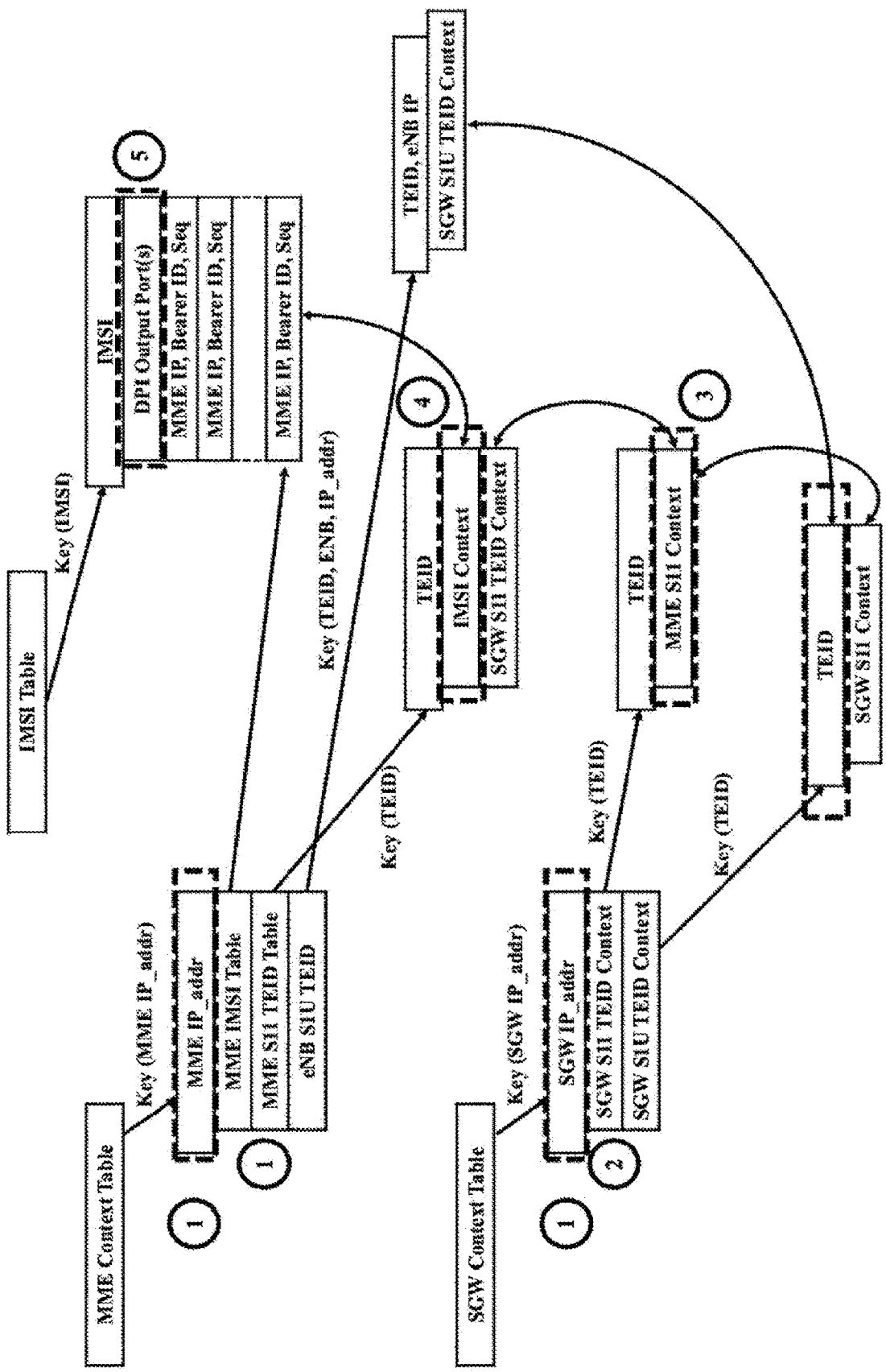
FIG. 25 illustrates a method for acquiring a packet output port of a GTP-C packet matching a GTP-U packet according to an embodiment of the present invention.

FIG. 25 illustrates an example of a storage of a GTP correlation module according to an embodiment of the present invention.

The storage 4403 of the GTP correlation module 440 may be located in a memory 803 of a control unit 800 of a network packet broker device 6, and more desirably located in a processor 801.

The storage 4403 of the GTP correlation module 440 may include an IMSI table 44031, an MME context table 440321, and a SGW context table 440322.

A subscriber table 44031 of the storage 4403 of the GTP correlation module 440 may be an IMSI table 44031.

The GTP session table 44032 of the storage 4403 of the GTP correlation module 440 may include the MME context table 440321, and the SGW context table 440322.

The GTP session table 44032 of the storage 4403 of the GTP correlation module 440 may further include a correlation table 44035 which stores the correlation of the IMSI table 44031, the MME context table 440321, and the SGW context table 440322.

The correlation table of the storage 4403 of the GTP correlation module 440 may include a first correlation table 440323, a second correlation table 440324, a third correlation table 440325, and a fourth correlation table 440326.

The IMSI table 44031 may include an IMSI, a packet output port, and a bearer ID set. The IMSI table 44031 may have the IMSI as a primary key. The bearer ID set may include an MME IP, a bearer ID, and a sequence.

A deep packet matching method of a network packet broker device includes: a step S3010 of generating a record with an MME IP address as a key and a bearer ID set including an MME IP, a bearer ID, and a sequence and an MME S11 TEID 901 as values in an MME context table 440321, by the GTP correlation module 440; a step S3020 of generating a record with an SGW IP address as a key in a SGW context table 440322, by the GTP correlation module 440; a step S3030 of updating SGW S11 TEID 902 and 904 and SGW S1U TEID 902 by searching for a record with an SGW IP address as a key, in the SGW context table 440322, by the GTP correlation module 440; a step S3040 of generating a record with MME S11 TEID as a key and with an IMSI context and SGW S11 TEID contexts 902 and 904 as values in the first correlation table 440323, by the GTP correlation module 440; a step S3050 of generating a record with SGW S11 TEID 902 and 904 as a key and with an MME S11 context 901 as a value in a second correlation table 440324, by the GTP correlation module 440; a step S3060 of generating a record with SGW S11 TEID as a key and with SGW S11 TEID contexts 902 and 904 as values in a third correlation table 440325, by the GTP correlation module 440; a step S3070 of generating a record with eNB TEID 905 and eNB IP as keys and with SGW S1U TEID contexts 902 and 904 as values in a fourth correlation table 440326, by the GTP correlation module 440; a step S3080 of updating the bearer ID set including an MME IP, a bearer ID, and a sequence of a record with the MME IP address as a key and a value of eNB S1U TEID 905 in the MME context table 440321, by the GTP correlation module 440; and a step S3090 of generating a record with IMSI as a key and a bearer ID set including an MME IP, a bearer ID, and a sequence as a value in an IMSI table 44031, by the GTP correlation module.

The MME context table 440321 may include the MME IP address, the bearer ID set, the MME S11 TEID, and the eNB S1U TEID. The MME context table 440321 may have the MMP IP address as a primary key. The MME context table 440321 uses the bearer ID set as a foreign key to be connected to the first correlation table 440323. The MME context table 440321 uses the MME S11 TEID as a foreign key to be connected to the IMSI table 44031. The MME context table 440321 uses the eNB S1U TEID as a foreign key to be connected to the fourth correlation table 440326.

The SGW context table 440322 may include an SGW IP address, the SGW S11 TEID, and SGW S1U TEID. The SGW context table 440322 may have the SGW IP address as a primary key. The SGW context table 440322 uses the SGW S11 TEID as a foreign key to be connected to the second correlation table 440324. The SGW context table 440322 uses the SGW S1U TEID as a foreign key to be connected to the third correlation table 440325.

The first correlation table 440323 may include the MME S11 TEID, the IMSI context, and the SGW S11 TEID context. The first correlation table 440323 may have the MME S11 TEID as a primary key. The first correlation table 440323 and the IMSI table 44031 may be cross-referenced with the IMSI context of the first correlation table 440323 and the bearer ID set of the IMSI table 44031.

The second correlation table 440324 may include the SGW S11 TEID and the MME S11 context. The second correlation table 440324 may have the SGW S11 TEID as a primary key. The first correlation table 440323 and the second correlation table 440324 may be cross-referenced with the SGW S11 TEID context of the first correlation table 440323 and the MME S11 context of the second correlation table 440324.

The third correlation table 440325 may include the SGW S1U TEID and the SGW S11 TEID context. The third correlation table 440325 may have the SGW S1U TEID as a primary key. The second correlation table 440324 and the third correlation table 440325 may be cross-referenced with the MME S11 context of the second correlation table 440324 and the SGW S11 TEID context of the third correlation table 440325.

The fourth correlation table 440326 may include the eNB TEID set and the SGW S1U TEID context. The fourth correlation table 440326 may have the eNB TEID set as a primary key. The eNB TEID set may include eNB S1U TEID and eNB IP. The third correlation table 440325 and the fourth correlation table 440326 may be cross-referenced with the SGW S1U TEID of the third correlation table 440325 and the SGW S1U TEID context of the fourth correlation table 440326.

Figure 26:
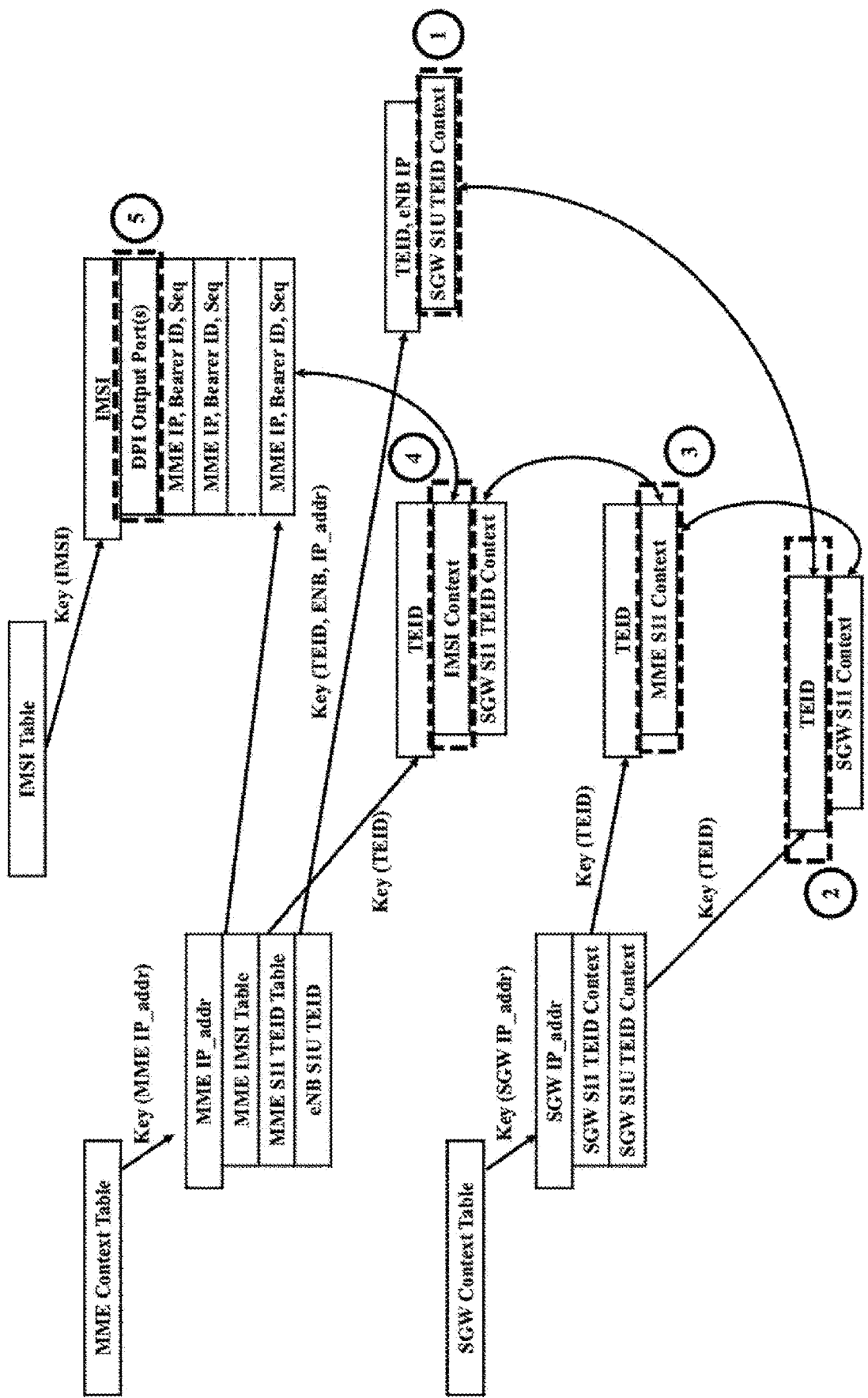
FIG. 26 illustrates a method for acquiring a packet output port of a GTP-C packet matching a GTP-U packet according to another embodiment of the present invention.

Referring to FIG. 26, when in the GTP-U packet, Src IP is an IP of SGW 805, DST IP is an IP of eNB 802, and TEID is SGW GTP-U TEID, a process of acquiring a packet output port of a GTP-C packet matching the GTP-U packet is as follows:

In the fourth correlation table 440326, after searching for a record with an IP of eNB 802 as a key value, SGW S1U TEID is acquired from the searched record.

Next, in the third correlation table 440325, after searching for a record with the acquired SGW S1U TEID as a key value, a SGW S11 TEID context is acquired from the searched record.

Next, in the second correlation table 440324, after searching for a record with the acquired SGW S11 TEID context as a key value, a MME S11 TEID context is acquired from the searched record.

Next, in the first correlation table 440323, after searching for a record with the acquired MME S11 TEID context as a key value, a IMSI context is acquired from the searched record.

Next, in the IMSI table 44031, after searching for a record with the acquired IMSI context as a key value, a packet output port is acquired from the searched record.

The GTP correlation module 440 may include a GTP session tracking module 4401, a GTP user plane forwarding module 4402, and a storage 4403.

The deep packet matching module 430 may control the GTP correlation module 440 to match the GTP control plane packet and the GTP user plane packet.

Figure 27:
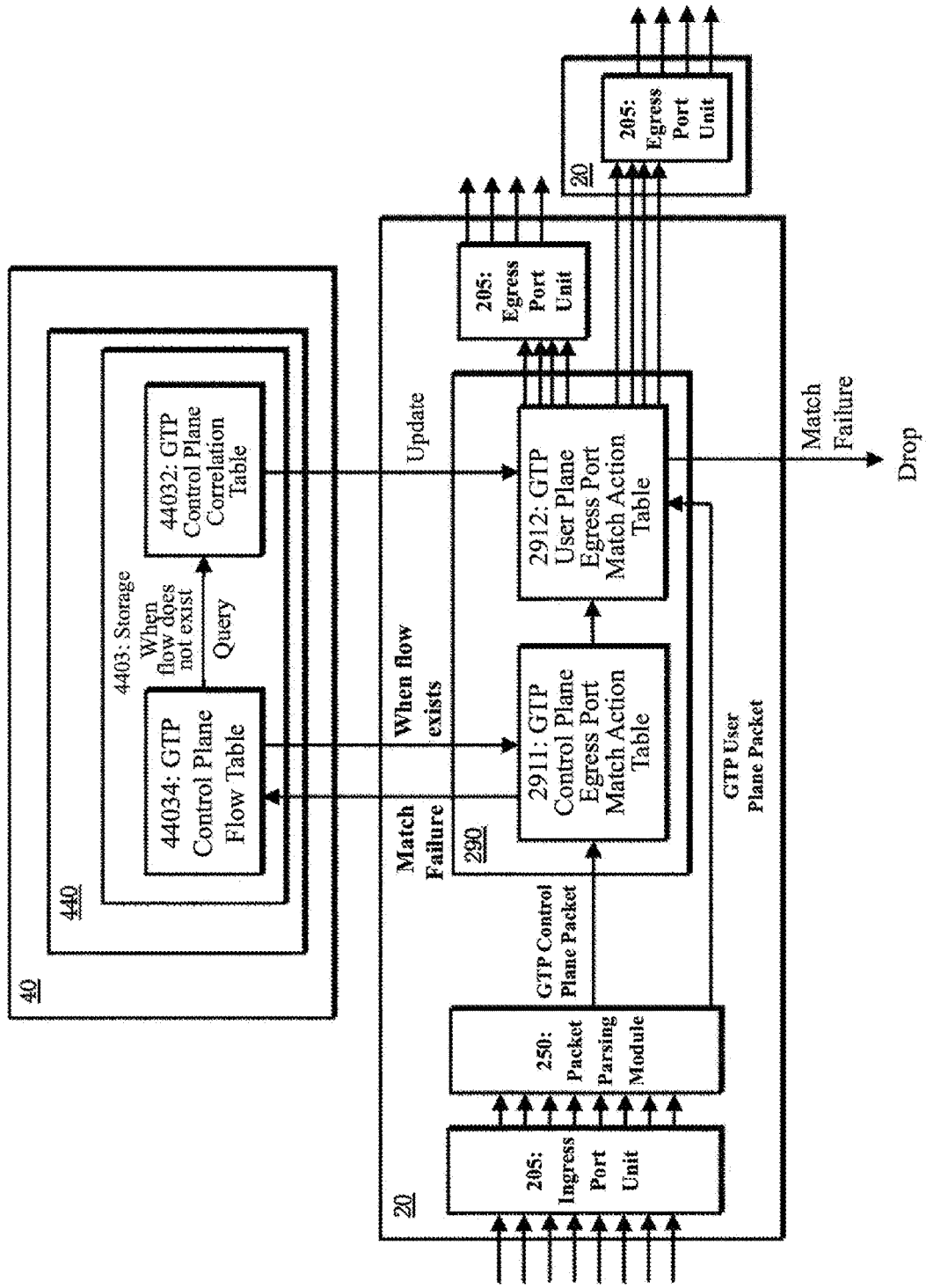
FIG. 27 illustrates a structure of a deep packet matching module of a network packet broker system according to an embodiment of the present invention which processes a packet.

Referring to FIG. 27, the storage 4403 of the GTP correlation module 440 may include a GTP control plane flow table 44034 and a GTP control plane correlation table 44035.

The GTP control plane flow table 44034 may store a pair of a GTP-C TEID and an egress port.

The storage 4403 of the GTP correlation module 440 may be located in the processor 801 or the memory 803 for a quick query and response processing, and desirably may be located in a register of the processor 801.

The GTP control plane packet may be processed in accordance with a processing action of a packet stored in a GTP control plane egress port match action table 2911. However, initially, there is no record in which the packet matches the match action table 2911, so that the deep packet matching module 430 may query the flow to the GTP control plane flow table 44034 to update the match action table 2911. The GTP control plane packet processed in the match action table 2911 may be processed in the GTP user plane egress port match action table 2912 together.

The GTP control plane correlation table 44032 may be a GTP session table 44032. The egress port information corresponding to the GTP TEID in the GTP control plane correlation table 44032 is updated in the GTP user plane egress port match action table 2912 to match the deep packet.

When there is no flow matching the packet in the GTP user plane egress port match action table 2912 or when an action for the flow is denied, the packet is dropped so as not to be processed.

Figure 28:
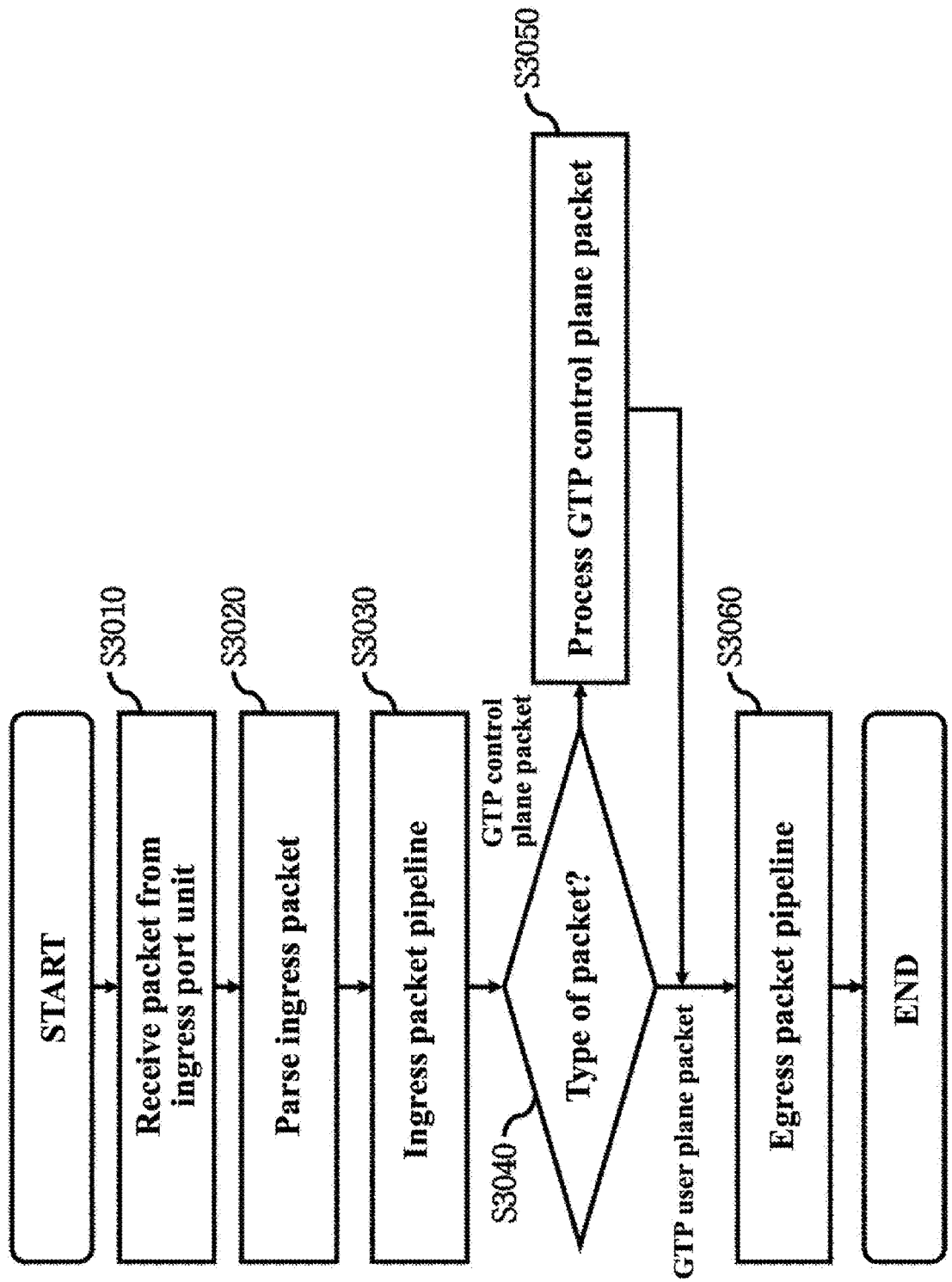
FIG. 28 illustrates a deep packet matching method of a network packet broker system according to an embodiment of the present invention.

Referring to FIG. 28, a deep packet matching method of a network packet broker device according to the embodiment of the present invention may include the following steps.

A step S3010 of receiving a packet from an ingress port unit 205 of a switch 205→20 by a deep packet matching module 430;

an ingress packet parsing step S3020 of extracting deep packet information from the input packet by a packet parsing module 250 of the switch 205→20;

an ingress packet pipeline step S3030 of processing a packet with acquired information, by the deep packet matching module 430;

a step S3040 of distinguishing a type of packet from information of the acquired packet, by the deep packet matching module 430;

a GTP control plane packet processing step S3050 of acquiring an egress port unit 205 or an egress port group which sends a packet by querying a flow matching the packet to the GTP control plane egress table 2911, by a GTP session tracking module 4401 when the distinguished type of packet is a GTP control plane packet; and an egress packet pipeline step S3060 of processing the packet by querying the flow matching the packet to the GTP user plane egress table 2912 by a GTP user plane forwarding module 4402 when the distinguished type of packet is a GTP user plane packet.

The egress packet pipeline step S3060 includes an egress packet parsing step S3061 of extracting information of an egress packet to store flow information of the packet in the GTP user plane egress table 2912 and a step S3602 of processing an action for the packet by querying the flow information of the egress packet to the GTP user plane egress table 2912.

The packet parsing module 250 according to the embodiment of the present invention may parse an ethernet header, a vlan header, an ipv4 header, a tcp header, an udp header, an icmp header, a sctp header, a gtp header, an inner ether header, an inner ipv4 header, an inner tcp header, and an inner udp header.

Figure 29:
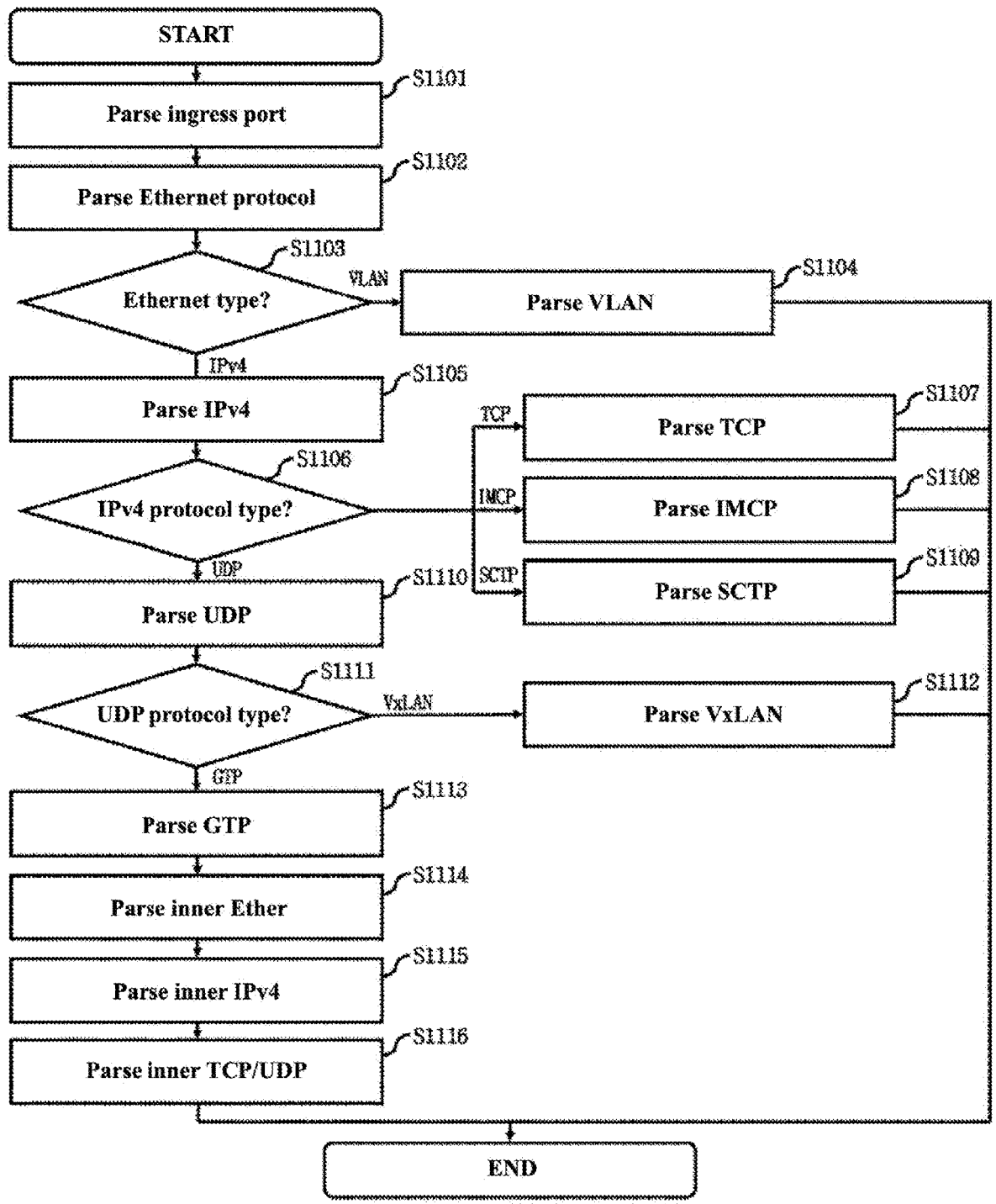
FIG. 29 illustrates an ingress packet parsing step according to an embodiment of the present invention.

Referring to FIG. 29, an ingress packet parsing step S3020 of a deep packet matching method according to the embodiment of the present invention may include the following steps:

an ingress port parsing step S1101 of extracting ingress port information from an ingress packet by a packet parsing module 250;

an Ethernet protocol parsing step S1102 of extracting Ethernet protocol information from the ingress packet by the packet parsing module 250;

a VLAN parsing step S1104 of extracting VLAN information from the ingress packet when the extracted Ethernet protocol information is VLAN, by the packet parsing module 250;

an IPv4 parsing step S1105 of extracting IPv4 information from the ingress packet when the extracted Ethernet protocol information is IPv4, by the packet parsing module 250;

a TCP parsing step S1107 of extracting TCP information from the ingress packet when the type of the extracted IPv4 protocol is a TCP, by the packet parsing module 250;

an IMCP parsing step S1108 of extracting IMCP information from the ingress packet when the type of the extracted IPv4 protocol is an IMCP, by the packet parsing module 250;

an SCTP parsing step S1109 of extracting SCTP information from the ingress packet when the type of the extracted IPv4 protocol is an SCTP, by the packet parsing module 250;

an UDP parsing step S1110 of extracting UDP protocol number information from the ingress packet by the packet parsing module 250;

a VxLAN parsing step S1112 of extracting VxLAN information from the ingress packet when the extracted UDP protocol number is VxLAN, by the packet parsing module 250;

a GTP parsing step S1113 of extracting GTP information from the ingress packet when the extracted UDP protocol number is GTP, by the packet parsing module 250;

an Inner Ether parsing step S1114 of extracting Inner Ether information from the ingress packet by the packet parsing module 250;

an Inner IPv4 parsing step S1115 of extracting Inner IPv4 information from the ingress packet by the packet parsing module 250; and an Inner TCP/UDP parsing step S1116 of extracting inner TCP and inner UDP information from the ingress packet by the packet parsing module 250.

The ingress port parsing step S1101 may further include a step S11011 of forwarding ingress port information to an ingress metadata of the packet and a step S11012 of forwarding device time stamp information to the ingress metadata.

The IPv4 parsing step S1105 may further include a step S11051 of forwarding src_ip, dst_ip, and protocol to a look-up table of the ingress metadata.

All the extracted inner information extracted in the GTP parsing step S1113, the Inner Ether parsing step S1114, the Inner IPv4 parsing step S1115, and the Inner TCP/UDP parsing step S1116 are original destination address information so that the traffic steering in accordance with a shape of the internal traffic is possible in the edge cloud with the extracted original destination address information and during the load balancing, the traffic load may be distributed to be balanced with respect to an original destination address, rather than a path-through address.

Figure 30:
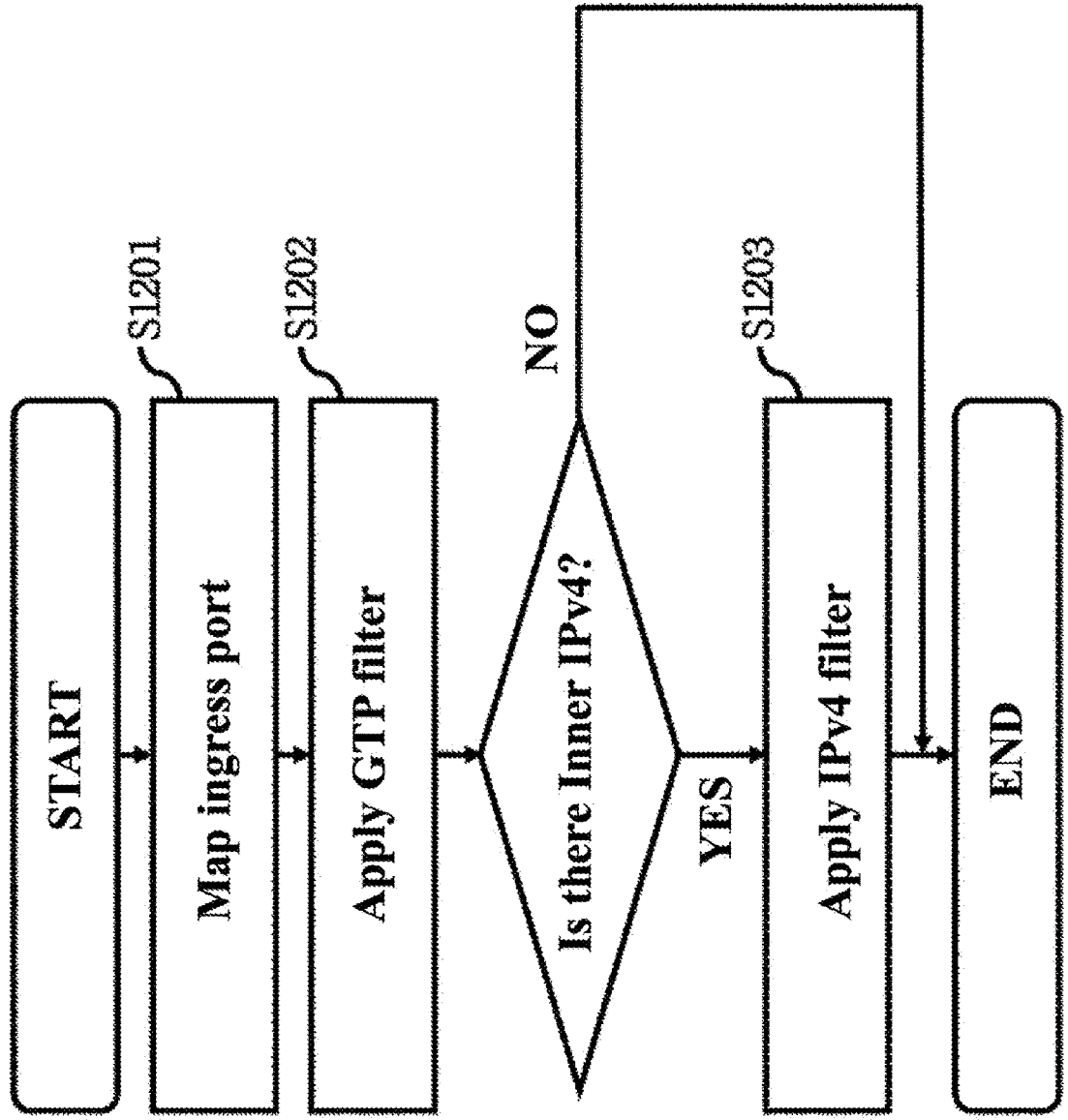
FIG. 30 illustrates an ingress pipeline step of a deep packet matching module according to an embodiment of the present invention.

Referring to FIG. 30, an ingress pipeline step S3030 of a deep packet matching method according to the embodiment of the present invention may include the following steps:

an ingress port mapping step S1201 of converting an ingress physical port 250 to a logic port used for a match action table, by the deep packet matching module 430;

a GTP filter applying step S1202 of storing processing of a packet corresponding to GTP information extracted from the ingress packet in an egress port match action table 2922, by the deep packet matching module 430; and an Inner IPv4 filter applying step S1203 of storing processing of a packet corresponding to Inner IPv4 information extracted from the ingress packet in an egress port match action table 2922, when there is Inner IPv4 information extracted from the ingress packet, by the deep packet matching module 430.

The Inner IPv4 filter applying step S1203 may include replication step S12031 of copying the packet to forward the packet to the egress port unit 205 or the egress port group when an action of the GTP user plane egress port match action table 2911→2912 in accordance with the ingress packet is replication, by the deep packet matching module 430.

A load balancing step S12032 of forwarding the packet to a designated egress port group, when an action of the GTP user plane egress port match action table 2911→2912 in accordance with an ingress packet is load balancing, by the deep packet matching module 430.

In the GTP filter applying step S1202, the action for the corresponding packet may be stored as deny, permit, replication, strip_vxlan_and_permit, or strip_vxlan_and_replication.

In the Inner IPv4 filter applying step S1203, the action for the corresponding packet may be stored as deny, permit, or replication.

In one aspect of the present invention, the policy management module 420 matches the information stored in the header of the packet to generate, modify, or process a packet filter which controls the flow of the matched packet.

In one aspect of the present invention, the packet filter may be a source (src) IP matching filter, a destination (dst) IP matching filter, or a TEID matching filter and also may be a GTP filter or an IPv4 filter.

In one aspect of the present invention, the GTP filter may match GTP outer packet information, and specifically, match eth_type, src_mac, dst_mac, src_ip, dst_ip, ip_proto, gtp_teid, gtp_metadata, 14_src_port, 14_dst_port, or port_group_label of the packet.

In one aspect of the present invention, the IPv4 filter may match GTP inner packet information, and specifically, match src_mac, dst_mac, src_ip, dst_ip, ip_proto, 14_src_port, 14_dst_port, or port_group_label of the packet.

Figure 31:
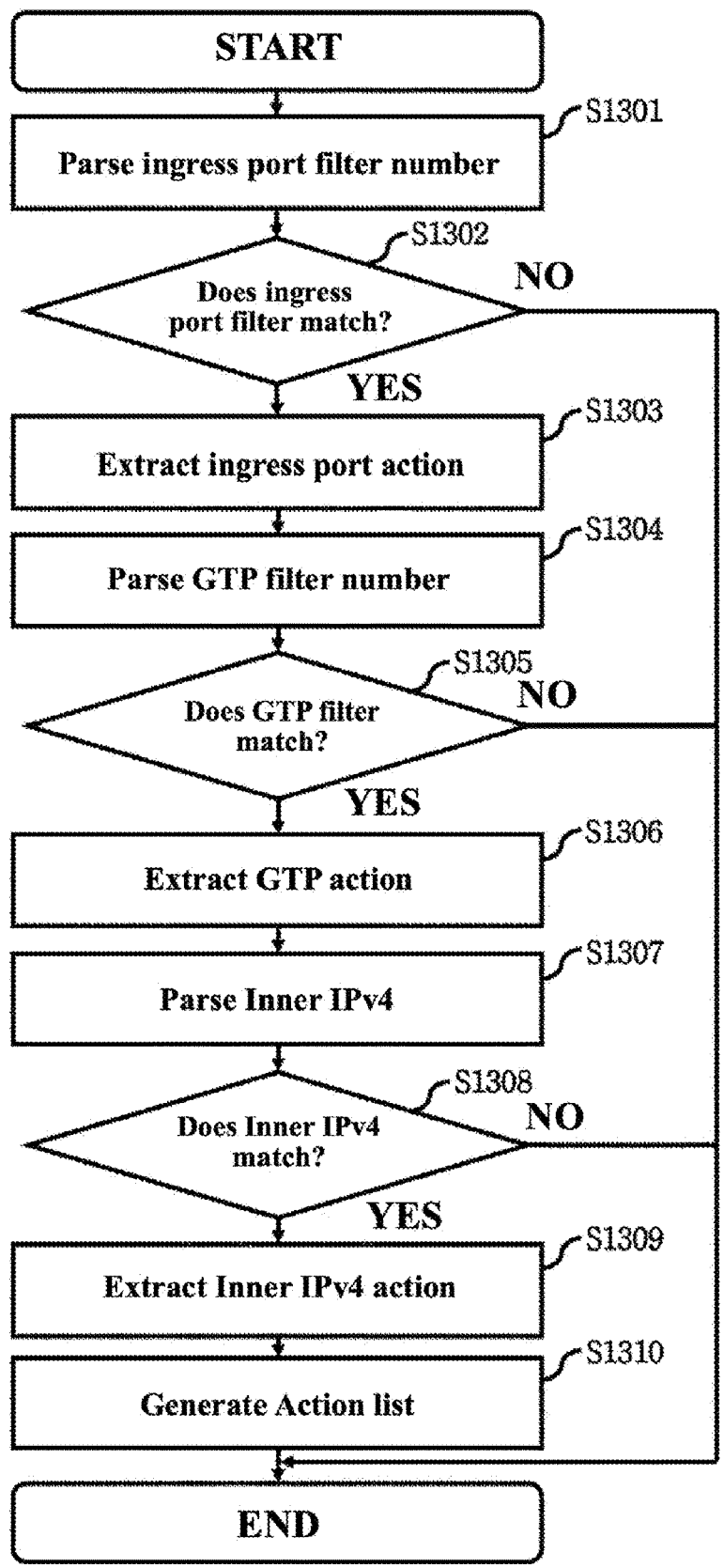
FIG. 31 illustrates an egress packet parsing step according to an embodiment of the present invention.

Referring to FIG. 31, an egress packet parsing step S3061 of a deep packet matching method according to the embodiment of the present invention may include the following steps:

an ingress port filter number parsing step S1301 of extracting an ingress port filter number from an egress packet, by the deep packet matching module 430;

an ingress port filter matching step S1302 of querying the ingress port filter number extracted from the egress packet to a policy manager module 420, by the deep packet matching module 430;

a step S1303 of extracting the matched ingress port action from the policy manager module 420 when there is a matched ingress port filter number;

a GTP filter number parsing step S1304 of extracting a GTP filter number from the egress packet, by the deep packet matching module 430;

a GTP filter matching step S1305 of querying the GTP filter number extracted from the egress packet to the policy manager module 420, by the deep packet matching module 430;

a step S1306 of extracting the matched GTP action from the policy manager module 420 when there is a matched GTP filter number;

an Inner IPv4 parsing step S1307 of extracting inner IPv4 information from the egress packet, by the deep packet matching module 430;

an Inner IPv4 matching step S1308 of querying the Inner IPv4 information extracted from the egress packet to the policy manager module 420, by the deep packet matching module 430;

a step S1309 of extracting the matched Inner IPv4 action from the policy manager module 420 when there is a matched Inner IPv4 information; and an action list generating step S1310 of storing all the pairs of the egress packet and extracted action lists in a GTP user plane egress port match action table 2912, by the deep packet matching module 430.

The present invention may be implemented in hardware or software. The present invention can be implemented as a computer-readable code in a computer-readable recording medium. The computer readable recording medium includes all types of recording device in which data readable by a computer system is stored. Examples of the computer readable recording medium are ROM, RAM, CD-ROM, a magnetic tape, a floppy disk, an optical data storing device and also implemented as a carrier wave (for example, transmission through the Internet). Further, the computer readable recording medium is distributed in computer systems connected through a network and a computer readable code is stored therein and executed in a distributed manner. Further, a functional program, code, and code segment which may implement the present invention may be easily deducted by a programmer in the art.

Exemplary embodiments of the present invention may include a carrier wave having electronically readable control signals which may be operated by a programmable computer system in which one of methods described above is executed. The embodiments of the present invention may be embodied as a computer program product having a program code and the program code is operated to execute one of the methods when the computer program is ran on the computer. The program code may be stored on a machine readable carrier. When the computer program is run on the computer, the embodiment of the present invention may be a computer program having a program code for executing one of the above-described methods. The present invention may include a computer or a programmable logic device to execute one of the above-described methods. A programmable logic device (for example, a field programmable gate array, a complementary metal oxide semiconductor based logic circuit) may be used to execute some or all of the functions of the above-described methods.

In addition, preferred embodiments of the present invention have been illustrated and described above, but the present invention is not limited to the above-described specific embodiment, it is obvious that various modification may be made by those skilled in the art, to which the present invention pertains without departing from the gist of the present invention, which is claimed in the claims, and such modified embodiments should not be individually understood from the technical spirit or prospect of the present invention.

What is claimed is:

1. A network packet broker device comprising:
a plurality of switches which are open flow edge switches connected to a plurality legacy networks which are radio access networks or wired access networks;
a software defined network (SDN) controller which acquires information of the plurality of openflow edge switches;
a legacy router container which treats a switch group including at least some of the plurality of switches as a virtual router to generate routing information for a packet ingressed to any one switch of the switch group, wherein the legacy router container maps a plurality of network heads connected to the plurality of openflow switches which generates legacy routing information for a flow processing inquiry message of the controller based on information of at least one virtual router with information of an external network which is directly coupled to the virtual router;
one or more processors; and
at least one computer-readable storage medium having stored therein instructions which, when executed by the one or more processors, cause the network packet broker device to:
receive a general packet radio service tunneling protocol (GTP) user plane packet from a port of a switch of the plurality of switches;
forward the GTP user plane packet to a predetermined port of a switch of the plurality of switches;
search for general packet radio service tunneling protocol user (GTP-U) tunnel endpoint identifier (TEID) of the GTP user plane packet to identify an egress port of the GTP user plane packet;
receive a GTP control plane packet from the port of the switch of the plurality of switches;
forward the GTP control plane packet received from the egress port, the egress port of the GTP user plane packet connected to a GTP-U TEID of the GTP control plane packet;
generate a record with a mobility management entity (MME) internet protocol (IP) address as a key and a bearer ID set including an MME IP, a bearer ID, and a sequence and an MME S11 TEID as values in an MME context table;
generate a record with a serving gateway (SGW) IP address as a key in an SGW context table;
update SGW S11 TEID and SGW S1U TEID by searching for a record with the SGW IP address as a key, in the SGW context table;
generate a record with MME S11 TEID as a key and with international mobile subscriber identity (IMSI) context and SGW S11 TEID context as values, in a first correlation table;
generate a record with SGW S11 TEID as a key and with MME S11 context as a value, in a second correlation table;
generate a record with SGW S11 TEID as a key and with SGW S11 TEID context as a value, in a third correlation table;
generate a record with eNB TEID and eNB IP as keys and with SGW S1U TEID context as a value, in a fourth correlation table;

update a bearer ID set including an MME IP, a bearer ID, and a sequence of a record with an MME IP address as a key and an eNB S1U TEID value in the MME context table; and generate a record with an IMSI as a key and with a bearer ID set including an MME IP, a bearer ID, and a sequence as a value, in an IMSI table.

2. The network packet broker device of claim 1, wherein the instructions which, when executed by the one or more processors, cause the network packet broker device to map a remote radio head (RRH) of the coupled radio access networks with the external network information which is directly coupled to the virtual router.

3. The network packet broker device of claim 1, wherein the instructions which, when executed by the one or more processors, cause the network packet broker device to map an optical line terminal (OLT) of the coupled wired access networks with the external network information which is directly coupled to the virtual router.

4. The network packet broker device of claim 1, wherein the instructions which, when executed by the one or more processors, cause the network packet broker device to map a digital processing unit (DU) of the coupled radio access networks with the external network information which is directly coupled to the virtual router.

5. A method for assigning a general packet radio service tunneling protocol (GTP) correlation using a network packet broker device, the method comprising:

receiving a GTP user plane packet from a port of a switch;

forwarding the GTP user plane packet to a predetermined port of the switch;

searching for general packet radio service tunneling protocol user (GTP-U) tunnel endpoint identifier (TEID) of the GTP user plane packet to identify an egress port of the GTP user plane packet;

receiving a GTP control plane packet from the port of the switch;

forwarding the GTP control plane packet received from the egress port, the egress port of the GTP user plane packet connected to a GTP-U TED of the GTP control plane packet;

generating a record with a mobility management entity (MME) internet protocol (IP) address as a key and a bearer ID set including an MME IP, a bearer ID, and a sequence and an MME S11 TED as values in an MME context table;

generating a record with a serving gateway (SGW) IP address as a key in an SGW context table;

updating SGW S11 TED and SGW S1U TED by searching for a record with the SGW IP address as a key, in the SGW context table;

generating a record with MME S11 TED as a key and with international mobile subscriber identity (IMSI) context and SGW S11 TED context as values, in a first correlation table;

generating a record with SGW S11 TEID as a key and with MME S11 context as a value, in a second correlation table;

generating a record with SGW S11 TEID as a key and with SGW S11 TED context as a value, in a third correlation table;

generating a record with eNB TED and eNB IP as keys and with SGW S1U TED context as a value, in a fourth correlation table;

updating a bearer ID set including an MME IP, a bearer ID, and a sequence of a record with an MME IP address as a key and an eNB S1U TED value in the MME context table; and generating a record with an IMSI as a key and with a bearer ID set including an MME IP, a bearer ID, and a sequence as a value, in an IMSI table.

* * * * *